US012309354B2

United States Patent
Lee

(10) Patent No.: US 12,309,354 B2
(45) Date of Patent: *May 20, 2025

(54) METHOD FOR ENCODING/DECODING IMAGE SIGNAL AND DEVICE FOR SAME

(71) Applicant: GUANGDONG OPPO MOBILE TELECOMMUNICATIONS CORP., LTD., Guangdong (CN)

(72) Inventor: Bae Keun Lee, Seongnam-si (KR)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/457,949

(22) Filed: Dec. 7, 2021

(65) Prior Publication Data

US 2022/0094912 A1 Mar. 24, 2022

Related U.S. Application Data

(63) Continuation of application No. 17/220,793, filed on Apr. 1, 2021, now Pat. No. 11,252,403, which is a
(Continued)

(30) Foreign Application Priority Data

Oct. 12, 2018 (KR) .................. 10-2018-0121713
Oct. 12, 2018 (KR) .................. 10-2018-0121757
Jan. 18, 2019 (KR) .................. 10-2019-0006611

(51) Int. Cl.
*H04N 11/02* (2006.01)
*H04N 19/105* (2014.01)
(Continued)

(52) U.S. Cl.
CPC ......... *H04N 19/105* (2014.11); *H04N 19/119* (2014.11); *H04N 19/132* (2014.11);
(Continued)

(58) Field of Classification Search
CPC .. H04N 19/105; H04N 19/119; H04N 19/132; H04N 19/159; H04N 19/176; H04N 19/61
(Continued)

(56) References Cited

U.S. PATENT DOCUMENTS 10,469,845 B1  11/2019  Zhao
10,931,943 B2   2/2021  Li
(Continued)

FOREIGN PATENT DOCUMENTS

CN   103931180 A   7/2014
EP     2774363 A1  9/2014
(Continued)

OTHER PUBLICATIONS

First Office Action of the Chinese application No. 202110387937.9, issued on Jul. 29, 2022. 22 pages with English translation.
(Continued)

*Primary Examiner* — Jayanti K Patel
*Assistant Examiner* — Richard B Carter
(74) *Attorney, Agent, or Firm* — PERKINS COIE LLP

(57) ABSTRACT

An image decoding method according to the present invention includes: a step for determining a reference sample line of a current block; a step for determining whether candidate intra-prediction modes identical to the intra-prediction mode of the current block exist; a step for deriving the intra-prediction mode of the current block on the basis of the determination; and a step for performing intra-prediction on the current block on the basis of the reference sample line and the intra-prediction mode. Here, at least one of the
(Continued)

candidate intra prediction modes may be derived by adding or subtracting an offset to or from the maximum value among the intra-prediction mode of a neighboring block that is above the current block and the intra-prediction mode of a neighboring block that is to the left of the current block.

16 Claims, 23 Drawing Sheets

Related U.S. Application Data continuation of application No. PCT/KR2019/013384, filed on Oct. 11, 2019.

(51) Int. Cl.
| | | |
|---|---|---|
| *H04N 19/119* | (2014.01) | |
| *H04N 19/132* | (2014.01) | |
| *H04N 19/159* | (2014.01) | |
| *H04N 19/176* | (2014.01) | |
| *H04N 19/61* | (2014.01) | |

(52) U.S. Cl.
CPC ......... *H04N 19/159* (2014.11); *H04N 19/176* (2014.11); *H04N 19/61* (2014.11)

(58) Field of Classification Search
USPC .................................................. 375/240.02
See application file for complete search history.

(56) References Cited

U.S. PATENT DOCUMENTS

| | | | | |
|---|---|---|---|---|
| 11,252,403 | B2* | 2/2022 | Lee | H04N 19/593 |
| 11,297,348 | B2 | 4/2022 | Chiang | |
| 11,570,428 | B2* | 1/2023 | Lim | H04N 19/105 |
| 2010/0040143 | A1 | 2/2010 | Kazui | |
| 2011/0182523 | A1 | 7/2011 | Kim | |
| 2013/0114707 | A1 | 5/2013 | Seregin et al. | |
| 2014/0112593 | A1 | 4/2014 | Zheng | |
| 2016/0373769 | A1 | 12/2016 | Zhao et al. | |
| 2018/0316913 | A1 | 11/2018 | Jun et al. | |
| 2019/0116381 | A1 | 4/2019 | Lee et al. | |
| 2019/0149836 | A1 | 5/2019 | Moon et al. | |
| 2019/0166375 | A1* | 5/2019 | Jun | H04N 19/50 |
| 2019/0182481 | A1 | 6/2019 | Lee | |
| 2019/0200011 | A1 | 6/2019 | Yoo et al. | |
| 2019/0208199 | A1* | 7/2019 | Cho | H04N 19/11 |
| 2019/0222837 | A1* | 7/2019 | Lee | H04N 19/52 |
| 2019/0313116 | A1 | 10/2019 | Filippov et al. | |
| 2019/0320203 | A1 | 10/2019 | Chiang | |
| 2019/0387241 | A1 | 12/2019 | Kim | |
| 2020/0021817 | A1* | 1/2020 | Van der Auwera | H04N 19/176 |
| 2020/0036935 | A1 | 1/2020 | Lee | |
| 2020/0099924 | A1 | 3/2020 | Seregin et al. | |
| 2020/0169752 | A1 | 5/2020 | Rath et al. | |
| 2020/0280740 | A1 | 9/2020 | Tsukuba | |
| 2020/0322611 | A1 | 10/2020 | Salehifar | |
| 2021/0185317 | A1 | 6/2021 | Gao | |
| 2022/0141489 | A1 | 5/2022 | Lee | |
| 2023/0336769 | A1 | 10/2023 | Han | |
| 2023/0353773 | A1 | 11/2023 | Moon et al. | |
| 2023/0412838 | A1 | 12/2023 | Lee | |

FOREIGN PATENT DOCUMENTS

| | | | |
|---|---|---|---|
| EP | 3311571 | A1 | 4/2018 |
| EP | 3379829 | A1 | 9/2018 |
| EP | 3442232 | A1 | 2/2019 |
| EP | 2774363 | B1 | 10/2019 |
| EP | 3311571 | B1 | 2/2020 |
| EP | 3806472 | A1 | 4/2021 |
| EP | 3833021 | A1 | 6/2021 |
| EP | 3840376 | A1 | 6/2021 |
| EP | 3843389 | A1 | 6/2021 |
| KR | 20180015598 | A | 2/2018 |
| RU | 2584498 | C2 | 5/2016 |
| RU | 2649787 | C1 | 4/2018 |
| WO | 2017176030 | A1 | 10/2017 |
| WO | 2017195667 | A1 | 11/2017 |
| WO | 2018026219 | A1 | 2/2018 |
| WO | 2018066958 | A1 | 4/2018 |

OTHER PUBLICATIONS

First Office Action of the Chilean application No. 202100796, issued on Feb. 14, 2022. 16 pages with English translation.
Office Action of the Indian application No. 202117018560, issued on Feb. 23, 2022. 8 pages with English translation.
Oral Proceedings of the European application No. 19870627.7, issued on Dec. 8, 2022. 7 pages.
Second Office Action of the Chinese application No. 202110387937.9, issued on Jan. 12, 2023. 15 pages with English translation.
First Office Action of the Russia application No. 2021111110, issued on Jan. 11, 2023. 11 pages with English translation.
C-W Hsu (Mediatek) et al, "Description of SDR video coding technology proposal by MediaTek", Joint Video Experts Team (JVET) of ITU-T SG 16 WP 3 and ISO/IEC JTC 1/SC 29/WG 11, Document: JVET-J0018, 10th Meeting: San Diego, US, Apr. 10-20, 2018. 64 pages.
Choi (Samsung) K et al, "CE6: AMT with reduced transform types (Test1.5)", Joint Video Experts Team (JVET) of ITU-T SG 16 WP 3 and ISO/IEC JTC 1/SC 29/WG 11, Document: JVET-K0171-v4, 11th Meeting: Ljubljana, SI, Jul. 10-18, 2018. 7 pages.
Supplementary European Search Report in the European application No. 19870627.7, issued on Nov. 9, 2021. 15 pages.
Written Opinion of the International Search Authority in the international application No. PCT/KR2019/013384, mailed on Jan. 20, 2020. 8 pages.
International Search Report in the international application No. PCT/KR2019/013384, dated Jan. 20, 2020.
Lin, Po-han et al. Multiple reference line intra prediction based on JEM7.0. Joint Video Exploration Team (JVET) of ITU-T SG 16 WP 3 and ISO/IEC JTC 1/SC 29/WG11. JVET-J0070. 10th Meeting: San Diego, US. pp. 1-3, Apr. 20, 2018, See pp. 1-2.
JNG. Won Kang et al. Description of SDR video coding technology proposal by ETRI and Sejong Utiversity. Joint Video Exploration Team (JVET) of ITU-T SG 16 WP 3 and ISO/IEC JTC 1/SC 29/WG 11. JVET-J0013_v2. 10th Meeting: San Diego, US. pp. 1-39, Apr. 20, 2018, See pp. 8-10.
Partial Supplementary European Search Report in the European application No. 19870627.7, dated Jul. 19, 2021.
Supplementary European Search Report in the European application No. 19870627.7, dated Nov. 9, 2021. 15 pages.
First Office Action of the U.S. Appl. No. 17/220,793, issued on Jun. 14, 2021.
Written Opinion of the International Search Authority in the international application No. PCT/KR2019/013384, dated Jan. 20, 2020. 8 pages.
Notice of Allowance of the U.S. Appl. No. 17/220,793, issued on Sep. 22, 2021.
Supplemental Notice of Allowability of the U.S. Appl. No. 17/220,793, issued on Nov. 4, 2021.
First Office Action of the European application No. 19870627.7, issued on May 4, 2022. 7 pages.
First Office Action of the Canadian application No. 3113861, issued on Jun. 7, 2022. 4 pages.
First Office Action of the Indonesian application No. P00202102836, issued on Apr. 6, 2023. 3 pages with English translation.
Telephone Consultation of the European application No. 19870627.7, issued on Sep. 25, 2023, 6 pages.
M. G. Sarwer, C.-W. Hsu, Y.-W. Huang, and S.-M. Lei, "CE3 6.4: Intra mode coding with 6 MPMs with bypass coding and non-MPMs with fixed length coding", Joint Video Experts Team (JVET) of ITU-T SG 16 WP 3 and ISO/IEC JTC 1/SC 29/WG 11, JVET-L0086 (version 2), 12th Meeting: Macao, CN, Oct. 3-12, 2018, pp. 29-32,47,52-55, 8 pages.

(56) References Cited

OTHER PUBLICATIONS

Hui-Yu Jiang, and Yao-Jen Chang, "CE3-related: Advanced MPM based on intra reference line selection scheme", Joint Video Experts Team (JVET) of ITU-T SG 16 WP 3 and ISO/IEC JTC 1/SC 29/WG 11, JVET-K0175-v3, 11th Meeting: Ljubljana, SI, Jul. 10-18, 2018, pp. 1-4, 4 pages.
Santiago De Luxan Hernandez, Heiko Schwarz, Detlev Marpe, and Thompas Wiegand, "CE3: Line-based intra coding mode (Tests 2.1.1. and 2.1.2)", Joint Video Experts Team (JVET) of ITU-T SG 16 WP 3 and ISO/IEC JTC 1/SC 29/WG 11, JVET-L0086-v2, 12th Meeting: Macao, CN, Oct. 3-12, 2018, pp. 1-9, 9 pages.
A. M. Kotra, et al., "CE3 6.6.1: A simple 6-MPM list construction with truncated coding for non-MPM signalling", Joint Video Experts Team (JVET) of ITU-T SG 16 WP 3 and ISO/IEC JTC 1/SC 29/WG 11, JVET-L0086-v2, 12th Meeting: Macao, CN, Oct. 3-12, 2018, pp. 1-6, 6 pages.
First Office Action of the Japanese application No. 2021-519620, issued on Oct. 10, 2023. 10 pages with English translation.
Non-Final Office Action of the U.S. Appl. No. 18/466,790, issued on Oct. 30, 2023, 26 pages.
Non-Final Office Action of the U.S. Appl. No. 18/467,652, issued on Oct. 30, 2023, 28 pages.
Non-Final Office Action of the U.S. Appl. No. 18/467,954, issued on Jan. 30, 2024, 34 pages.
Final Office Action of the U.S. Appl. No. 18/466,790, issued on Feb. 13, 2024, 23 pages.
Final Office Action of the U.S. Appl. No. 18/467,652, issued on Feb. 13, 2024, 24 pages.
Supplementary European Search Report in the European application No. 24153148.2, mailed on Apr. 18, 2024, 17 pages.
Final Office Action of the U.S. Appl. No. 18/467,954, issued on May 7, 2024, 23 pages.
Notice of Advisory Action of the U.S. Appl. No. 18/466,790, issued on Apr. 30, 2024, 5 pages.
Notice of Advisory Action of the U.S. Appl. No. 18/467,652, issued on Apr. 30, 2024, 5 pages.
Non-Final Office Action after RCE of the U.S. Appl. No. 18/466,790, issued on Jun. 26, 2024, 23 pages.
Advisory Action of the U.S. Appl. No. 18/467,954, issued on Jul. 24, 2024, 6 pages.
First Office Action of the Autralian application No. 2019358651, issued on Aug. 20, 2024, 3 pages.
Non-Final Office Action of the US after RCE U.S. Appl. No. 18/467,954, issued on Sep. 4, 2024, 24 pages.
First Office Action of the Japanese application No. 2024-009480, issued on Sep. 17, 2024, 10 pages with English translation.
First Office Action of the Japanese application No. 2024-008514, issued on Sep. 17, 2024, 10 pages with English translation.
Final Office Action of the US after RCE U.S. Appl. No. 18/466,790, issued on Sep. 19, 2024, 21 pages.
Final Office Action after RCE of the U.S. Appl. No. 18/467,954, issued on Jan. 7, 2025, 17 pages.
Advisory Action of the U.S. Appl. No. 18/467,954, issued on Mar. 25, 2025, 4 pages.

* cited by examiner

METHOD FOR ENCODING/DECODING IMAGE SIGNAL AND DEVICE FOR SAME

CROSS-REFERENCE TO RELATED APPLICATIONS

This is a continuation application of U.S. patent application Ser. No. 17/220,793, filed Apr. 1, 2021, which is a continuation of International Patent Application No. PCT/KR2019/013384, filed on Oct. 11, 2019, which claims priorities from Korean Patent Application No. 10-2018-0121713 filed on Oct. 12, 2018, Korean Patent Application No. 10-2018-0121757 filed on Oct. 12, 2018, Korean Patent Application No. 10-2019-0006611 filed on Jan. 18, 2019, disclosures of which are incorporated herein by reference in their entity.

BACKGROUND OF THE INVENTION

Technical Field

The present disclosure relates to a video signal encoding and decoding method and an apparatus therefor.

Background of the Related Art

As display panels are getting bigger and bigger, video services of further higher quality are required more and more. The biggest problem of high-definition video services is significant increase in data volume, and to solve this problem, studies for improving the video compression rate are actively conducted. As a representative example, the Motion Picture Experts Group (MPEG) and the Video Coding Experts Group (VCEG) under the International Telecommunication Union-Telecommunication (ITU-T) have formed the Joint Collaborative Team on Video Coding (JCT-VC) in 2009. The JCT-VC has proposed High Efficiency Video Coding (HEVC), which is a video compression standard having a compression performance about twice as high as the compression performance of H.264/AVC, and it is approved as a standard on Jan. 25, 2013. With rapid advancement in the high-definition video services, performance of the HEVC gradually reveals its limitations.

SUMMARY

An object of the present disclosure is to provide a method of deriving a candidate intra prediction mode based on an intra prediction mode of a neighboring block adjacent to a current block in encoding/decoding a video signal, and an apparatus for performing the method.

Another object of the present disclosure is to provide a method of partitioning a coding block or a transform block into a plurality of subblocks, and performing intra prediction on each of the subblocks in encoding/decoding a video signal, and an apparatus for performing the method.

Another object of the present disclosure is to provide a method of partitioning a coding block or a transform block into a plurality of subblocks, and performing transform only on some of the subblocks in encoding/decoding a video signal, and an apparatus for performing the method.

The technical problems to be achieved in the present disclosure are not limited to the technical problems mentioned above, and unmentioned other problems may be clearly understood by those skilled in the art from the following description.

A method of decoding/encoding a video signal according to the present disclosure includes the steps of: determining a reference sample line of a current block; determining whether a candidate intra prediction mode the same as an intra prediction mode of the current block exists; deriving an intra prediction mode of the current block based on the determination; and performing intra prediction on the current block based on the reference sample line and the intra prediction mode. At this point, at least one among the candidate intra prediction modes may be derived by adding or subtracting an offset to or from a maximum value among an intra prediction mode of a top neighboring block of the current block and an intra prediction mode of a left neighboring block of the current block.

In the video signal decoding/encoding method according to the present disclosure, when a difference between the intra prediction mode of the top neighboring block and the intra prediction mode of the left neighboring block is 64, at least one among the candidate intra prediction modes may be derived by adding or subtracting 2 to or from the maximum value.

In the video signal decoding/encoding method according to the present disclosure, the number of candidate intra prediction modes may vary according to an index of the reference sample line.

The video signal decoding/encoding method according to the present disclosure may further include the step of determining whether or not to partition the current block into a plurality of subblocks, and when the current block is partitioned into a plurality of subblocks, the plurality of subblocks may share one intra prediction mode.

In the video signal decoding/encoding method according to the present disclosure, inverse transform may be omitted for some of the plurality of subblocks.

In the video signal decoding/encoding method according to the present disclosure, a horizontal direction transform type of a subblock may be determined based on a width of the subblock, and a vertical direction transform type of the subblock may be determined based on a height of the subblock.

In the video signal decoding/encoding method according to the present disclosure, a horizontal direction transform type and a vertical direction transform type of a subblock may be determined based on a shape of the subblock.

Features briefly summarized above with respect to the present disclosure are merely exemplary aspects of the detailed description of the present disclosure that will be described below, and do not limit the scope of the present disclosure.

According to the present disclosure, intra prediction efficiency can be improved by deriving a candidate intra prediction mode similar to an intra prediction mode of a neighboring block adjacent to a current block.

According to the present disclosure, intra prediction efficiency can be improved by partitioning a coding block or a transform block into a plurality of subblocks and performing intra prediction on each of the subblocks.

According to the present disclosure, encoding and decoding efficiency can be improved by partitioning a coding block or a transform block into a plurality of subblocks and performing transform on only some of the subblocks.

The effects that can be obtained from the present disclosure are not limited to the effects mentioned above, and unmentioned other effects may be clearly understood by those skilled in the art from the following description.

DETAILED DESCRIPTION OF THE PREFERRED EMBODIMENT

Hereafter, an embodiment of the present disclosure will be described in detail with reference to the accompanying drawings.

Encoding and decoding of a video is performed by the unit of block. For example, an encoding/decoding process such as transform, quantization, prediction, in-loop filtering, reconstruction or the like may be performed on a coding block, a transform block, or a prediction block.

Hereinafter, a block to be encoded/decoded will be referred to as a 'current block'. For example, the current block may represent a coding block, a transform block or a prediction block according to a current encoding/decoding process step.

In addition, it may be understood that the term 'unit' used in this specification indicates a basic unit for performing a specific encoding/decoding process, and the term 'block' indicates a sample array of a predetermined size. Unless otherwise stated, the 'block' and 'unit' may be used to have the same meaning. For example, in an embodiment described below, it may be understood that a coding block and a coding unit have the same meaning.

Figure 1:
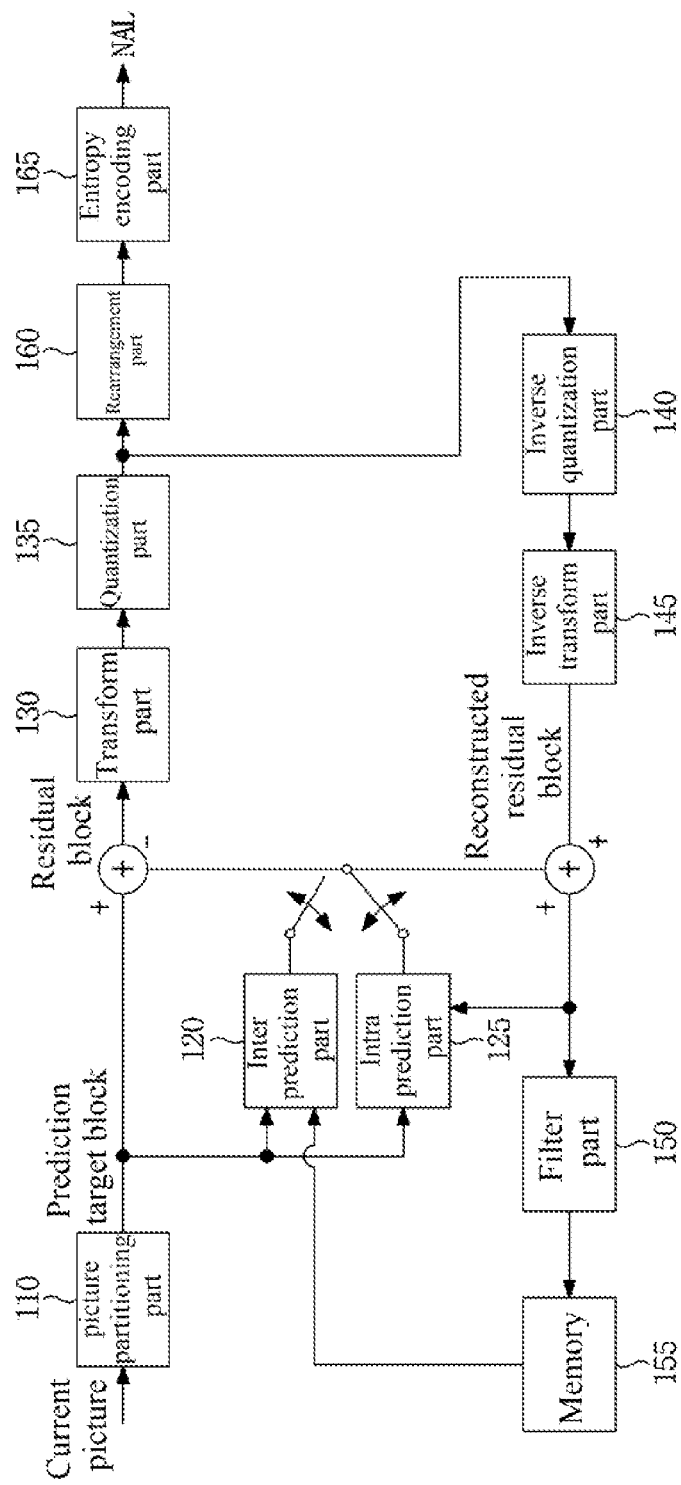
FIG. 1 is a block diagram showing a video encoder according to an embodiment of the present disclosure.

FIG. 1 is a block diagram showing a video encoder according to an embodiment of the present disclosure.

Referring to FIG. 1, a video encoding apparatus 100 may include a picture partitioning part 110, a prediction part 120 and 125, a transform part 130, a quantization part 135, a rearrangement part 160, an entropy coding part 165, an inverse quantization part 140, an inverse transform part 145, a filter part 150, and a memory 155.

Each of the components shown in FIG. 1 is independently shown to represent characteristic functions different from each other in a video encoding apparatus, and it does not mean that each component is formed by the configuration unit of separate hardware or single software. That is, each component is included to be listed as a component for convenience of explanation, and at least two of the components may be combined to form a single component, or one component may be partitioned into a plurality of components to perform a function. Integrated embodiments and separate embodiments of the components are also included in the scope of the present disclosure if they do not depart from the essence of the present disclosure.

In addition, some of the components are not essential components that perform essential functions in the present disclosure, but may be optional components only for improving performance. The present disclosure can be implemented by including only components essential to implement the essence of the present disclosure excluding components used for improving performance, and a structure including only the essential components excluding the optional components used for improving performance is also included in the scope of the present disclosure.

The picture partitioning part 110 may partition an input picture into at least one processing unit. At this point, the processing unit may be a prediction unit (PU), a transform unit (TU), or a coding unit (CU). The picture partitioning part 110 may partition a picture into a combination of a plurality of coding units, prediction units, and transform units, and encode a picture by selecting a combination of a coding unit, a prediction unit, and a transform unit based on a predetermined criterion (e.g., a cost function).

For example, one picture may be partitioned into a plurality of coding units. In order to partition the coding units in a picture, a recursive tree structure such as a quad tree structure may be used. A video or a coding unit partitioned into different coding units using the largest coding unit as a root may be partitioned to have as many child nodes as the number of partitioned coding units. A coding unit that is not partitioned any more according to a predetermined restriction become a leaf node. That is, when it is assumed that only square partitioning is possible for one coding unit, the one coding unit may be partitioned into up to four different coding units.

Hereinafter, in an embodiment of the present disclosure, the coding unit may be used as a meaning of a unit performing encoding or a meaning of a unit performing decoding.

The prediction unit may be one that is partitioned in a shape of at least one square, rectangle or the like of the same size within one coding unit, or it may be any one prediction unit, among the prediction units partitioned within one coding unit, that is partitioned to have a shape and/or size different from those of another prediction unit.

If the coding unit is not a smallest coding unit when a prediction unit that performs intra prediction based on the coding unit is generated, intra prediction may be performed without partitioning a picture into a plurality of prediction units N×N.

The prediction part 120 and 125 may include an inter prediction part 120 that performs inter prediction and an intra prediction part 125 that performs intra prediction. It may be determined whether to use inter prediction or to perform intra prediction for a prediction unit, and determine specific information (e.g., intra prediction mode, motion vector, reference picture, or the like) according to each prediction method. At this point, a processing unit for performing prediction may be different from a processing unit for determining a prediction method and specific content. For example, a prediction method and a prediction mode may be determined in a prediction unit, and prediction may be performed in a transform unit. A residual coefficient (residual block) between the generated prediction block and the original block may be input into the transform part 130. In addition, prediction mode information, motion vector information and the like used for prediction may be encoded by the entropy coding part 165 together with the residual coefficient and transferred to a decoder. When a specific encoding mode is used, an original block may be encoded as it is and transmitted to a decoder without generating a prediction block through the prediction part 120 and 125.

The inter prediction part 120 may predict a prediction unit based on information on at least one picture among pictures before or after the current picture, and in some cases, it may predict a prediction unit based on information on a partial area that has been encoded in the current picture. The inter prediction part 120 may include a reference picture interpolation part, a motion prediction part, and a motion compensation part.

The reference picture interpolation part may receive reference picture information from the memory 155 and generate pixel information of an integer number of pixels or less from the reference picture. In the case of a luminance pixel, a DCT-based 8-tap interpolation filter with a varying filter coefficient may be used to generate pixel information of an integer number of pixels or less by the unit of ¼ pixels. In the case of a color difference signal, a DCT-based 4-tap interpolation filter with a varying filter coefficient may be used to generate pixel information of an integer number of pixels or less by the unit of ⅛ pixels.

The motion prediction part may perform motion prediction based on the reference picture interpolated by the reference picture interpolation part. Various methods such as a full search-based block matching algorithm (FBMA), a three-step search (TSS), and a new three-step search algorithm (NTS) may be used as a method of calculating a motion vector. The motion vector may have a motion vector value of a unit of ½ or ¼ pixels based on interpolated pixels.

The motion prediction part may predict a current prediction unit by varying the motion prediction method. Various methods such as a skip method, a merge method, an advanced motion vector prediction (AMVP) method, an intra-block copy method and the like may be used as the motion prediction method.

The intra prediction part 125 may generate a prediction unit based on the information on reference pixels in the neighborhood of the current block, which is pixel information in the current picture. When a block in the neighborhood of the current prediction unit is a block on which inter prediction has been performed and thus the reference pixel is a pixel on which inter prediction has been performed, the reference pixel included in the block on which inter prediction has been performed may be used in place of reference pixel information of a block in the neighborhood on which intra prediction has been performed. That is, when a reference pixel is unavailable, at least one reference pixel among available reference pixels may be used in place of unavailable reference pixel information.

In the intra prediction, the prediction mode may have an angular prediction mode that uses reference pixel information according to a prediction direction, and a non-angular prediction mode that does not use directional information when performing prediction. A mode for predicting luminance information may be different from a mode for predicting color difference information, and intra prediction mode information used to predict luminance information or predicted luminance signal information may be used to predict the color difference information.

If the size of the prediction unit is the same as the size of the transform unit when intra prediction is performed, the intra prediction may be performed for the prediction unit based on a pixel on the left side, a pixel on the top-left side, and a pixel on the top of the prediction unit. However, if the size of the prediction unit is different from the size of the transform unit when the intra prediction is performed, the intra prediction may be performed using a reference pixel based on the transform unit. In addition, intra prediction using N×N partitioning may be used only for the smallest coding unit.

The intra prediction method may generate a prediction block after applying an Adaptive Intra Smoothing (AIS) filter to the reference pixel according to a prediction mode. The type of the AIS filter applied to the reference pixel may vary. In order to perform the intra prediction method, the intra prediction mode of the current prediction unit may be predicted from the intra prediction mode of the prediction unit existing in the neighborhood of the current prediction unit. When a prediction mode of the current prediction unit is predicted using the mode information predicted from the neighboring prediction unit, if the intra prediction modes of the current prediction unit is the same as the prediction unit in the neighborhood, information indicating that the prediction modes of the current prediction unit is the same as the prediction unit in the neighborhood may be transmitted using predetermined flag information, and if the prediction modes of the current prediction unit and the prediction unit in the neighborhood are different from each other, prediction mode information of the current block may be encoded by performing entropy coding.

In addition, a residual block including a prediction unit that has performed prediction based on the prediction unit generated by the prediction part 120 and 125 and residual coefficient information, which is a difference value of the prediction unit with the original block, may be generated. The generated residual block may be input into the transform part 130.

The transform part 130 may transform the residual block including the original block and the residual coefficient information of the prediction unit generated through the prediction part 120 and 125 using a transform method such as Discrete Cosine Transform (DCT), Discrete Sine Transform (DST), or KLT. Whether to apply the DCT, the DST or the KLT to transform the residual block may be determined based on intra prediction mode information of a prediction unit used to generate the residual block.

The quantization part 135 may quantize values transformed into the frequency domain by the transform part 130. Quantization coefficients may vary according to the block or the importance of a video. A value calculated by the quantization part 135 may be provided to the inverse quantization part 140 and the rearrangement part 160.

The rearrangement part 160 may rearrange coefficient values for the quantized residual coefficients.

The rearrangement part 160 may change coefficients of a two-dimensional block shape into a one-dimensional vector shape through a coefficient scanning method. For example, the rearrangement part 160 may scan DC coefficients up to high-frequency domain coefficients using a zig-zag scan method, and change the coefficients into a one-dimensional vector shape. According to the size of the transform unit and the intra prediction mode, a vertical scan of scanning the coefficients of a two-dimensional block shape in the column direction and a horizontal scan of scanning the coefficients of a two-dimensional block shape in the row direction may be used instead of the zig-zag scan. That is, according to the size of the transform unit and the intra prediction mode, a scan method that will be used may be determined among the zig-zag scan, the vertical direction scan, and the horizontal direction scan.

The entropy coding part 165 may perform entropy coding based on values calculated by the rearrangement part 160. Entropy coding may use various encoding methods such as Exponential Golomb, Context-Adaptive Variable Length Coding (CAVLC), Context-Adaptive Binary Arithmetic Coding (CABAC), and the like.

The entropy coding part 165 may encode various information such as residual coefficient information and block type information of a coding unit, prediction mode information, partitioning unit information, prediction unit information and transmission unit information, motion vector information, reference frame information, block interpolation information, and filtering information input from the rearrangement part 160 and the prediction parts 120 and 125.

The entropy coding part 165 may entropy-encode the coefficient value of a coding unit input from the rearrangement part 160.

The inverse quantization part 140 and the inverse transform part 145 inverse-quantize the values quantized by the quantization part 135 and inverse-transform the values transformed by the transform part 130. The residual coefficient generated by the inverse quantization part 140 and the inverse transform part 145 may be combined with the prediction unit predicted through a motion estimation part, a motion compensation part, and an intra prediction part included in the prediction part 120 and 125 to generate a reconstructed block.

The filter part 150 may include at least one among a deblocking filter, an offset compensation unit, and an adaptive loop filter (ALF).

The deblocking filter may remove block distortion generated by the boundary between blocks in the reconstructed picture. In order to determine whether or not to perform deblocking, whether or not to apply the deblocking filter to the current block may be determined based on the pixels included in several columns or rows included in the block. A strong filter or a weak filter may be applied according to the deblocking filtering strength needed when the deblocking filter is applied to a block. In addition, when vertical direction filtering and horizontal direction filtering are performed in applying the deblocking filter, horizontal direction filtering and vertical direction filtering may be processed in parallel.

The offset correction unit may correct an offset to the original video by the unit of pixel for a video on which the deblocking has been performed. In order to perform offset correction for a specific picture, it is possible to use a method of dividing pixels included in the video into a certain number of areas, determining an area to perform offset, and applying the offset to the area, or a method of applying an offset considering edge information of each pixel.

Adaptive Loop Filtering (ALF) may be performed based on a value obtained by comparing the reconstructed and filtered video with the original video. After dividing the pixels included in the video into predetermined groups, one filter to be applied to a corresponding group may be determined, and filtering may be performed differently for each group. A luminance signal, which is the information related to whether or not to apply ALF, may be transmitted for each coding unit (CU), and the shape and filter coefficient of an ALF filter to be applied may vary according to each block. In addition, an ALF filter of the same type (fixed type) may be applied regardless of the characteristic of a block to be applied.

The memory 155 may store the reconstructed block or picture calculated through the filter part 150, and the reconstructed and stored block or picture may be provided to the prediction part 120 and 125 when inter prediction is performed.

Figure 2:
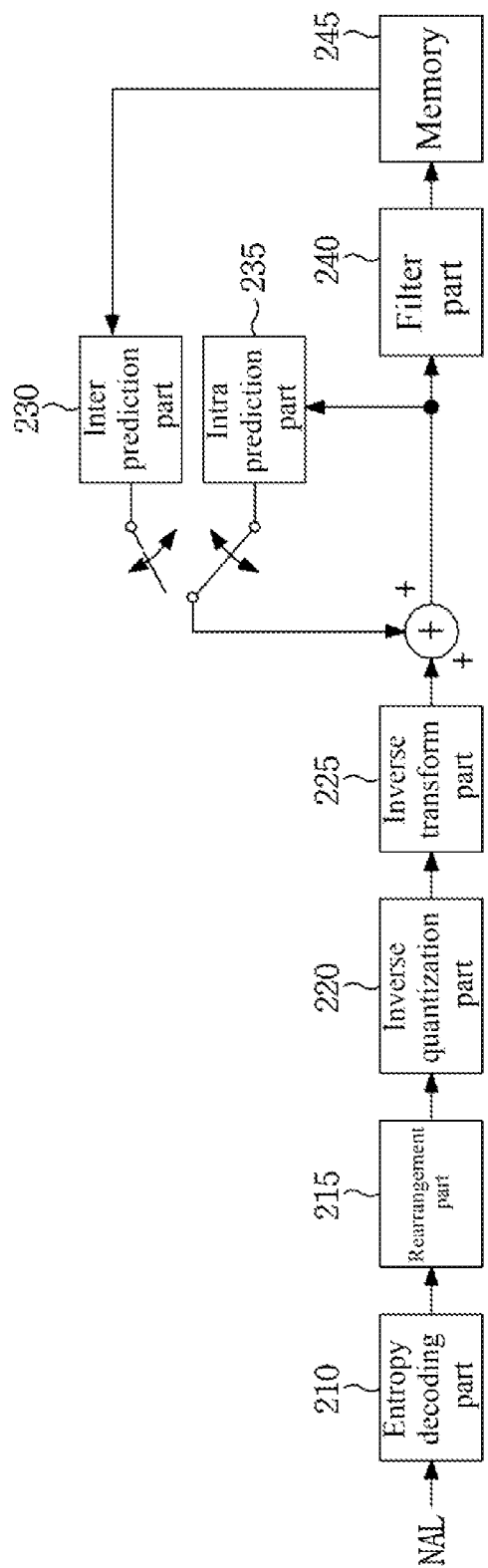
FIG. 2 is a block diagram showing a video decoder according to an embodiment of the present disclosure.

FIG. 2 is a block diagram showing a video decoder according to an embodiment of the present disclosure.

Referring to FIG. 2, a video decoder 200 may include an entropy decoding part 210, a rearrangement part 215, an inverse quantization part 220, an inverse transform part 225, a prediction part 230 and 235, a filter part 240, and a memory 245.

When a video bitstream is input from a video encoder, the input bitstream may be decoded in a procedure opposite to that of the video encoder.

The entropy decoding part 210 may perform entropy decoding in a procedure opposite to that of performing entropy coding in the entropy decoding part of the video encoder. For example, various methods corresponding to the method performed by the video encoder, such as Exponential Golomb, Context-Adaptive Variable Length Coding (CAVLC), and Context-Adaptive Binary Arithmetic Coding (CABAC), may be applied.

The entropy decoding part 210 may decode information related to intra prediction and inter prediction performed by the encoder.

The rearrangement part 215 may perform rearrangement on the bitstream entropy-decoded by the entropy decoding part 210 based on the rearrangement method performed by the encoder. The coefficients expressed in a one-dimensional vector shape may be reconstructed and rearranged as coefficients of two-dimensional block shape. The rearrangement part 215 may receive information related to coefficient scanning performed by the encoding part and perform reconstruction through a method of inverse-scanning based on the scanning order performed by the corresponding encoding part.

The inverse quantization part 220 may perform inverse quantization based on a quantization parameter provided by the encoder and a coefficient value of the rearranged block.

The inverse transform part 225 may perform inverse transform, i.e., inverse DCT, inverse DST, or inverse KLT, for the transform, i.e., DCT, DST, or KLT, performed by the transform part on a result of the quantization performed by the video encoder. The inverse transform may be performed based on a transmission unit determined by the video encoder. The inverse transform part 225 of the video decoder may selectively perform a transform technique (e.g., DCT, DST, KLT) according to a plurality of pieces of information such as a prediction method, a size of a current block, a prediction direction and the like.

The prediction part 230 and 235 may generate a prediction block based on information related to generation of a prediction block provided by the entropy decoder 210 and information on a previously decoded block or picture provided by the memory 245.

As described above, if the size of the prediction unit and the size of the transform unit are the same when intra prediction is performed in the same manner as the operation of the video encoder, intra prediction is performed on the prediction unit based on the pixel existing on the left side, the pixel on the top-left side, and the pixel on the top of the prediction unit. However, if the size of the prediction unit and the size of the transform unit are different when intra prediction is performed, intra prediction may be performed using a reference pixel based on a transform unit. In addition, intra prediction using N×N partitioning may be used only for the smallest coding unit.

The prediction part 230 and 235 may include a prediction unit determination part, an inter prediction part, and an intra prediction part. The prediction unit determination part may receive various information such as prediction unit information input from the entropy decoding part 210, prediction mode information of the intra prediction method, information related to motion prediction of an inter prediction method, and the like, identify the prediction unit from the current coding unit, and determine whether the prediction unit performs inter prediction or intra prediction. The inter prediction part 230 may perform inter prediction on the current prediction unit based on information included in at least one picture among pictures before or after the current picture including the current prediction unit by using information necessary for inter prediction of the current prediction unit provided by the video encoder. Alternatively, the inter prediction part 230 may perform inter prediction based on information on a partial area previously reconstructed in the current picture including the current prediction unit.

In order to perform inter prediction, it may be determined, based on the coding unit, whether the motion prediction method of the prediction unit included in a corresponding coding unit is a skip mode, a merge mode, a motion vector prediction mode (AMVP mode), or an intra-block copy mode.

The intra prediction part 235 may generate a prediction block based on the information on the pixel in the current picture. When the prediction unit is a prediction unit that has performed intra prediction, the intra prediction may be performed based on intra prediction mode information of the prediction unit provided by the video encoder. The intra prediction part 235 may include an Adaptive Intra Smoothing (AIS) filter, a reference pixel interpolation part, and a DC filter. The AIS filter is a part that performs filtering on the reference pixel of the current block, and may determine whether or not to apply the filter according to the prediction mode of the current prediction unit and apply the filter. AIS filtering may be performed on the reference pixel of the current block by using the prediction mode and AIS filter information of the prediction unit provided by the video encoder. When the prediction mode of the current block is a mode that does not perform AIS filtering, the AIS filter may not be applied.

When the prediction mode of the prediction unit is a prediction unit that performs intra prediction based on a pixel value obtained by interpolating the reference pixel, the reference pixel interpolation part may generate a reference pixel of a pixel unit having an integer value or less by interpolating the reference pixel. When the prediction mode of the current prediction unit is a prediction mode that generates a prediction block without interpolating the reference pixel, the reference pixel may not be interpolated. The DC filter may generate a prediction block through filtering when the prediction mode of the current block is the DC mode.

The reconstructed block or picture may be provided to the filter part 240. The filter part 240 may include a deblocking filter, an offset correction unit, and an ALF.

Information on whether a deblocking filter is applied to a corresponding block or picture and information on whether a strong filter or a weak filter is applied when a deblocking filter is applied may be provided by the video encoder. The deblocking filter of the video decoder may be provided with information related to the deblocking filter provided by the video encoder, and the video decoder may perform deblocking filtering on a corresponding block.

The offset correction unit may perform offset correction on the reconstructed video based on the offset correction type and offset value information applied to the video when encoding is performed.

The ALF may be applied to a coding unit based on information on whether or not to apply the ALF and information on ALF coefficients provided by the encoder. The ALF information may be provided to be included in a specific parameter set.

The memory 245 may store the reconstructed picture or block and use it as a reference picture or a reference block and may provide the reconstructed picture to an output unit.

Figure 3:
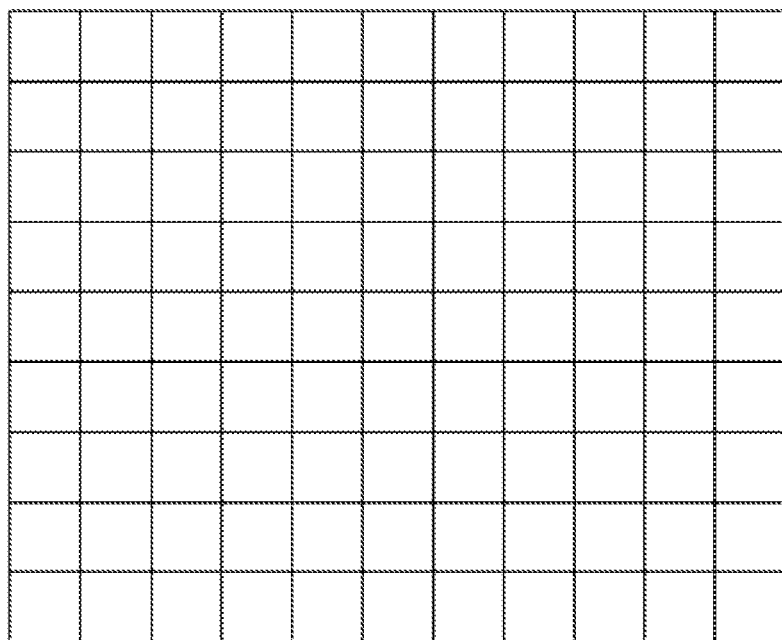
FIG. 3 is a view showing a basic coding tree unit according to an embodiment of the present disclosure.

FIG. 3 is a view showing a basic coding tree unit according to an embodiment of the present disclosure.

A coding block of a maximum size may be defined as a coding tree block. A picture is partitioned into a plurality of coding tree units (CTUs). The coding tree unit is a coding unit having a maximum size and may be referred to as a Large Coding Unit (LCU). FIG. 3 shows an example in which a picture is partitioned into a plurality of coding tree units.

The size of the coding tree unit may be defined at a picture level or a sequence level. To this end, information indicating the size of the coding tree unit may be signaled through a picture parameter set or a sequence parameter set.

For example, the size of the coding tree unit for the entire picture in a sequence may be set to 128×128. Alternatively, at the picture level, any one among 128×128 and 256×256 may be determined as the size of the coding tree unit. For example, the size of the coding tree unit may be set to 128×128 in a first picture, and the size of the coding tree unit may be set to 256×256 in a second picture.

Coding blocks may be generated by partitioning a coding tree unit. The coding block indicates a basic unit for performing encoding/decoding. For example, prediction or transform may be performed for each coding block, or a prediction encoding mode may be determined for each coding block. Here, the prediction encoding mode indicates a method of generating a prediction picture. For example, the prediction encoding mode may include prediction within a picture (intra prediction), prediction between pictures (inter prediction), current picture referencing (CPR) or intra-block copy (IBC), or combined prediction. For the coding block, a prediction block may be generated by using at least one prediction encoding mode among the intra prediction, the inter prediction, the current picture referencing, and the combined prediction.

Information indicating the prediction encoding mode of the current block may be signaled through a bitstream. For example, the information may be a 1-bit flag indicating whether the prediction encoding mode is an intra mode or an inter mode. Only when the prediction encoding mode of the current block is determined as the inter mode, the current picture referencing or the combined prediction may be used.

The current picture reference is for setting the current picture as a reference picture and obtaining a prediction block of the current block from an area that has already been encoded/decoded in the current picture. Here, the current picture means a picture including the current block. Information indicating whether the current picture reference is applied to the current block may be signaled through a bitstream. For example, the information may be a 1-bit flag. When the flag is true, the prediction encoding mode of the current block may be determined as the current picture reference, and when the flag is false, the prediction mode of the current block may be determined as inter prediction.

Alternatively, the prediction encoding mode of the current block may be determined based on a reference picture index. For example, when the reference picture index indicates the current picture, the prediction encoding mode of the current block may be determined as the current picture reference. When the reference picture index indicates a picture other than the current picture, the prediction encoding mode of the current block may be determined as inter prediction. That is, the current picture reference is a prediction method using information on an area in which encoding/decoding has been completed in the current picture, and inter prediction is a prediction method using information on another picture in which the encoding/decoding has been completed.

The combined prediction represents an encoding mode in which two or more among the intra prediction, the inter prediction, and the current reference picture are combined. For example, when the combined prediction is applied, a first prediction block may be generated based on one among the intra prediction, the inter prediction, and the current picture referencing, and a second prediction block may be generated based on another one. When the first prediction block and the second prediction block are generated, a final prediction block may be generated through an average operation or a weighted sum operation of the first prediction block and the second prediction block. Information indicating whether or not the combined prediction is applied may be signaled through a bitstream. The information may be a 1-bit flag.

Figure 4:
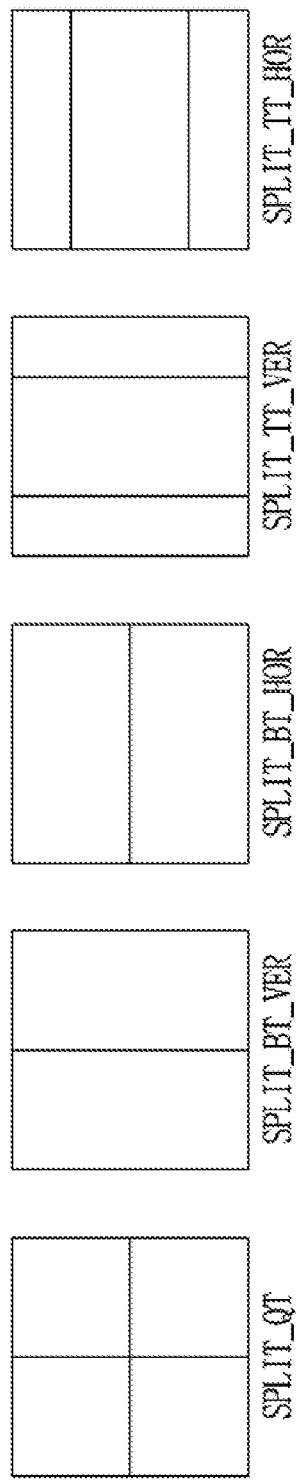
FIG. 4 is a view showing various partitioning types of a coding block.

FIG. 4 is a view showing various partitioning types of a coding block.

The coding block may be partitioned into a plurality of coding blocks based on quad tree partitioning, binary tree partitioning, or ternary tree partitioning. The partitioned coding block may be partitioned again into a plurality of coding blocks based on the quad tree partitioning, the binary tree partitioning, or the ternary tree partitioning.

The quad tree partitioning refers to a partitioning technique that partitions a current block into four blocks. As a result of the quad tree partitioning, the current block may be partitioned into four square-shaped partitions (see 'SPLIT_QT' of FIG. 4 (a)).

The binary tree partitioning refers to a partitioning technique that partitions a current block into two blocks. Partitioning a current block into two blocks along the vertical direction (i.e., using a vertical line crossing the current block) may be referred to as vertical direction binary tree partitioning, and partitioning a current block into two blocks along the horizontal direction (i.e., using a horizontal line crossing the current block) may be referred to as horizontal direction binary tree partitioning. As a result of the binary tree partitioning, the current block may be partitioned into two non-square shaped partitions. 'SPLIT_BT_VER' of FIG. 4 (b) shows a result of the vertical direction binary tree partitioning, and 'SPLIT_BT_HOR' of FIG. 4 (c) shows a result of the horizontal direction binary tree partitioning.

The ternary tree partitioning refers to a partitioning technique that partitions a current block into three blocks. Partitioning a current block into three blocks along the vertical direction (i.e., using two vertical lines crossing the current block) may be referred to as vertical direction ternary tree partitioning, and partitioning a current block into three blocks along the horizontal direction (i.e., using two horizontal lines crossing the current block) may be referred to as horizontal direction ternary tree partitioning. As a result of the ternary tree partitioning, the current block may be partitioned into three non-square shaped partitions. At this point, the width/height of a partition positioned at the center of the current block may be twice as large as the width/height of the other partitions. 'SPLIT_TT_VER' of FIG. 4 (d) shows a result of the vertical direction ternary tree partitioning, and 'SPLIT_TT_HOR' of FIG. 4 (e) shows a result of the horizontal direction ternary tree partitioning.

The number of times of partitioning a coding tree unit may be defined as a partitioning depth. The maximum partitioning depth of a coding tree unit may be determined at the sequence or picture level. Accordingly, the maximum partitioning depth of a coding tree unit may be different for each sequence or picture.

Alternatively, the maximum partitioning depth for each partitioning technique may be individually determined. For example, the maximum partitioning depth allowed for the quad tree partitioning may be different from the maximum partitioning depth allowed for the binary tree partitioning and/or the ternary tree partitioning.

The encoder may signal information indicating at least one among the partitioning type and the partitioning depth of the current block through a bitstream. The decoder may determine the partitioning type and the partitioning depth of a coding tree unit based on the information parsed from the bitstream.

Figure 5:
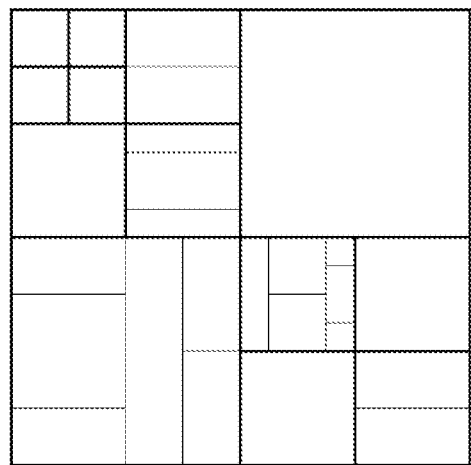
FIG. 5 is a view showing a partitioning pattern of a coding tree unit.

FIG. 5 is a view showing a partitioning pattern of a coding tree unit.

Partitioning a coding block using a partitioning technique such as quad tree partitioning, binary tree partitioning, and/or ternary tree partitioning may be referred to as multi-tree partitioning.

Coding blocks generated by applying the multi-tree partitioning to a coding block may be referred to as lower coding blocks. When the partitioning depth of a coding block is k, the partitioning depth of the lower coding blocks is set to k+1.

Contrarily, for coding blocks having a partitioning depth of k+1, a coding block having a partitioning depth of k may be referred to as an upper coding block.

The partitioning type of the current coding block may be determined based on at least one among a partitioning type of an upper coding block and a partitioning type of a neighboring coding block. Here, the neighboring coding block is a coding block adjacent to the current coding block and may include at least one among a top neighboring block and a left neighboring block of the current coding block, and a neighboring block adjacent to the top-left corner. Here, the partitioning type may include at least one among whether quad tree partitioning is applied, whether binary tree partitioning is applied, a binary tree partitioning direction, whether ternary tree partitioning is applied, and a ternary tree partitioning direction.

In order to determine a partitioning type of a coding block, information indicating whether or not the coding block can be partitioned may be signaled through a bitstream. The information is a 1-bit flag of 'split_cu_flag', and when the flag is true, it indicates that the coding block is partitioned by a quad tree partitioning technique.

When split_cu_flag is true, information indicating whether the coding block is quad-tree partitioned may be signaled through a bitstream. The information is a 1-bit flag of split_qt_flag, and when the flag is true, the coding block may be partitioned into four blocks.

For example, in the example shown in FIG. 5, as a coding tree unit is quad-tree partitioned, four coding blocks having a partitioning depth of 1 are generated. In addition, it is shown that quad tree partitioning is applied again to the first and fourth coding blocks among the four coding blocks generated as a result of the quad tree partitioning. As a result, four coding blocks having a partitioning depth of 2 may be generated.

In addition, coding blocks having a partitioning depth of 3 may be generated by applying the quad tree partitioning again to a coding block having a partitioning depth of 2.

When quad tree partitioning is not applied to the coding block, whether binary tree partitioning or ternary tree partitioning is performed on the coding block may be determined considering at least one among the size of the coding block, whether the coding block is positioned at the picture boundary, the maximum partitioning depth, and the partitioning type of a neighboring block. When it is determined to perform binary tree partitioning or ternary tree partitioning on the coding block, information indicating the partitioning direction may be signaled through a bitstream. The information may be a 1-bit flag of mtt_split_cu_vertical_flag. Based on the flag, whether the partitioning direction is a vertical direction or a horizontal direction may be determined. Additionally, information indicating whether binary tree partitioning or ternary tree partitioning is applied to the coding block may be signaled through a bitstream. The information may be a 1-bit flag of mtt_split_cu_binary_flag. Based on the flag, whether binary tree partitioning or ternary tree partitioning is applied to the coding block may be determined.

For example, in the example shown in FIG. 5, it is shown that vertical direction binary tree partitioning is applied to a coding block having a partitioning depth of 1, vertical direction ternary tree partitioning is applied to the left-side coding block among the coding blocks generated as a result of the partitioning, and vertical direction binary tree partitioning is applied to the right-side coding block.

Inter prediction is a prediction encoding mode that predicts a current block by using information of a previous picture. For example, a block at the same position as the current block in the previous picture (hereinafter, a collocated block) may be set as the prediction block of the current block. Hereinafter, a prediction block generated based on a block at the same position as the current block will be referred to as a collocated prediction block.

On the other hand, when an object existing in the previous picture has moved to another position in the current picture, the current block may be effectively predicted by using a motion of the object. For example, when the moving direction and the size of an object can be known by comparing the previous picture and the current picture, a prediction block (or a prediction picture) of the current block may be generated considering motion information of the object. Hereinafter, the prediction block generated using motion information may be referred to as a motion prediction block.

A residual block may be generated by subtracting the prediction block from the current block. At this point, when there is a motion of an object, the energy of the residual block may be reduced by using the motion prediction block instead of the collocated prediction block, and therefore, compression performance of the residual block can be improved.

As described above, generating a prediction block by using motion information may be referred to as motion compensation prediction. In most inter prediction, a prediction block may be generated based on the motion compensation prediction.

The motion information may include at least one among a motion vector, a reference picture index, a prediction direction, and a bidirectional weight index. The motion vector indicates the moving direction and the size of an object. The reference picture index specifies a reference picture of the current block among reference pictures included in a reference picture list. The prediction direction indicates any one among unidirectional L0 prediction, unidirectional L1 prediction, and bidirectional prediction (L0 prediction and L1 prediction). According to the prediction direction of the current block, at least one among motion information in the L0 direction and motion information in the L1 direction may be used. The bidirectional weight index specifies a weighting value applied to a L0 prediction block and a weighting value applied to a L1 prediction block.

Figure 6:
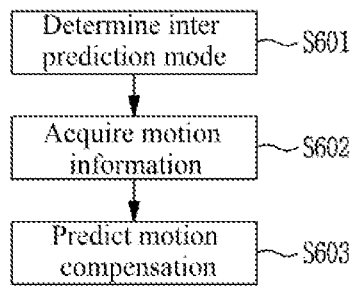
FIG. 6 is a flowchart illustrating an inter prediction method according to an embodiment of the present disclosure.

FIG. 6 is a flowchart illustrating an inter prediction method according to an embodiment of the present disclosure.

Referring to FIG. 6, the inter prediction method includes the steps of determining an inter prediction mode of a current block (S601), acquiring motion information of the current block according to the determined inter prediction mode (S602), and performing motion compensation prediction for the current block based on the acquired motion information (S603).

Here, the inter prediction mode represents various techniques for determining motion information of the current block, and may include an inter prediction mode that uses translational motion information and an inter prediction mode that uses affine motion information. For example, the inter prediction mode using translational motion information may include a merge mode and a motion vector prediction mode, and the inter prediction mode using affine motion information may include an affine merge mode and an affine motion vector prediction mode. The motion information of the current block may be determined based on a neighboring block adjacent to the current block or information parsed from a bitstream according to the inter prediction mode.

Figure 7:
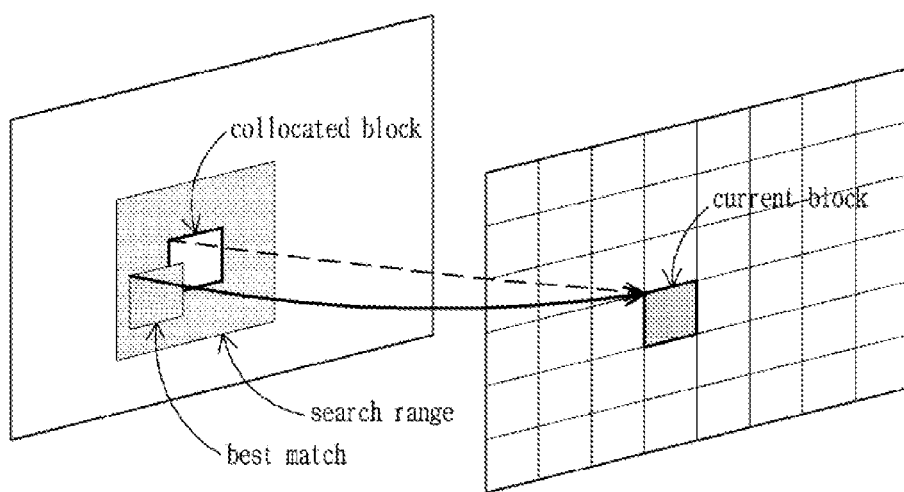
FIG. 7 is a view showing a collocated block.

For example, the motion information of the current block may be derived based on motion information of a spatially neighboring block included in a picture the same as the current block or a collocated block included in a picture different from the current block. The spatially neighboring block includes at least one among a neighboring block adjacent to the top of the current block, a neighboring block adjacent to the left side, a neighboring block adjacent to the top-left corner, a neighboring block adjacent to the top-right corner, and a neighboring block adjacent to the bottom-left corner. The collocated block may have a position and a size the same as those of the current block in a collocated picture. For example, FIG. 7 is a view showing a collocated block. The collocated picture may be specified by index information indicating any one of the reference pictures.

Any one among a plurality of motion vector precision candidates may be determined as the precision of the motion vector of the current block. For example, a motion vector precision candidate may include at least one among octo pel, quarter pel, half pel, integer pel, 2-integer pel, and 4-integer pel. The number or type of motion vector precision candidates may be determined by the unit of sequence, slice, or block. For example, information for determining the number or type of motion vector precision candidates may be signaled through a bitstream. Alternatively, the number or type of motion vector precision candidates may be determined based on whether the inter prediction mode or the affine motion model of the current block is used. Information for specifying any one among a plurality of motion vector precision candidates may be signaled through a bitstream.

Intra prediction is for predicting a current block using reconstructed samples that have been encoded/decoded in the neighborhood of the current block. At this point, samples reconstructed before an in-loop filter is applied may be used for intra prediction of the current block.

The intra prediction technique includes matrix-based intra prediction, and general intra prediction considering directionality with respect to neighboring reconstructed samples. Information indicating the intra prediction technique of the current block may be signaled through a bitstream. The information may be a 1-bit flag. Alternatively, the intra prediction technique of the current block may be determined based on at least one among the position of the current block, the size of the current block, the shape of the current block, and an intra prediction technique of a neighboring block. For example, when the current block exists across a picture boundary, it may be set not to apply the matrix-based intra prediction intra prediction to the current block.

The matrix-based intra prediction intra prediction is a method of acquiring a prediction block of the current block by an encoder and a decoder based on a matrix product between a previously stored matrix and reconstructed samples in the neighborhood of the current block. Information for specifying any one among a plurality of previously stored matrixes may be signaled through a bitstream. The decoder may determine a matrix for intra prediction of the current block based on the information and the size of the current block.

The general intra prediction is a method of acquiring a prediction block for the current block based on a non-angular intra prediction mode or an angular intra prediction mode. Hereinafter, a process of performing intra prediction based on general intra prediction will be described in more detail with reference to the drawings.

Figure 8:
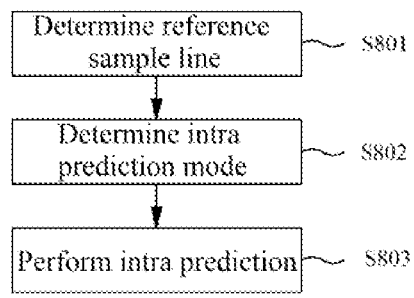
FIG. 8 is a flowchart illustrating an intra prediction method according to an embodiment of the present disclosure.

FIG. 8 is a flowchart illustrating an intra prediction method according to an embodiment of the present disclosure.

A reference sample line of the current block may be determined (S801). The reference sample line means a set of reference samples included in a k-th line apart from the top and/or the left side of the current block. The reference samples may be derived from reconstructed samples that have been encoded/decoded in the neighborhood of the current block.

Index information for identifying the reference sample line of the current block among a plurality of reference sample lines may be signaled through a bitstream. For example, index information intra_luma_ref_idx for specifying the reference sample line of the current block may be signaled through a bitstream. The index information may be signaled by the unit of coding block.

The plurality of reference sample lines may include at least one among a first line, a second line, a third line, and a fourth line on the top and/or left side of the current block. A reference sample line configured of a row adjacent to the top of the current block and a column adjacent to the left side of the current block among the plurality of reference sample lines is referred to as an adjacent reference sample line, and the other reference sample lines may be referred to as non-adjacent reference sample lines.

Figure 9:
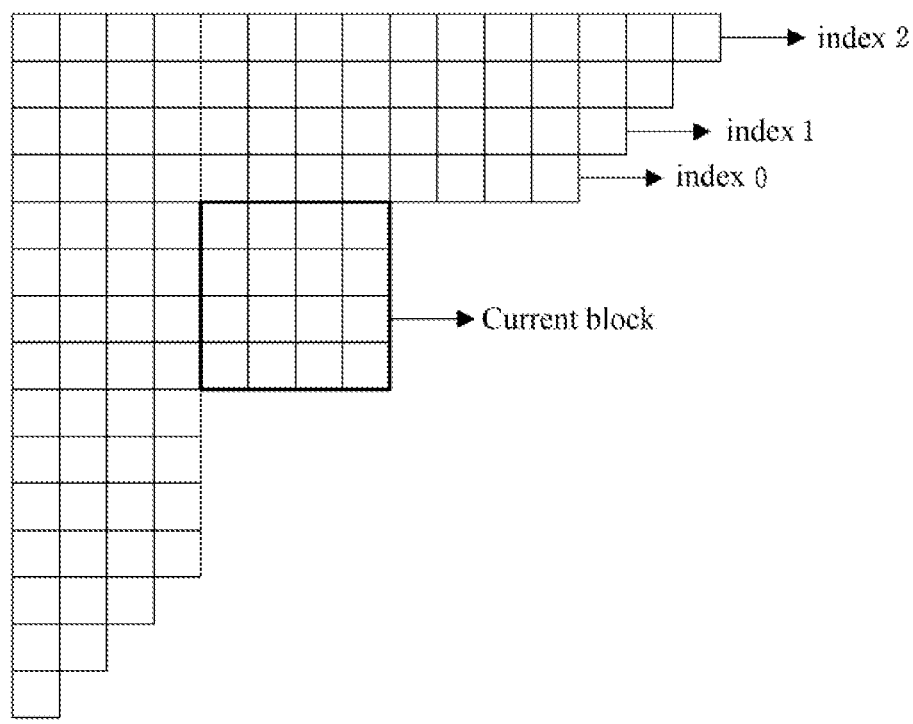
FIG. 9 is a view showing reference samples included in each reference sample line.

FIG. 9 is a view showing reference samples.

FIG. 9 shows one adjacent reference sample line configured of rows and columns adjacent to the current block and three non-adjacent reference sample lines configured of rows and columns not adjacent to the current block.

Only some of the plurality of reference sample lines may be selected as the reference sample line of the current block. For example, remaining reference sample lines excluding a second non-adjacent reference sample line among the reference sample lines shown in FIG. 9 may be set as candidate reference sample lines. Table 1 shows indexes respectively assigned to candidate reference sample lines.

TABLE 1

| Indexes (intra_luma_ref_idx) | Reference sample lines |
| --- | --- |
| 0 | Adjacent reference sample |
| 1 | First non-adjacent reference sample line |
| 2 | Second non-adjacent reference sample line |

A larger number of candidate reference sample lines or a smaller number of candidate reference sample lines than the candidate reference sample lines described above may be set. In addition, the number or positions of non-adjacent reference sample lines set as candidate reference sample lines is not limited to the example described above. For example, a first non-adjacent reference sample line and a third non-adjacent reference sample line may be set as candidate reference sample lines, or a second non-adjacent reference sample line and a third non-adjacent reference sample line may be set as candidate reference sample lines. Alternatively, all of the first non-adjacent reference sample line, the second non-adjacent reference sample line, and the third non-adjacent reference sample line may be set as candidate reference sample lines.

The number or types of candidate reference sample lines may be determined based on at least one among the size of the current block, the shape of the current block, the position of the current block, whether or not the current block is partitioned into subblocks, and the intra prediction mode of the current block.

The reference sample line of the current block may be determined based on at least one among the position of the current block, the size of the current block, the shape of the current block, and a prediction encoding mode of a neighboring block. For example, when the current block is in contact with the boundary of a picture, a tile, a slice, or a coding tree unit, the adjacent reference sample line may be determined as the reference sample line of the current block.

Alternatively, when the current block is a non-square shape, an adjacent reference sample line may be determined as the reference sample line of the current block. Alternatively, when the width to height ratio of the current block is higher than a threshold value or lower than a threshold value, the adjacent reference sample line may be determined as the reference sample line of the current block.

The reference sample line may include top reference samples positioned on the top of the current block and left reference samples positioned on the left side of the current block. The top reference samples and the left reference samples may be derived from reconstructed samples in the neighborhood of the current block. The reconstructed samples may be in a state before the in-loop filter is applied.

The number of reference samples included in a reference sample line may be determined based on the distance between reference sample lines. For example, the number of reference samples included in a reference sample line having a distance of i from the current block may be larger than the number of reference samples included in a reference sample line having a distance of i−1 from the current block. Accordingly, the number of reference samples included in a non-adjacent reference sample line may be larger than the number of reference samples included in an adjacent reference sample line.

The difference between the number of reference samples included in a non-adjacent reference sample line having a distance of i from the current block and the number of reference samples included in an adjacent reference sample line may be defined as a reference sample number offset. At this point, a difference in the number of top reference samples positioned on the top of the current block may be defined as offsetX[i], and a difference in the number of left reference samples positioned on the left side of the current block may be defined as offsetY[i]. offsetX and offsetY may be determined based on the distance between the current block and the non-adjacent reference sample line. For example, offsetX and offsetY may be set to an integer multiple of i. For example, offsetX[i] and offset[i] may be 2i.

Alternatively, the reference sample number offset may be determined based on the width to height ratio of the current block. Equation 1 shows an example of quantifying the width to height ratio of the current block.

$$whRatio = \log_2(nTbW/nTbH) \quad \text{[Equation 1]}$$

It is also possible to quantify the width to height ratio of the current block in a method different from that expressed in Equation 1.

Values of offsetX and offsetY may be determined based on the width to height ratio of the current block. For example, when the value of whRatio is larger than 1, the value of offsetX may be set to be larger than the value of offsetY. For example, the value of offsetX may be set to 1, and the value of offsetY may be set to 0. On the other hand, when the value of whRatio is smaller than 1, the value of offsetY may be set to be larger than the value of offsetX. For example, the value of offsetX may be set to 0, and the value of offsetY may be set to 1.

Excluding the top-left reference sample having the same x-axis and y-axis coordinates, a non-adjacent reference sample line having a distance of i from the current block may be configured of top reference samples as many as (refW+offsetX[i]) and left reference samples as many as (refH+offsetY[i]). Here, refW and refH denotes the length of an adjacent reference sample line, and may be set as shown in Equations 2 and 3, respectively.

$$refW = 2*nTbW \quad \text{[Equation 2]}$$

$$refH = 2*nTbH \quad \text{[Equation 3]}$$

In Equations 2 and 3, nTbW denotes the width of a coding block or a transform block on which intra prediction is performed, and nTbH denotes the height of a coding block or a transform block on which intra prediction is performed.

As a result, the reference sample line of which the distance from the current block is i may be configured of reference samples as many as (refW+refH+offsetX[i]+offsetY[i]+1).

According to the intra prediction mode of the current block, a prediction sample may be acquired by using at least one among reference samples belonging to a reference sample line.

Next, the intra prediction mode of the current block may be determined (S802). As for the intra prediction mode of the current block, at least one among a non-angular intra prediction mode and an angular intra prediction mode may be determined as the intra prediction mode of the current block. The non-angular intra prediction mode includes a planar mode and a DC mode, and the angular intra prediction mode includes 33 or 65 modes between the bottom-left diagonal direction and the top-right diagonal direction.

Figure 10:
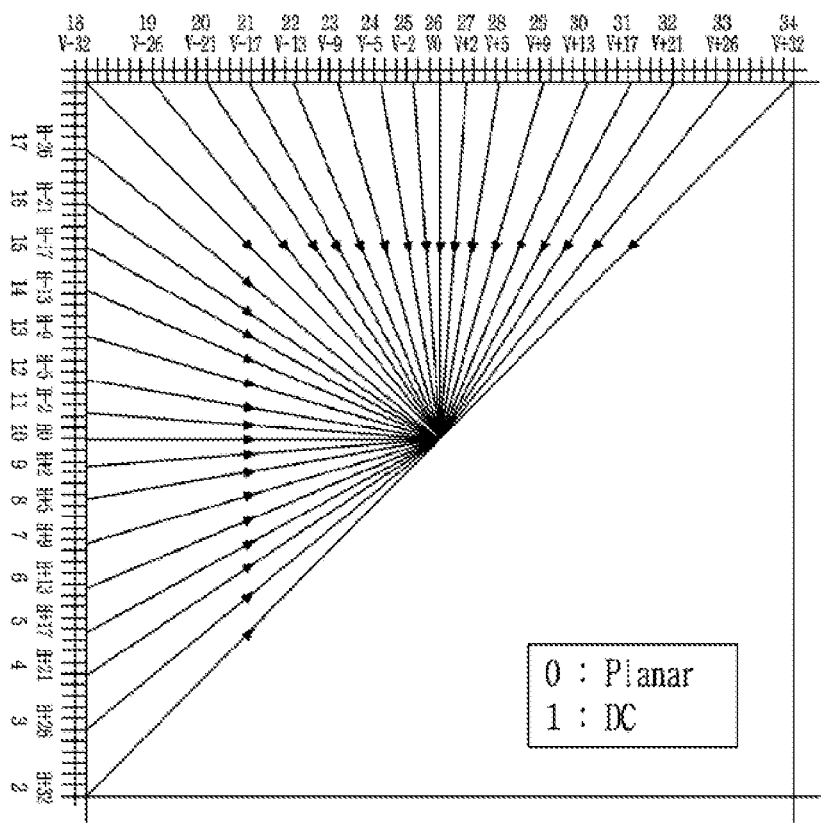
FIG. 10 is a view showing intra prediction modes.
Figure 10:
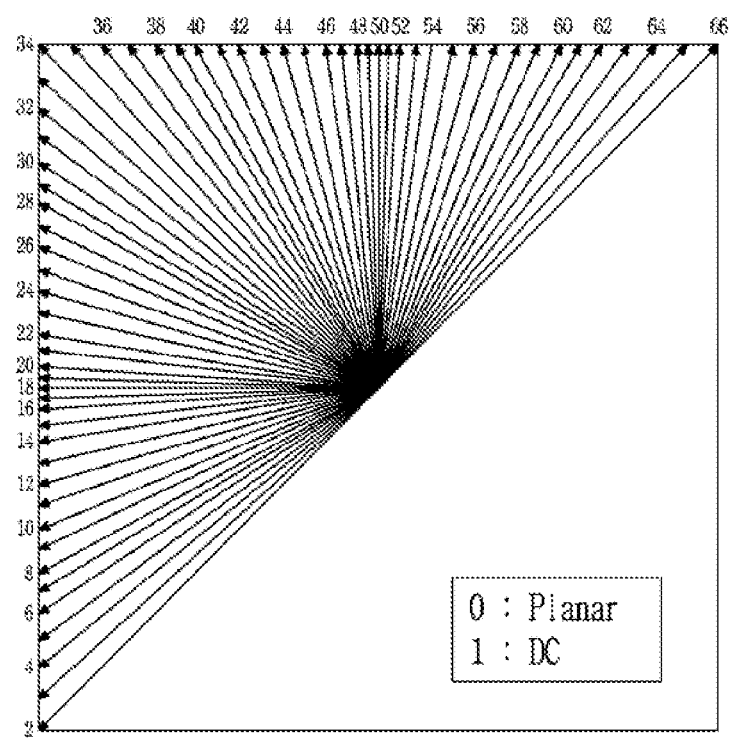

FIG. 10 is a view showing intra prediction modes.

FIG. 10 (*a*) shows 35 intra prediction modes, and FIG. 10 (*b*) shows 67 intra prediction modes.

A larger or smaller number of intra prediction modes than those shown in FIG. 10 may be defined.

A Most Probable Mode (MPM) may be set based on the intra prediction mode of a neighboring block adjacent to the current block. Here, the neighboring block may include a left neighboring block adjacent to the left side of the current block and a top neighboring block adjacent to the top of the current block. When the coordinates of the top-left sample of the current block are (0, 0), the left neighboring block may include a sample at the position of (−1, 0), (−1, H−1) or (−1, (H−1)/2). Here, H denotes the height of the current block. The top neighboring block may include a sample at the position of (0, −1), (W−1, −1) or ((W−1)/2, −1). Here, W denotes the width of the current block.

When the neighboring block is encoded by normal intra prediction, the MPM may be derived based on the intra prediction mode of the neighboring block. Specifically, the intra prediction mode of the left neighboring block may be set to variable candIntraPredModeA, and the intra prediction mode of the top neighboring block may be set to variable candIntraPredModeB.

At this point, when the neighboring block is unavailable (e.g., when the neighboring block is not yet encoded/decoded or when the position of the neighboring block is outside the picture boundary), when the neighboring block is encoded by matrix-based intra prediction, when the neighboring block is encoded by inter prediction, or when the neighboring block is included in a coding tree unit different from the current block, variable candIntraPredModeX (here, X is A or B) derived based on the intra prediction mode of the neighboring block may be set as a default mode. Here, the default mode may include at least one among a planar mode, a DC mode, a vertical direction mode, and a horizontal direction mode.

Alternatively, when the neighboring block is encoded by matrix-based intra prediction, an intra prediction mode corresponding to an index value for specifying any one among the matrixes may be set to candIntraPredModeX. To this end, a lookup table showing the mapping relation between index values for specifying a matrix and intra prediction modes may be previously stored in the encoder and the decoder.

MPMs may be derived based on variable candIntraPredModeA and variable candIntraPredModeB. For example, candIntraPredModeA and candIntraPredModeB may be set as MPMs, or an intra prediction mode similar to a larger or smaller value of candIntraPredModeA or candIntraPredModeB may be set as an MPM. Here, an intra prediction mode similar to candIntraPredModeX (X is A or B) may be an intra prediction mode of which the value of index difference with candIntraPredModeX is ±1 or ±2.

The number of MPMs included in an MPM list may be previously set in the encoder and the decoder. The number of MPMs included in the MPM list may be preset in the encoder and the decoder. For example, the number of MPMs may be 3, 4, 5 or 6. Alternatively, information indicating the number of MPMs may be signaled through a bitstream. Alternatively, the number of MPMs may be determined based on at least one among the prediction encoding mode of a neighboring block, and the size, the shape, and the reference sample line index of the current block. For example, when an adjacent reference sample line is determined as the reference sample line of the current block, N MPMs may be used, whereas when a non-adjacent reference sample line is determined as the reference sample line of the current block, M MPMs may be used. M is a natural number smaller than N, and for example, N may be 6, and M may be 5, 4 or 3. Accordingly, when the index of the reference sample line of the current block is 0 and the MPM flag is true, any one among 6 candidate intra prediction modes may be determined as the intra prediction mode of the current block, whereas when the index of the reference sample line of the current block is larger than 0 and the MPM flag is true, any one among 5 candidate intra prediction modes may be determined as the intra prediction mode of the current block.

Alternatively, a fixed number (e.g., 6 or 5) of MPM candidates may be used regardless of the index of the reference sample line of the current block.

In the embodiments described below, it is assumed that the number of MPMs is 6, and the 6 MPMs are referred to as MPM[0], MPM[1], MPM[2], MPM[3], MPM[4], and MPM[5]. An embodiment in which the number of MPMs is smaller than 6 may be implemented by using only some of the 6 MPMs described in the embodiments described below. Alternatively, an embodiment in which the number of MPMs is larger than 6 may be implemented to include 6 MPMs described in the embodiments described below.

Initial values of the MPMs may be set to a non-angular intra prediction mode or an angular intra prediction mode different from candIntraPredModeA and candIntraPredModeA. Here, the angular intra prediction mode that can be set as an MPM may include at least one among an intra prediction mode of the vertical direction, an intra prediction mode of the horizontal direction, an intra prediction mode of the bottom-left diagonal direction, an intra prediction mode of the top-left diagonal direction, and an intra prediction mode of the top-right diagonal direction. For example, the initial values of the MPMs may be set as follows.

MPM[0]=candIntraPredModeA
MPM[1]=(candIntraPredModeA==INTRA_PLANAR)? INTRA_DC:INTRA_PLANAR
MPM[2]=INTRA_ANGULAR50
MPM[3]=INTRA_ANGULAR18
MPM[4]=INTRA_ANGULAR2
MPM[5]=INTRA_ANGULAR34

In the example described above, ((A)? B: C) represents a function that returns a value of B when the condition disclosed in A is true and returns a value of C when the condition disclosed in A is false.

When candIntraPredModeA and candIntraPredModeB are the same and candIntraPredModeA is an angular intra prediction mode, MPM[0] may be set to candIntraPredModeA, and MPMs may be set to intra prediction modes similar to candIntraPredModeA. An intra prediction mode similar to candIntraPredModeA may be an intra prediction mode of which the value of index difference with candIntraPredModeA is ±1 or ±2. A modulo operation (%) and an offset may be used to derive the intra prediction mode similar to candIntraPredModeA. In addition, the MPM may be set to at least one among a non-angular intra prediction mode and an intra prediction mode of which the angular difference from candIntraPredModeA is a predefined value. Here, the intra prediction mode of which the angular difference from candIntraPredModeA is a predefined value may be an intra prediction mode perpendicular to candIntraPredModeA or an intra prediction mode of a direction opposite to that of candIntraPredModeA. For example, MPMs may be derived as follows.

MPM[0]=candIntraPredModeA
MPM[1]=INTRA_PLANAR
MPM[2]=INTRA_DC
MPM[3]=2+((candIntraPredModeA+62) % 65)
MPM[4]=2+((candIntraPredModeA−1) % 65)
MPM[5]=2+((candIntraPredModeA+94) % 65)

MPM[3] corresponds to (candIntraPredModeA−1), and MPM[4] corresponds to (candIntraPredModeA+1). MPM[5] indicates an intra prediction mode perpendicular to candIntraPredModeA.

When candIntraPredModeA and candIntraPredModeB are different from each other, candIntraPredModeA and candIntraPredModeB may be set as MPM[0] and MPM[1], respectively. Alternatively, candIntraPredA is compared with candIntraPredModeB, and the maximum value may be set as MPM[0], and the minimum value may be set as MPM[1]. Contrarily, it is also possible to set the minimum value as MPM[0] and the maximum value as MPM[1].

At this point, when both candIntraPredModeA and candIntraPredModeB are angular intra prediction modes, the non-angular intra prediction mode may be set as an MPM. For example, planar and DC modes may be set as MPM[2] and MPM[3], respectively.

Additionally, an intra prediction mode similar to any one among candIntraPredModeA and candIntraPredModeB having a larger or smaller value may be set as an MPM. The intra prediction mode similar to candIntraPredModeX may be derived by adding or subtracting an offset to or from candIntraPredModeX. At this point, the maximum magnitude of the offset may be determined based on the difference between a maximum value and a minimum value of candIntraPredModeA and candIntraPredModeB. For example, the offset may be a natural number such as 1 or 2.

For example, when a value of difference obtained by subtracting MIN(candIntraPredModeA, candIntraPredModeB) from MAX(candIntraPredModeA, candIntraPredModeB) is not 64 or 1, MPM[4] and MPM[5] may be derived as follows.

MPM[4]=2+((MAX(MPM[0], MPM[1])+62) % 65
MPM[5]=2+((MAX(MPM[0], MPM[1])−1) % 65

Here, function MAX(A, B) is a function that returns a larger value among A and B, and function MIN(A, B) is a function that returns a smaller value among A and B. MPM[4] corresponds to (MAX(MPM[0], MPM[1])−1), and MPM[5] corresponds to (MAX(MPM[0], MPM[1])+1). On the other hand, when a value of difference obtained by subtracting MIN (candIntraPredModeA, candIntraPredModeB) from MAX (candIntraPredModeA, candIntraPredModeB) is 64 or 1, MPM[4] and MPM[5] may be derived as follows.

MPM[4]=2+(MAX(MPM[0], MPM[1])+61) % 65
MPM[5]=2+MAX(MPM[0], MPM[1]) % 65
MPM[4] corresponds to (MAX(MPM[0], MPM[1])−2), and MPM[5] corresponds to (MAX(MPM[0], MPM[1])+2).

When one among candIntraPredModeA and candIntraPredModeB is an angular intra prediction mode while the other one is a non-angular intra prediction mode, at least one among a non-angular intra prediction mode that is not equal to MIN(candIntraPredModeA, candIntrapredModeB), an angular intra prediction mode that is similar to MAX(candIntraPredModeA, candIntraPredModeB), and an intra prediction mode of which the angular difference from MAX (candIntraPredModeA, candIntraPredModeB) is a predefined value may be set as an MPM. For example, MPM[2] to MPM[5] may be derived as follows.

MPM[2]=! MIN(MPM[0], MPM[1])
MPM[3]=2+((MAX(MPM[0], MPM[1])+62) % 65
MPM[4]=2+((MAX(MPM[0], MPM[1])−1) % 65
MPM[5]=2+((MAX(MPM[0], MPM[1])+94) % 65

MPM[2] indicates a non-angular intra prediction mode that is not the same as MPM[0] or MPM[1]. For example, when MIN(MPM[0], MPM[1]) is a DC mode, MPM[2] is set to a planar mode, and when MIN(MPM[0], MPM[1]) is a planar mode, MPM[2] is set to a DC mode. MPM[3] corresponds to ((MAX(MPM[0], MPM[1])−1), and MPM[4] corresponds to ((MAX(MPM[0], MPM[1])+1). MPM[5] indicates an intra prediction mode perpendicular to (MAX(MPM[0], MPM[1]). Unlike the examples listed above, an MPM derived by adding or subtracting 2 to or from MAX (MPM[0], MPM[1]) may be added to the MPM list.

When any one among candIntraPredA and candIntraPredB is a non-angular intra mode, and the other one is an angular intra prediction mode, i.e., any one among candIntraPredA and PredIntraPredB is smaller than 2 and the other one is equal to or larger than 2, the maximum value among candIntraPredA and candIntraPredB may be set as an MPM. In addition, an intra prediction mode similar to the maximum value or an intra prediction mode perpendicular to the maximum value may be set as an MPM. For example, MPM[0] to MPM[5] may be derived as follows.

MPM[0]=MAX(candIntraPredA, candIntraPredB)
MPM[1]=INTRA_PLANAR
MPM[2]=INTRA_DC
MPM[3]=2+((MAX(candIntraPredA, candIntraPredB)+62) % 65
MPM[4]=2+((MAX(candIntraPredA, candIntraPredB])−1) % 65
MPM[5]=2+((MAX(candIntraPredA, candIntraPredB)+94) % 65

MPM[3] corresponds to (MAX(candIntraPredA, candIntraPredB)−1), and MPM[4] corresponds to (MAX(candIntraPredA, candIntraPredB)+1). MPM[5] indicates an intra prediction mode perpendicular to MAX(candIntraPredA, candIntraPredB). Unlike the examples listed above, an MPM derived by adding or subtracting 2 to or from MAX (candIntraPredA, candIntraPredB) may be added to the MPM list.

MPMs may be derived considering the index of the reference sample line of the current block. Particularly, when a non-adjacent reference sample line is determined as the reference sample line of the current block, a non-angular prediction mode such as a planar or DC mode may not be set as an MPM. For example, the initial values of the MPMs may be set as follows according to whether an adjacent reference sample line is determined as the reference sample line of the current block.

MPM[0]=(IntraLumaRefLineIdx==0)? candIntraPredModeA:INTRA_ANGULAR2
MPM[1]=(IntraLumaRefLineIdx==0)? (candIntraPredModeA:==INTRA_PLANAR? INTRA_DC:INTRA_PLANAR):INTRA_ANGULAR18
MPM[2]=INTRA_ANGULAR50
MPM[3]=(IntraLumaRefLineIdx==0)? INTRA_ANGULAR18:INTRA_ANGULAR34
MPM[4]=(IntraLumaRefLineIdx==0)? INTRA_ANGULAR2:INTRA_ANGULAR66
MPM[5]=(IntraLumaRefLineIdx==0)? INTRA_ANGULAR34:INTRA_ANGULAR42

When the reference sample line of the current block is a non-adjacent reference sample line, and both candIntraPredModeA and candIntraPredModeB are angular intra prediction modes, MPMs may be derived as follows.

MPM[0]=candIntraPredModeA
MPM[1]=candIntraPredModeB
MPM[2]=INTRA_ANGULAR2
MPM[3]=INTRA_ANGULAR18
MPM[4]=INTRA_ANGULAR50
MPM[5]=INTRA_ANGULAR34

When the reference sample line of the current block is a non-adjacent reference sample line, and any one among candIntraPredModeA and candIntraPredModeB is a non-angular intra prediction mode, and the other one is an angular intra prediction mode, MPMs may be derived as follows.

MPM[0]=MAX(candIntraPredModeA, candIntraPredModeB)
MPM[1]=INTRA_ANGULAR2
MPM[2]=INTRA_ANGULAR18
MPM[3]=INTRA_ANGULAR50
MPM[4]=INTRA_ANGULAR34
MPM[5]=INTRA_ANGULAR66

An MPM list including a plurality of MPMs is generated, and information indicating whether an MPM that is the same as the intra prediction mode of the current block is included in the MPM list may be signaled through a bitstream. The information is a 1-bit flag and may be referred to as an MPM flag. When the MPM flag indicates that an MPM the same as that of the current block is included in the MPM list, index information identifying one among the MPMs may be signaled through a bitstream. For example, index information mpm_idx specifying any one among the plurality of MPMs may be signaled through a bitstream. The MPM specified by the index information may be set as the intra prediction mode of the current block. When the MPM flag indicates that an MPM the same as that of the current block is not included in the MPM list, residual mode information indicating any one among residual intra prediction modes other than MPMs may be signaled through a bitstream. The residual mode information indicates an index value corresponding to the intra prediction mode of the current block when indexes are reassigned to the residual intra prediction modes excluding the MPMs. The decoder may arrange the MPMs in ascending order and determine the intra prediction mode of the current block by comparing the residual mode information with the MPMs. For example, when the residual mode information is equal to or smaller than the MPM, the intra prediction mode of the current block may be derived by adding 1 to the residual mode information.

When the intra prediction mode of the current block is derived, comparison between some of the MPMs and the residual mode information may be omitted. For example, among the MPMs, MPMs of non-angular intra prediction mode may be excluded from comparison targets. When non-angular intra prediction modes are set as MPMs, it is clear that the residual mode information indicates the angular intra prediction mode, and thus the intra prediction mode of the current block may be derived through comparison between the residual MPMs excluding the non-angular intra prediction modes and the residual mode information. Instead of excluding the non-angular intra prediction modes from the comparison targets, the number of the non-angular intra prediction modes is added to the residual mode information, and then a result value of the comparison may be compared with the residual MPMs.

Instead of setting the default mode to MPM, information indicating whether or not the intra prediction mode of the current block is the default mode may be signaled through a bitstream. The information is a 1-bit flag, and the flag may be referred to as a default mode flag. The default mode flag may be signaled only when the MPM flag indicates that an MPM the same as that of the current block is included in the MPM list. As described above, the default mode may include at least one among a planar mode, a DC mode, a vertical direction mode, and a horizontal direction mode. For example, when the planar mode is set as the default mode, the default mode flag may indicate whether or not the intra prediction mode of the current block is a planar mode. When the default mode flag indicates that the intra prediction mode of the current block is not the default mode, one among the MPMs indicated by the index information may be set as the intra prediction mode of the current block.

When the default mode flag is used, it may be set not to set an intra prediction mode the same as the default mode as an MPM. For example, when the default mode flag indicates whether the intra prediction mode of the current block is a planar mode, the MPM corresponding to the planar mode among the 6 MPMs described above is replaced with another mode, or the intra prediction mode of the current block may be derived by using 5 MPMs excluding the MPM corresponding to the planar mode.

When a plurality of intra prediction modes is set as default modes, index information indicating any one among the default modes may be further signaled. The intra prediction mode of the current block may be set as the default mode indicated by the index information.

When the index of the reference sample line of the current block is not 0, it may be set not to use the default mode. For example, it may be set not to use a non-angular intra prediction mode such as a DC mode or a planar mode when a non-adjacent reference sample line is determined as the reference sample line of the current block. Accordingly, when the index of the reference sample line is not 0, the default mode flag is not signaled, and the value of the default mode flag may be set to a predefined value (i.e., false).

When the intra prediction mode of the current block is determined, prediction samples may be acquired for the current block based on the determined intra prediction mode (S803).

When the DC mode is selected, prediction samples are generated for the current block based on an average value of reference samples. Specifically, values of all the samples in a prediction block may be generated based on an average value of the reference samples. The average value may be derived using at least one among top reference samples positioned on the top of the current block and left reference samples positioned on the left side of the current block.

Depending on the shape of the current block, the number or range of the reference samples used for deriving the average value may vary. For example, when the current block is a non-square shaped block of which the width is greater than the height, the average value may be calculated using only the top reference samples. On the other hand, when the current block is a non-square shaped block of which the width is smaller than the height, the average value may be calculated using only the left reference samples. That is, when the width and the height of the current block are different, the average value may be calculated using only reference samples adjacent to the longer one. Alternatively, based on the ratio of width to height of the current block, whether or not to calculate the average value using only the top reference samples or whether or not to calculate the average value using only the left reference samples may be determined.

When the planar mode is selected, a prediction sample may be acquired using a horizontal direction prediction sample and a vertical direction prediction sample. Here, the horizontal direction prediction sample is acquired based on a left reference sample and a right reference sample positioned on a horizontal line the same as that of the prediction sample, and the vertical direction prediction sample is acquired based on a top reference sample and a bottom reference sample positioned on a vertical line the same as that of the prediction sample. Here, the right reference sample may be generated by copying a reference sample adjacent to the top-right corner of the current block, and the bottom reference sample may be generated by copying a reference sample adjacent to the bottom-left corner of the current block. The horizontal direction prediction sample may be acquired based on a weighted sum operation of the left reference sample and the right reference sample, and the vertical direction prediction sample may be acquired based on a weighted sum operation of the top reference sample and the bottom reference sample. At this point, a weighting value assigned to each reference sample may be determined according to the position of the prediction sample. The prediction sample may be acquired based on an average operation or a weighted sum operation of the horizontal direction prediction sample and the vertical direction prediction sample. When the weighted sum operation is performed, weighting values applied to the horizontal direction prediction sample and the vertical direction prediction sample may be determined based on the position of the prediction sample.

When an angular prediction mode is selected, a parameter indicating the prediction direction (or prediction angle) of the selected angular prediction mode may be determined. Table 2 shows intra direction parameter intraPredAng of each intra prediction mode.

TABLE 2

| PreModeIntraIntraPredAng | 1- | 232 | 326 | 421 | 517 | 613 | 79 |
|---|---|---|---|---|---|---|---|
| PreModeIntraIntraPredAng | 85 | 92 | 100 | 11-2 | 12-5 | 13-9 | 14-13 |
| PreModeIntraIntraPredAng | 15-17 | 16-21 | 17-26 | 18-32 | 19-26 | 20-21 | 21-17 |
| PreModeIntraIntraPredAng | 22-13 | 23-9 | 24-5 | 25-2 | 260 | 272 | 285 |
| PreModeIntraIntraPredAng | 299 | 3013 | 3117 | 3221 | 3326 | 3432 | |

When 35 intra prediction modes are defined, Table 2 shows the intra direction parameter of each intra prediction mode having an index of any one among 2 to 34. When more than 33 angular intra prediction modes are defined, Table 2 is further subdivided to set the intra direction parameter of each angular intra prediction mode.

After arranging top reference samples and left reference samples of the current block in a line, a prediction sample may be acquired based on the value of the intra direction parameter. At this point, when the value of the intra direction parameter is a negative value, the left reference samples and the top reference samples may be arranged in a line.

Figure 11:
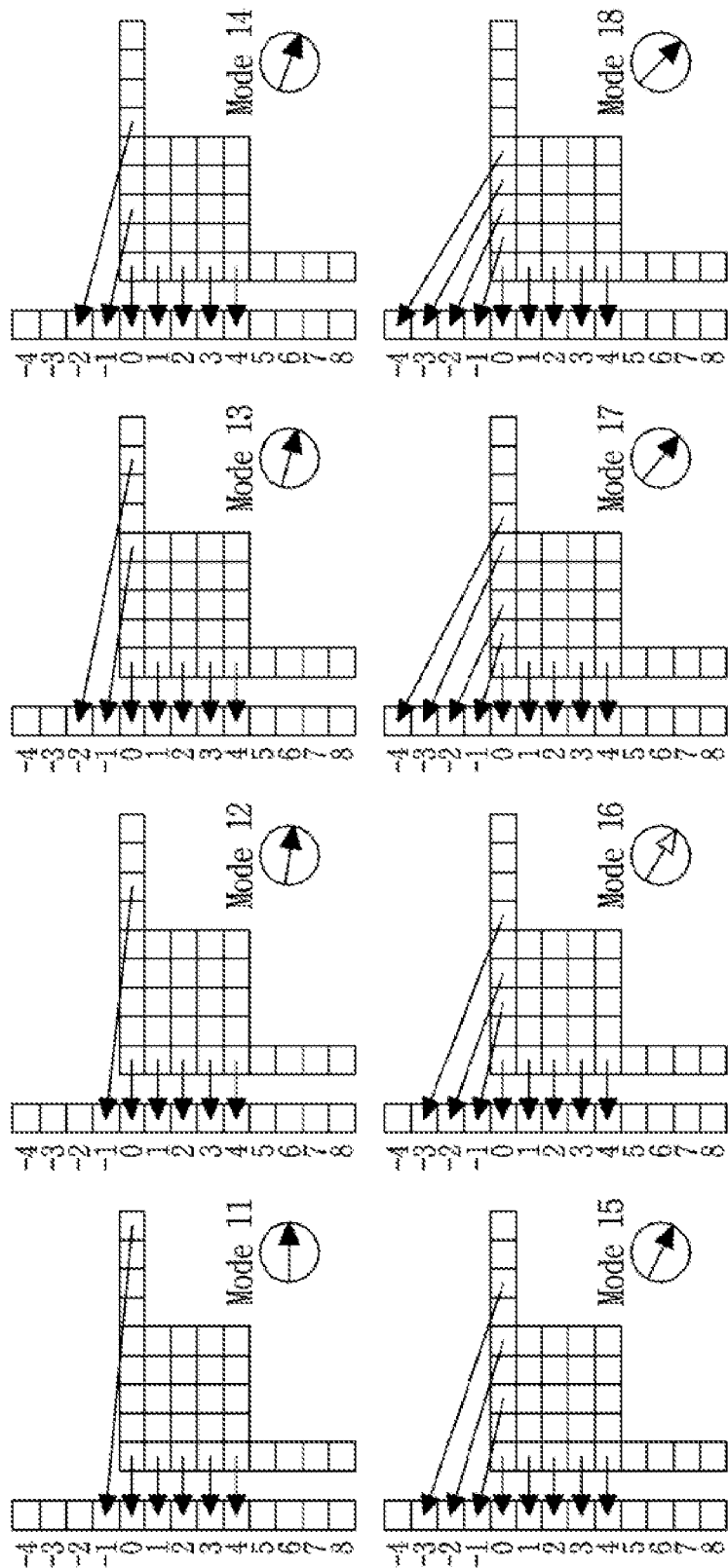
FIG. 11 is a view showing an example of a one-dimensional array arranging reference samples in a line.
Figure 12:
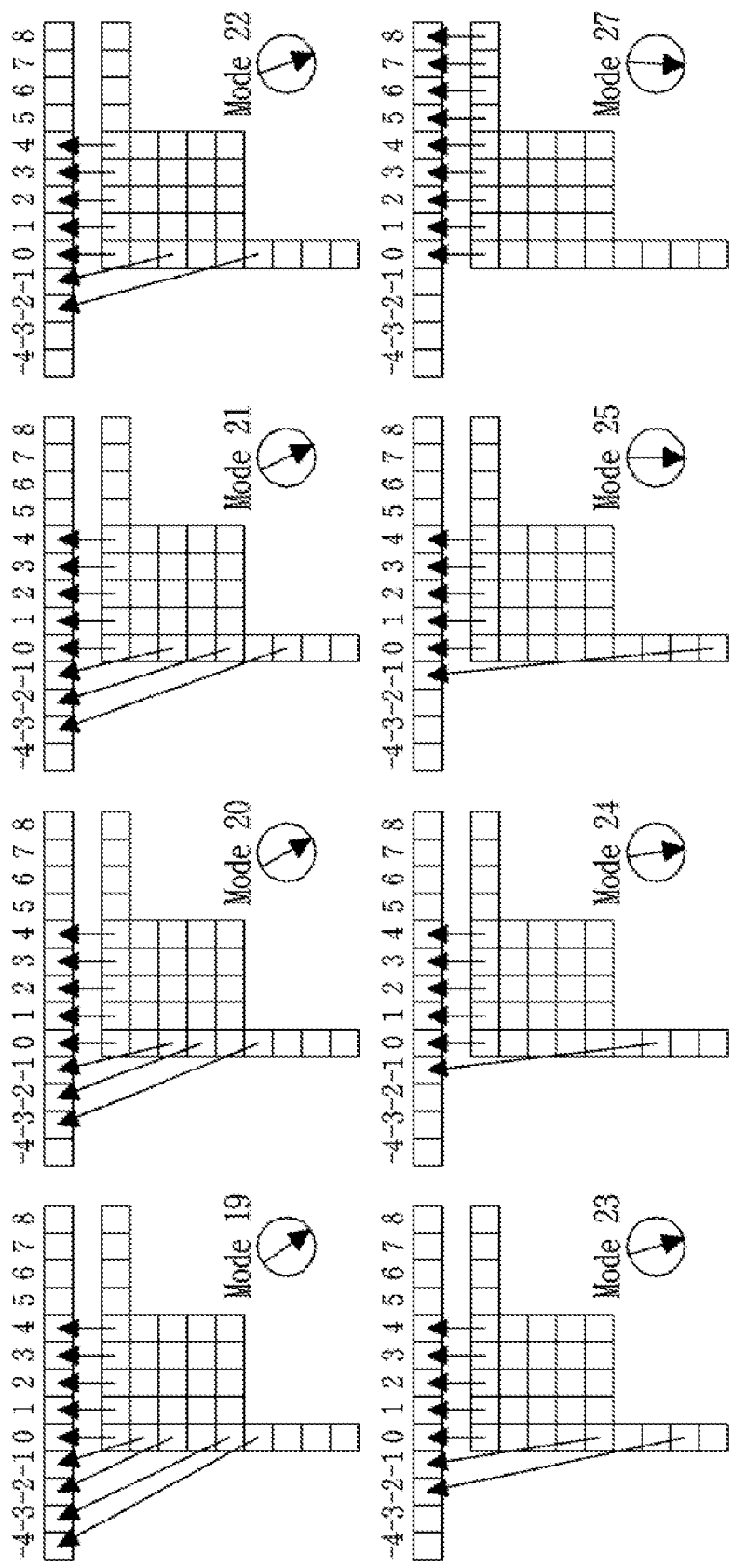
FIG. 12 is a view showing an example of a one-dimensional array arranging reference samples in a line.

FIGS. 11 and 12 are views showing an example of a one-dimensional array arranging reference samples in a line.

FIG. 11 is a view showing an example of a vertical direction one-dimensional array arranging reference samples in the vertical direction, and FIG. 12 is a view showing an example of a horizontal direction one-dimensional array arranging reference samples in the horizontal direction. The embodiments of FIGS. 11 and 12 will be described on the assumption that 35 intra prediction modes are defined.

When the intra prediction mode index is any one among 11 to 18, a horizontal direction one-dimensional array in which top reference samples are rotated counterclockwise may be applied, and when the intra prediction mode index is any one among 19 to 25, a vertical direction one-dimensional array in which left reference samples are rotated clockwise may be applied. In arranging the reference samples in a line, an intra prediction mode angle may be considered.

A reference sample determination parameter may be determined based on an intra direction parameter. The reference sample determination parameter may include a reference sample index for specifying a reference sample and a weighting value parameter for determining a weighting value applied to the reference sample.

Reference sample index iIdx and weighting value parameter $i_{fact}$ may be acquired through Equations 4 and 5 shown below, respectively.

$$iIdx=(y+1)*P_{ang}/32 \quad \text{[Equation 4]}$$

$$i_{fact}=[(y+1)*P_{ang}]\&31 \quad \text{[Equation 5]}$$

In Equations 4 and 5, $P_{ang}$ denotes an intra direction parameter. The reference sample specified by reference sample index iIdx corresponds to an integer pel.

At least one or more reference samples may be specified to derive a prediction sample. Specifically, the position of a reference sample used for deriving a prediction sample may be specified considering the slope of the prediction mode. For example, a reference sample used for deriving a prediction sample may be specified using reference sample index iIdx.

At this point, when the slope of the intra prediction mode is not expressed by one reference sample, a prediction sample may be generated by interpolating a plurality of reference samples. For example, when the slope of the intra prediction mode is a value between a slope between a prediction sample and a first reference sample and a slope between a prediction sample and a second reference sample, the prediction sample may be acquired by interpolating the first reference sample and the second reference sample. That is, when an angular line following an intra prediction angle does not pass through a reference sample positioned at an integer pel, the prediction sample may be acquired by interpolating reference samples adjacent to the left and right or up and down sides of a position where the angular line passes through.

Equation 6 shows an example of acquiring a prediction sample based on reference samples.

$$P(x,y)=((32-i_{fact})/32)*\text{Ref\_1D}(x+iIdx+1)+(i_{fact}/32)*\text{Ref\_1D}(x+iIdx+2) \quad \text{[Equation 6]}$$

In Equation 6, P denotes a prediction sample, and Ref_1D denotes any one among one-dimensionally arranged reference samples. At this point, the position of a reference sample may be determined by position (x, y) of the prediction sample and index iIdx of the reference sample.

When the slope of the intra prediction mode can be expressed as one reference sample, weighting value parameter $i_{fact}$ is set to 0. Accordingly, Equation 6 may be simplified as shown in Equation 7.

$$P(x,y)=\text{Ref\_1D}(x+iIdx+1) \quad \text{[Equation 7]}$$

Intra prediction for the current block may be performed based on a plurality of intra prediction modes. For example, an intra prediction mode may be derived for each prediction sample, and the prediction sample may be derived based on an intra prediction mode assigned to each prediction sample.

Alternatively, an intra prediction mode may be derived for each region, and intra prediction for each region may be performed based on the intra prediction mode assigned to each region. Here, the region may include at least one sample. At least one among the size and the shape of the region may be adaptively determined based on at least one among the size, the shape, and the intra prediction mode of the current block. Alternatively, at least one among the size and the shape of the region may be predefined in the encoder and the decoder to be independent from the size or the shape of the current block.

Alternatively, intra prediction may be performed based on each of a plurality of intra predictions, and a final prediction sample may be derived based on an average operation or a weighted sum operation of a plurality of prediction samples acquired through the plurality of intra predictions. For example, a first prediction sample may be acquired by performing intra prediction based on a first intra prediction mode, and a second prediction sample may be acquired by performing intra prediction based on a second intra prediction mode. Thereafter, a final prediction sample may be acquired based on an average operation or a weighted sum operation of the first prediction sample and the second prediction sample. At this point, a weighting value assigned to each of the first prediction sample and the second prediction sample may be determined considering at least one among whether or not the first intra prediction mode is a non-angular/angular prediction mode, whether or not the second intra prediction mode is a non-angular/angular prediction mode, and an intra prediction mode of a neighboring block.

The plurality of intra prediction modes may be a combination of a non-angular intra prediction mode and an angular prediction mode, a combination of angular prediction modes, or a combination of non-angular prediction modes.

Figure 13:
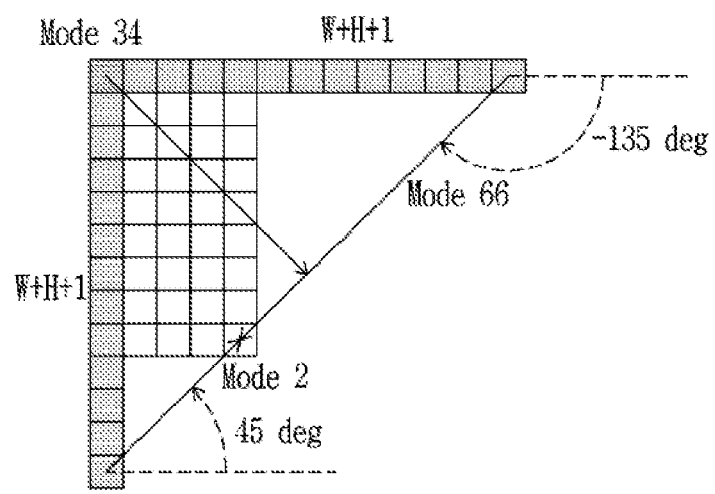
FIG. 13 is a view showing an example of angles formed between angular intra prediction modes and a straight line parallel to the x-axis.

FIG. 13 is a view showing an example of angles formed between angular intra prediction modes and a straight line parallel to the x-axis.

As shown in the example of FIG. 13, the angular prediction modes may exist between the bottom-left diagonal direction and the top-right diagonal direction. Describing in terms of an angle formed by the x-axis and the angular prediction mode, the angular prediction modes may exist between 45 degrees (bottom-left diagonal direction) and −135 degrees (top-right diagonal direction).

When the current block is a non-square shape, according to the intra prediction mode of the current block, there may be a case of deriving a prediction sample by using a reference sample farther from the prediction sample, instead of a reference sample further closer to the prediction sample, among the reference samples positioned on the angular line following the intra prediction angle.

Figure 14:
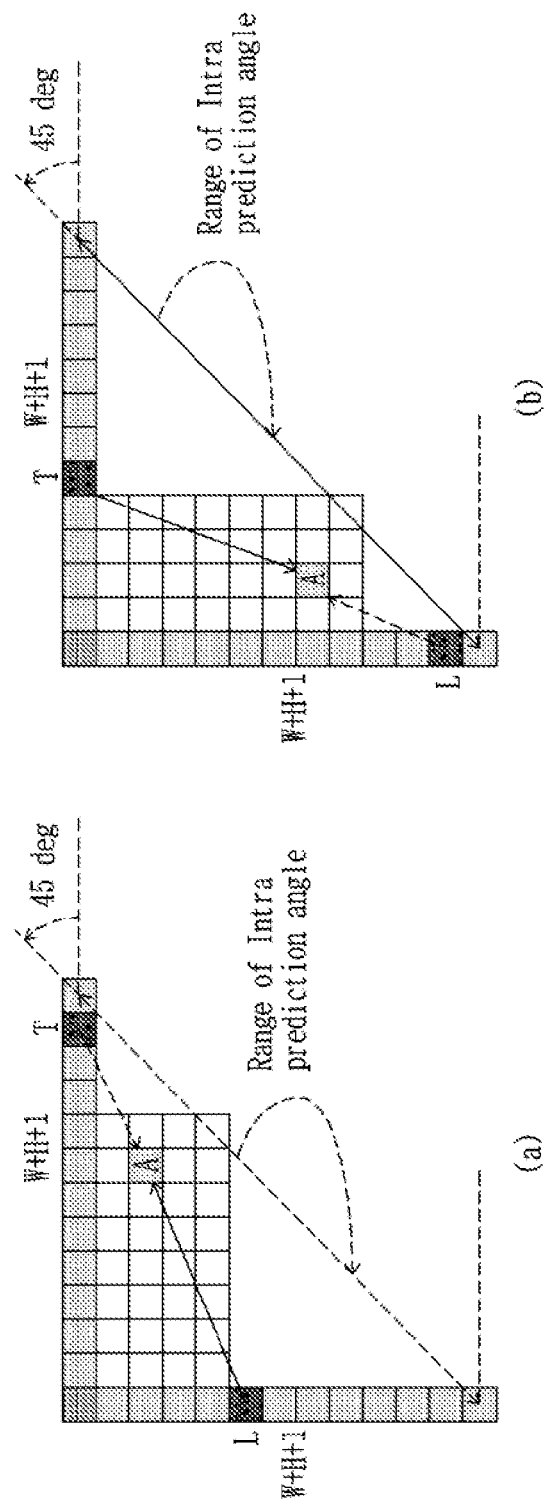
FIG. 14 is a view showing an embodiment of acquiring prediction samples when the current block is a non-square shape.

FIG. 14 is a view showing an embodiment of acquiring prediction samples when the current block is a non-square shape.

For example, as shown in the example of FIG. 14 (*a*), it is assumed that the current block is a non-square shape of which the width is greater than the height, and the intra prediction mode of the current block is an angular intra prediction mode having an angle between 0 and 45 degrees. In the above case, when prediction sample A near the right column of the current block is derived, there may be a case of using left reference sample L far from the prediction sample, instead of top reference sample T close to the prediction sample, among the reference samples positioned on an angular mode following the angle.

As another example, as shown in the example of FIG. 14 (*b*), it is assumed that the current block is a non-square shape of which the height is greater than the width, and the intra prediction mode of the current block is an angular intra prediction mode having an angle between −90 and −135 degrees. In the above case, when prediction sample A near the bottom row of the current block is derived, there may be a case of using top reference sample T far from the prediction sample, instead of left reference sample L close to the prediction sample, among the reference samples positioned on an angular mode following the angle.

To solve the problem described above, when the current block is a non-square shape, the intra prediction mode of the current block may be replaced with an intra prediction mode of the opposite direction. Accordingly, angular prediction modes having an angle greater or smaller than that of the angular prediction modes shown in FIG. 10 may be used for a non-square shaped block. The angular intra prediction mode like this may be defined as a wide-angle intra prediction mode. The wide-angle intra prediction mode represents an angular intra prediction mode that does not belong to the range of 45 to −135 degrees.

Figure 15:
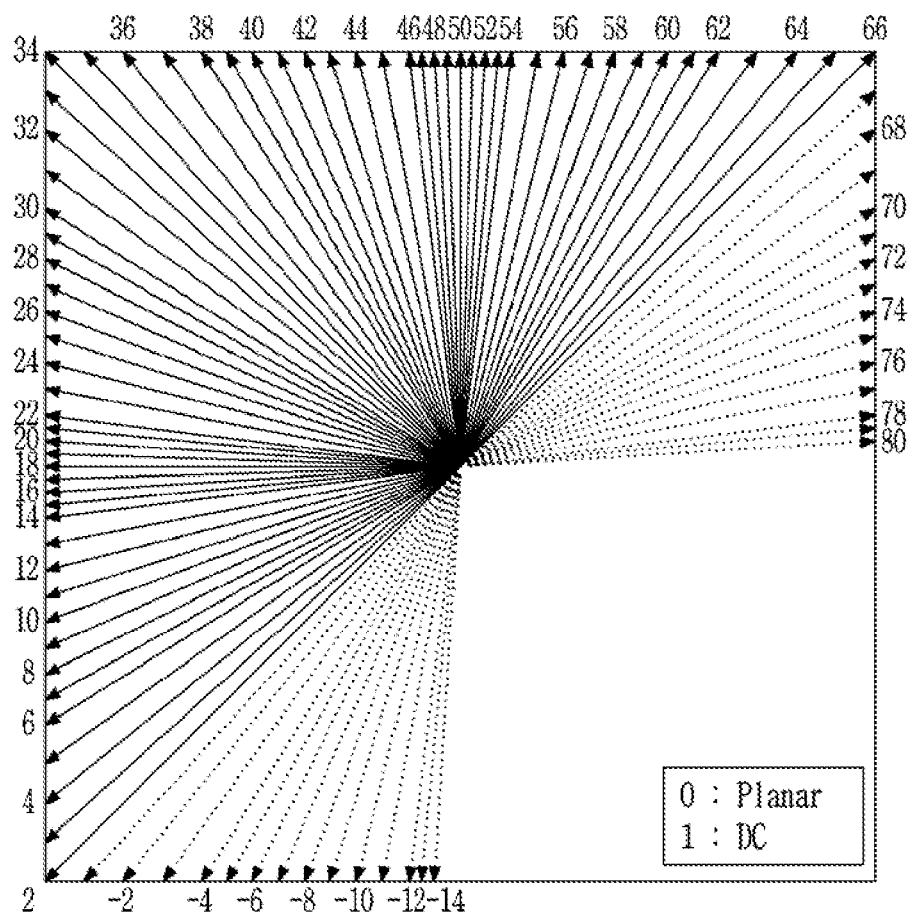
FIG. 15 is a view showing wide-angle intra prediction modes.

FIG. 15 is a view showing wide-angle intra prediction modes.

In the example shown in FIG. 15, intra prediction modes with an index of −1 to −14 and intra prediction modes with an index of 67 to 80 represent wide-angle intra prediction modes.

In FIG. 15, although 14 wide-angle intra prediction modes (−1 to −14) having an angle greater than 45 degrees and 14 wide-angle intra prediction modes (67 to 80) having an angle smaller than −135 degrees are shown, a larger or smaller number of wide-angle intra prediction modes may be defined.

When a wide-angle intra prediction mode is used, the length of top reference samples may be set to 2W+1, and the length of left reference samples may be set to 2H+1.

As a wide-angle intra prediction mode is used, sample A shown in FIG. 14 (*a*) may be predicted using reference sample T, and sample A shown in FIG. 14 (*b*) may be predicted using reference sample L.

By adding existing intra prediction modes and N wide-angle intra prediction modes, a total of 67+N intra prediction modes can be used. For example, Table 3 shows intra direction parameters of intra prediction modes when 20 wide-angle intra prediction modes are defined.

TABLE 3

| | PreModeIntra | | | | | | | | |
|---|---|---|---|---|---|---|---|---|---|
| | −10 | −9 | −8 | −7 | −6 | −5 | −4 | −3 | −2 |
| intraPredAngle | 114 | 93 | 79 | 68 | 60 | 54 | 49 | 45 | 39 |

| | PreModeIntra | | | | | | | | |
|---|---|---|---|---|---|---|---|---|---|
| | −1 | 2 | 3 | 4 | 5 | 6 | 7 | 8 | 9 |
| intraPredAngle | 35 | 32 | 29 | 26 | 23 | 21 | 19 | 17 | 15 |

| | PreModeIntra | | | | | | | | |
|---|---|---|---|---|---|---|---|---|---|
| | 10 | 11 | 12 | 13 | 14 | 15 | 16 | 17 | 18 |
| intraPredAngle | 13 | 11 | 9 | 7 | 5 | 3 | 2 | 1 | 0 |

| | PreModeIntra | | | | | | | | |
|---|---|---|---|---|---|---|---|---|---|
| | 19 | 20 | 21 | 22 | 23 | 24 | 25 | 26 | 27 |
| intraPredAngle | −1 | −2 | −3 | −5 | −7 | −9 | −11 | −13 | −15 |

TABLE 3-continued

| | PreModeIntra | | | | | | | |
|---|---|---|---|---|---|---|---|---|
| | 28 | 29 | 30 | 31 | 32 | 33 | 34 | 35 | 36 |
| intraPredAngle | −17 | −19 | −21 | −23 | −26 | −29 | −32 | −29 | −26 |

| | PreModeIntra | | | | | | | |
|---|---|---|---|---|---|---|---|---|
| | 37 | 38 | 39 | 40 | 41 | 42 | 43 | 44 | 45 |
| intraPredAngle | −23 | −21 | −19 | −17 | −15 | −13 | −11 | −9 | −7 |

| | PreModeIntra | | | | | | | |
|---|---|---|---|---|---|---|---|---|
| | 46 | 47 | 48 | 49 | 50 | 51 | 52 | 53 | 54 |
| intraPredAngle | −5 | −3 | −2 | −1 | 0 | 1 | 2 | 3 | 5 |

| | PreModeIntra | | | | | | | |
|---|---|---|---|---|---|---|---|---|
| | 55 | 56 | 57 | 58 | 59 | 60 | 61 | 62 | 63 |
| intraPredAngle | 7 | 9 | 11 | 13 | 15 | 17 | 19 | 21 | 23 |

| | PreModeIntra | | | | | | | |
|---|---|---|---|---|---|---|---|---|
| | 64 | 65 | 66 | 67 | 68 | 69 | 70 | 71 | 72 |
| intraPredAngle | 26 | 29 | 32 | 35 | 39 | 45 | 49 | 54 | 60 |

| | PreModeIntra | | | |
|---|---|---|---|---|
| | 73 | 74 | 75 | 76 |
| intraPredAngle | 68 | 79 | 93 | 114 |

When the current block is a non-square shape and the intra prediction mode of the current block acquired at step S802 belongs to a transform range, the intra prediction mode of the current block may be transformed into a wide-angle intra prediction mode. The transform range may be determined based on at least one among the size, the shape, and the ratio of the current block. Here, the ratio may represent a ratio of width to height of the current block.

When the current block is a non-square shape of which the width is greater than the height, the transform range may be set from an intra prediction mode index (e.g., 66) of the top-right diagonal direction (an index of the intra prediction mode in the top-right diagonal direction—N). Here, N may be determined based on the ratio of the current block. When the intra prediction mode of the current block belongs to the transform range, the intra prediction mode may be transformed into a wide-angle intra prediction mode. The transform may be subtraction of a predefined value from the intra prediction mode, and the predefined value may be the total number (e.g., 67) of intra prediction modes excluding the wide-angle intra prediction modes.

According to the embodiment described above, 66th to 53rd intra prediction modes may be transformed into −1st to −14th wide-angle intra prediction modes, respectively.

When the current block is a non-square shape of which the height is greater than the width, the transform range may be set from an intra prediction mode index (e.g., 2) of the bottom-left diagonal direction (an index of the intra prediction mode in the bottom-left diagonal direction+M). Here, M may be determined based on the ratio of the current block. When the intra prediction mode of the current block belongs to the transform range, the intra prediction mode may be transformed into a wide-angle intra prediction mode. The transform may be addition of a predefined value to the intra prediction mode, and the predefined value may be the total number (e.g., 65) of angular intra prediction modes excluding the wide-angle intra prediction modes.

According to the embodiment described above, 2nd to 15th intra prediction modes may be transformed into 67th to 80th wide-angle intra prediction modes, respectively.

Hereinafter, intra prediction modes belonging to the transform range will be referred to as wide-angle intra replacement prediction modes.

The transform range may be determined based on the ratio of the current block. For example, Tables 4 and 5 show a transform range when 35 intra prediction modes and 67 intra prediction modes are defined excluding the wide-angle intra prediction modes, respectively.

TABLE 4

| Condition | Replaced Intra Prediction Modes |
|---|---|
| W/H = 2 | Modes 2, 3, 4 |
| W/H > 2 | Modes 2, 3, 4, 5, 6 |
| W/H = 1 | None |
| H/W = ½ | Modes 32, 33, 34 |
| H/W < ½ | Modes 30, 31, 32, 33, 34 |

TABLE 5

| Condition | Replaced Intra Prediction Modes |
|---|---|
| W/H = 2 | Modes 2, 3, 4, 5, 6, 7 |
| W/H > 2 | Modes 2, 3, 4, 5, 6, 7, 8, 9, 10, 11 |
| W/H = 1 | None |
| H/W = ½ | Modes 61, 62, 63, 64, 65, 66 |
| H/W < ½ | Modes 57, 58, 59, 60, 61, 62, 63, 64, 65, 66 |

As shown in the examples of Tables 4 and 5, the number of wide-angle intra replacement prediction modes belonging to the transform range may vary according to the ratio of the current block.

A transform range as shown in Table 6 may be set by subdividing the ratio of the current block.

TABLE 6

| Condition | Replaced Intra Prediction Modes |
|---|---|
| W/H = 16 | Modes 12, 13, 14, 15 |
| W/H = 8 | Modes 12, 13 |
| W/H = 4 | Modes 2, 3, 4, 5, 6, 7, 8, 9, 10, 11 |
| H/W = 2 | Modes 2, 3, 4, 5, 6, 7 |
| H/W = 1 | None |
| W/H = ½ | Modes 61, 62, 63, 64, 65, 66 |
| W/H = ¼ | Modes 57, 58, 59, 60, 61, 62, 63, 64, 65, 66 |
| W/H = ⅛ | Modes 55, 56 |
| H/W = 1/16 | Modes 53, 54, 55, 56 |

It may be set not to use the wide-angle intra prediction mode when a non-adjacent reference sample line is determined as the reference sample line of the current block or when a multi-line intra prediction encoding method of selecting any one among a plurality of reference sample lines is used. That is, although the current block is a non-square shape and the intra prediction mode of the current block belongs to the transform range, the intra prediction mode of the current block may not be transformed into the wide-angle intra prediction mode.

Alternatively, it may be set non-adjacent reference sample lines as not being available as the reference sample line of the current block or it may be set not to use the multi-line intra prediction encoding method of selecting any one among a plurality of reference sample lines, when the intra prediction mode of the current block is determined as the wide-angle intra prediction mode. When the multi-line intra prediction encoding method is not used, an adjacent reference sample line may be determined as the reference sample line of the current block.

When the wide-angle intra prediction mode is not used, the sum of nTbW and nTbH may be set as refW and refH. Accordingly, excluding the top-left reference sample, a non-adjacent reference sample having a distance of i from the current block may include as many as (nTbW+nTbH+offsetX[i]) top reference samples and as many as (nTbW+nTbH+offsetY[i]) left reference samples. That is, a non-adjacent reference sample having a distance of i from the current block may include as many as (2nTbW+2nTbH+offsetX[i]+offsetY[i]+1) reference samples. For example, when the value of whRatio is larger than 1, the value of offsetX may be set to be larger than the value of offsetY. For example, the value of offsetX may be set to 1, and the value of offsetY may be set to 0. On the other hand, when the value of whRatio is smaller than 1, the value of offsetY may be set to be larger than the value of offsetX. For example, the value of offsetX may be set to 0, and the value of offsetY may be set to 1.

As the wide-angle intra prediction modes are used in addition to the existing intra prediction modes, resources required for encoding the wide-angle intra prediction modes increase, and thus encoding efficiency may be lowered. Accordingly, the encoding efficiency may be improved by encoding replacement intra prediction modes for the wide-angle intra prediction modes, instead of encoding the wide-angle intra prediction modes as they are.

For example, when the current block is encoded using the 67th wide-angle intra prediction mode, the 2nd intra prediction mode, which is the replacement intra prediction mode of the 67th wide-angle intra prediction mode, may be encoded using the intra prediction mode of the current block. In addition, when the current block is encoded using the −1st wide-angle intra prediction mode, the 66th intra prediction mode, which is the replacement intra prediction mode of the −1st wide-angle intra prediction mode, may be encoded using the intra prediction mode of the current block.

The decoder may decode the intra prediction mode of the current block and determine whether the decoded intra prediction mode belongs to the transform range. When the decoded intra prediction mode is a wide-angle replacement intra prediction mode, the intra prediction mode may be transformed into the wide-angle intra prediction mode.

Alternatively, when the current block is encoded using the wide-angle intra prediction mode, the wide-angle intra prediction mode may be encoded as it is.

Encoding the intra prediction mode may be performed based on the MPM list described above. Specifically, when a neighboring block is encoded using a wide-angle intra prediction mode, the MPM may be set based on a wide-angle replacement intra prediction mode corresponding to the wide-angle intra prediction mode. For example, when a neighboring block is encoded in a wide-angle intra prediction mode, variable candIntraPredModeX (X is A or B) may be set to the wide-angle replacement intra prediction mode.

Alternatively, an MPM may be set based on the wide-angle intra prediction mode of a neighboring block. For example, when a neighboring block is encoded in a wide-angle intra prediction mode, variable candIntraPredModeX may be set to the wide-angle intra prediction mode.

An MPM may be derived based on whether the reference sample line of the current block is a non-adjacent reference sample line or whether a multi-line intra prediction encoding method of selecting one among a plurality of reference sample lines is applied. For example, when the reference sample line of the current block is a non-adjacent reference sample line, and the intra prediction mode of a neighboring block adjacent to the current block is a wide-angle intra prediction mode, the default mode may be set as the MPM of the current block.

For example, when candIntraPredModeA derived based on the intra prediction mode of the left neighboring block and candIntraPredModeB derived based on the intra prediction mode of the top neighboring block are the same, and candIntraPredModeA is a planar or DC mode, MPMs may be derived as follows considering whether the index of the reference sample line of the current block is 0.

MPM[0]=(IntraLumaRefLineIdx==0)? Intra_Planar:INTRA_ANGULAR 50

MPM[1]=(IntraLumaRefLineIdx==0)? Intra_DC:INTRA_ANGULAR 18

MPM[2]=INTRA_ANGULAR 2

That is, when the index of the reference sample line of the current block is 0, the planar mode and the DC mode are set as MPMs, whereas when the reference sample line index of the current block is not 0, the vertical direction intra prediction mode (INTRA_ANGULAR 50) and the horizontal direction intra prediction mode (INTRA_ANGULAR 18) may be set as MPMs.

When the index of the reference sample line of the current block is not 0, and candIntraPredModeA and candIntraPredModeB are the same, and candIntraPredModeA is a wide-angle intra prediction mode, MPMs may be derived as follows.

MPM[0]=INTRA_ANGULAR2

MPM[1]=INTRA_ANGULAR18

MPM[2]=INTRA_ANGULAR50

Alternatively, MPMs may be derived as follows.
MPM[0]=INTRA_ANGULAR50
MPM[1]=INTRA_ANGULAR18
MPM[2]=INTRA_ANGULAR2

That is, when the index of the reference sample line of the current block is not 0, the wide-angle intra prediction mode may not be set as an MPM.

When candIntraPredModeA and candIntraPredModeB are the same, and candIntraPredModeA is an angular intra prediction mode, MPMs may be derived as follows.
MPM[0]=candIntraPredModeA
MPM[1]=2+((candIntraPredModeA+61) % 64)
MPM[2]=2+((candIntraPredModeA−1) % 64)

When the index of the reference sample line of the current block is 0, and candIntraPredModeA and candIntraPredModeB are different, MPM[0] and MPM[1] may be set to candIntraPredModeA and candIntraPredModeB, respectively. MPM[2] may be set to any one among a planar, DC, or vertical mode that is not the same as the modes of MPM[0] and MPM[1].

When the index of the reference sample line of the current block is not 0, and one among candIntraPredModeA and candIntraPredModeB is a planar mode, and the other one is a DC mode, MPMs may be derived as follows.
MPM[0]=INTRA_ANGULAR2
MPM[1]=INTRA_ANGULAR18
MPM[2]=INTRA_ANGULAR50

When the index of the reference sample line of the current block is not 0, and both candIntraPredModeA and candIntraPredModeB are wide-angle intra prediction modes, MPMs may be derived as follows.
MPM[0]=INTRA_ANGULAR2
MPM[1]=INTRA_ANGULAR18
MPM[2]=INTRA_ANGULAR50

When the index of the reference sample line of the current block is not 0, and any one among candIntraPredModeA and candIntraPredModeB is a wide-angle intra prediction mode, any one that is a non-wide-angle intra prediction mode among candIntrapredModeA and candIntraPredModeB may be set as MPM[0], and intra prediction modes similar to MPM[0] may be set as MPM[1] and MPM[2]. For example, when candIntraPredModeA is a non-wide-angle intra prediction mode and candIntraPredModeB is a wide-angle intra prediction mode, MPMs may be derived as follows.
MPM[0]=candIntraPredModeA
MPM[1]=2+((candIntraPredModeA+61) % 64)
MPM[2]=2+((candIntraPredModeA−1) % 64)

On the other hand, when candIntraPredModeA is a wide-angle intra prediction mode and candIntraPredModeB is a non-wide-angle intra prediction mode, MPMs may be derived as follows.
MPM[0]=candIntraPredModeB
MPM[1]=2+((candIntraPredModeB+61) % 64)
MPM[2]=2+((candIntraPredModeB−1) % 64)

When the index of the reference sample line of the current block is not 0, and any one among candIntraPredModeA and candIntraPredModeB is a planar or DC mode, and the other one is a non-wide-angle intra prediction mode, any one that is a non-wide-angle intra prediction mode among candIntrapredModeA and candIntraPredModeB may be set as MPM[0], and intra prediction modes similar to MPM[0] may be set as MPM[1] and MPM[2]. For example, when candIntraPredModeA is a non-wide-angle intra prediction mode and candIntraPredModeB is a planar or DC mode, MPMs may be derived as follows.
MPM[0]=candIntraPredModeA
MPM[1]=2+((candIntraPredModeA+61) % 64)
MPM[2]=2+((candIntraPredModeA−1) % 64)

On the other hand, when candIntraPredModeA is a planner or DC mode, and candIntraPredModeB is a non-wide-angle intra prediction mode, MPMs may be derived as follows.
MPM[0]=candIntraPredModeB
MPM[1]=2+((candIntraPredModeB+61) % 64)
MPM[2]=2+((candIntraPredModeB−1) % 64)

When the index of the reference sample line of the current block is not 0, and both candIntraPredModeA and candIntraPredModeB are non-wide-angle intra prediction modes, candIntraPredModeA and candIntraPredModeB may be set as MPM[0] and MPM[1], respectively. Any one that does not overlap with MPM[0] and MPM[1] among the vertical direction intra prediction mode (INTRA_ANGULAR50), the horizontal direction intra prediction mode (INTRA_ANGULAR18), and the bottom-left diagonal intra prediction mode (INTRA_ANGULAR2) may be set as MPM[2].

A coding block or a transform block may be partitioned into a plurality of subblocks (or sub-partitions). When a coding block or a transform block is partitioned into a plurality of subblocks, prediction, transform, and quantization may be performed on each subblock. Partitioning a coding block or a transform block into a plurality of subblocks may be defined as a sub-partition intra coding method.

Information indicating whether the sub-partition intra coding method is applied may be signaled through a bitstream. The information may be a 1-bit flag. For example, syntax element 'intra_subpartitions_mode_flag' indicating whether a coding block or a transform block is partitioned into a plurality of subblocks may be signaled through a bitstream.

Alternatively, whether the sub-partition intra coding method is applied may be determined based on at least one among the size, the shape, and the intra prediction mode of the coding block or the transform block. For example, when the intra prediction mode of a coding block is a non-angular intra prediction mode (e.g., a planar or DC mode) or a predefined angular intra prediction mode (e.g., an intra prediction mode of the horizontal direction, an intra prediction mode of the vertical direction, or an intra prediction mode of a diagonal direction), the sub-partition intra coding method may not be applied. Alternatively, it may be set not to use the sub-partition intra coding method when the size of the coding block is smaller than a threshold value.

Alternatively, when intra prediction is performed on a subblock based on the intra prediction mode of a coding block, whether or not to apply the sub-partition intra coding method may be determined based on whether a reconstructed sample included in a neighboring subblock should be used as a reference sample when intra prediction is performed on the subblock. For example, it may be set not to use the sub-partition intra coding method when the intra prediction mode of the coding block is an intra prediction mode of a diagonal direction or a wide-angle intra prediction mode, and a neighboring subblock may not be used as a reference sample when intra prediction is performed on a subblock based on the intra prediction mode.

Alternatively, it may be set not to use the sub-partition intra coding method when the height to width ratio of a coding block is higher than a threshold value or lower than a threshold value. Alternatively, when at least one among the height and the width of a coding block is smaller than or equal to a threshold value, the sub-partition intra coding method may not be used. For example, when both the height and the width of a coding block are smaller than or equal to a threshold value, the sub-partition intra coding method may not be used. The threshold value may be a value predefined in the encoder and the decoder. Alternatively, information for determining the threshold value may be signaled through a bitstream.

Alternatively, whether or not to signal a flag indicating whether or not to apply the sub-partition intra coding method may be determined based on at least one among the size, the shape, and the intra prediction mode of a coding block or a transform block. For example, only when both the height and the width of a coding block are smaller than or equal to a threshold value and/or the size of the coding block is greater than or equal to a threshold value, a flag indicating whether or not to apply the sub-partition intra coding method may be encoded and signaled. When the flag indicating whether or not to apply the sub-partition intra coding method is not encoded, the sub-partition intra coding method may not be applied.

When the sub-partition intra coding method is applied, a partitioning type of a coding block or a transform block may be determined. Here, the partitioning type indicates a partitioning direction of the coding block or the transform block. For example, vertical direction partitioning may mean partitioning a coding block or a transform block using at least one vertical line, and horizontal direction partitioning may mean partitioning a coding block or a transform block using at least one horizontal line.

Figure 16:
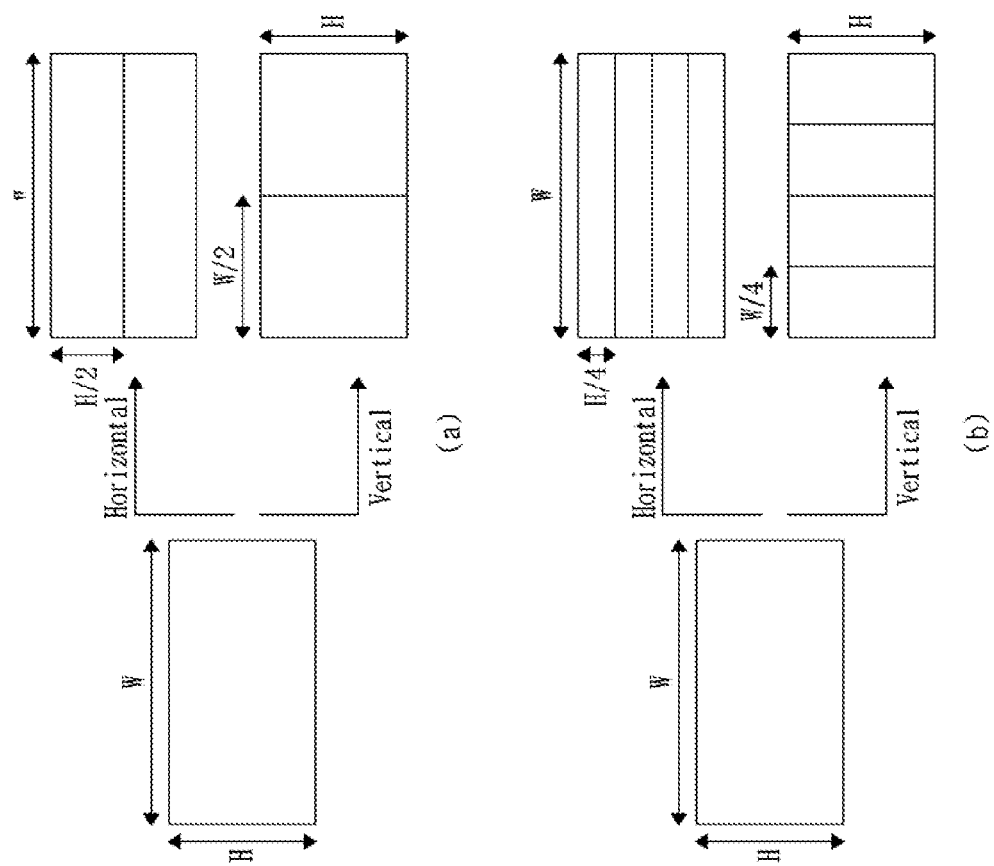
FIG. 16 is a view showing an example of vertical direction partitioning and horizontal direction partitioning.

FIG. 16 is a view showing an example of vertical direction partitioning and horizontal direction partitioning.

FIG. 16 (a) shows an example in which a coding block is partitioned into two subblocks, and FIG. 16 (b) shows an example in which a coding block is partitioned into four subblocks.

Information for determining a partitioning type of a coding block or a transform block may be signaled through a bitstream. For example, information indicating whether vertical direction partitioning or horizontal direction partitioning is applied to a coding block or a transform block may be signaled. The information may be intra_subpart_type_flag of 1-bit flag. When the value of the flag is 1, it indicates that the coding block or the transform block is partitioned in the horizontal direction, and when the value of the flag is 0, it indicates that the coding block or the transform block is partitioned in the vertical direction.

Alternatively, the partitioning type of a coding block or a transform block may be determined based on the size, the shape, or the intra prediction mode of the coding block or the transform block. For example, the partitioning type of a coding block may be determined based on the width to height ratio of the coding block. For example, when the value of whRatio indicating the height to width ratio of a coding block is larger than or equal to a first threshold value, vertical direction partitioning may be applied to the coding block. Otherwise, horizontal direction partitioning may be applied to the coding block.

Figure 17:
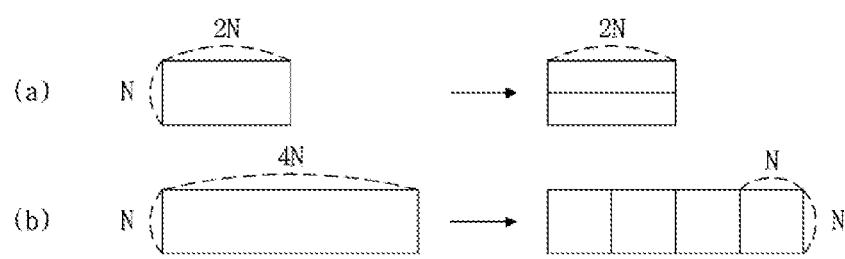
FIG. 17 is a view showing an example of determining a partitioning type of a coding block.

FIG. 17 is a view showing an example of determining a partitioning type of a coding block.

For convenience of explanation, it is assumed that the first threshold value is 2. In the example shown in FIG. 17 (a), whRatio of the coding block is 1, which is lower than the first threshold value. Accordingly, encoding of information indicating the partitioning type of the coding block may be omitted, and horizontal direction partitioning may be applied to the coding block.

In the example shown in FIG. 17 (b), whRatio of the coding block is 2, which is equal to the first threshold value. Accordingly, encoding of information indicating the partitioning type of the coding block may be omitted, and vertical direction partitioning may be applied to the coding block.

A partitioning type of a coding block may be determined using a second threshold value having a sign opposite to that of the first threshold value. For example, when the value of whRatio is smaller than or equal to the second threshold value, horizontal detection partitioning may be applied to the coding block, and otherwise, vertical detection partitioning may be applied to the coding block. Absolute values of the first threshold value and the second threshold value are the same, and their signs may be different. For example, when the first threshold value is N (herein, N is an integer such as 1, 2, 4, or the like), the second threshold value may be –N.

Figure 18:
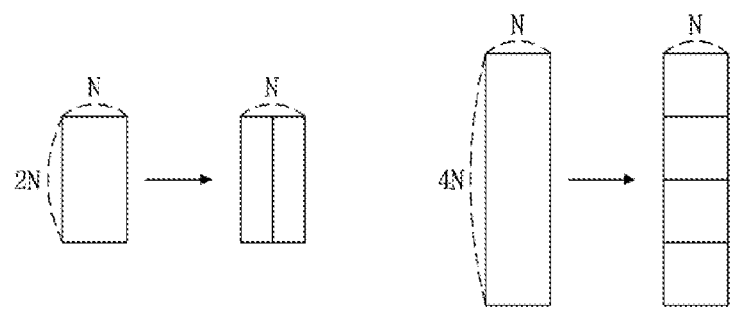
FIG. 18 is a view showing an example of determining a partitioning type of a coding block.

FIG. 18 is a view showing an example of determining a partitioning type of a coding block.

For convenience of explanation, it is assumed that the second threshold value is –2. In the example shown in FIG. 18 (a), whRatio of the coding block is –1, which is higher than the second threshold value. Accordingly, encoding of information indicating the partitioning type of the coding block may be omitted, and vertical direction partitioning may be applied to the coding block.

In the example shown in FIG. 18 (b), whRatio of the coding block is –2, which is equal to the second threshold value. Accordingly, encoding of information indicating the partitioning type of the coding block may be omitted, and horizontal direction partitioning may be applied to the coding block.

Alternatively, the partitioning type of a coding block may be determined based on the first threshold value and the second threshold value. For example, when the value of whRatio is larger than or equal to the first threshold value, horizontal detection partitioning may be applied to the coding block, and when the value of whRatio is smaller than or equal to the second threshold value, vertical detection partitioning may be applied to the coding block. When the value of whRatio exists between the first threshold value and the second threshold value, the partitioning type of the current block may be determined by parsing information from a bitstream.

The first threshold value and the second threshold value may be predefined in the encoder and the decoder. Alternatively, the first threshold value and the second threshold value may be defined for each sequence, picture, or slice.

Alternatively, the partitioning type may be determined based on the size of a coding block or a transform block. For example, when the size of a coding block is N×n, vertical direction partitioning may be applied, and when the size of a coding block is n×N, horizontal direction partitioning may be applied. Here, n may be a natural number smaller than N. N and/or n may be values predefined in the encoder and the decoder. Alternatively, information for determining N and/or n may be signaled through a bitstream. For example, N may be 32, 64, 128 or 256. Accordingly, when the size of a coding block is 128×n (where n is a natural number such as 16, 32, or 64), vertical direction partitioning may be applied, and when the size of a coding block is n×128, horizontal direction partitioning may be applied.

Alternatively, the partitioning type of a coding block or a transform block may be determined based on the intra prediction mode of the coding block or the transform block. For example, when the intra prediction mode of a coding block is in the horizontal direction or a direction similar to the horizontal direction, vertical direction partitioning may be applied to the coding block. Here, the intra prediction mode in a direction similar to the horizontal direction indicates an intra prediction mode of which the value of index difference from the intra prediction mode of the horizontal direction (e.g., INTRA_ANGULAR18 shown in FIG. 10 (b)) is smaller than or equal to a threshold value (e.g., INTRA_ANGULAR18±N). On the other hand, when the intra prediction mode of a coding block is in the vertical direction or a direction similar to the vertical direction, horizontal direction partitioning may be applied to the coding block. Here, the intra prediction mode in a direction similar to the vertical direction indicates an intra prediction mode of which the value of index difference from the intra prediction mode of the vertical direction (e.g., INTRA_ANGULAR50 shown in FIG. 10 (b)) is smaller than or equal to a threshold value (e.g., INTRA_ANGULAR50±N). Here, threshold value N may be a value predefined in the encoder and the decoder. Alternatively, information for determining threshold value N may be signaled at a sequence, picture, or slice level.

Figure 19:
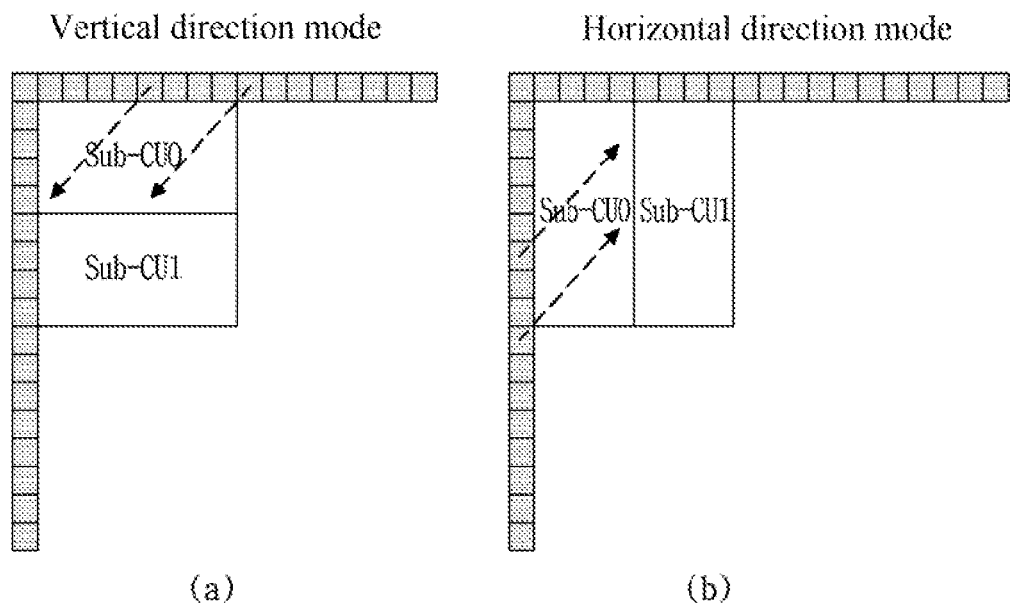
FIG. 19 is a view showing an example in which a partitioning type of a coding block is determined based on an intra prediction mode of the coding block.

FIG. 19 is a view showing an example in which a partitioning type of a coding block is determined based on an intra prediction mode of the coding block.

As shown in the example of FIG. 19 (a), when the intra prediction mode of a coding block is in a direction similar to the vertical direction, horizontal direction partitioning may be applied to the coding block.

On the other hand, as shown in the example of FIG. 19 (b), when the intra prediction mode of a coding block is in a direction similar to the horizontal direction, vertical direction partitioning may be applied to the coding block.

Contrary to the example described above, when the intra prediction mode of a coding block is in the horizontal direction or a direction similar to the horizontal direction, horizontal direction partitioning is applied, and when the intra prediction mode of a coding block is in the vertical direction or a direction similar to the vertical direction, vertical direction partitioning may be applied.

When vertical or horizontal direction partitioning is applied, the partitioning type of a coding block or a transform block may be determined based on whether at least one among the width and the height of a subblock generated by partitioning the coding block or the transform block is smaller than a threshold value. Here, the threshold value may be an integer such as 2, 4, or 8.

Figure 20:
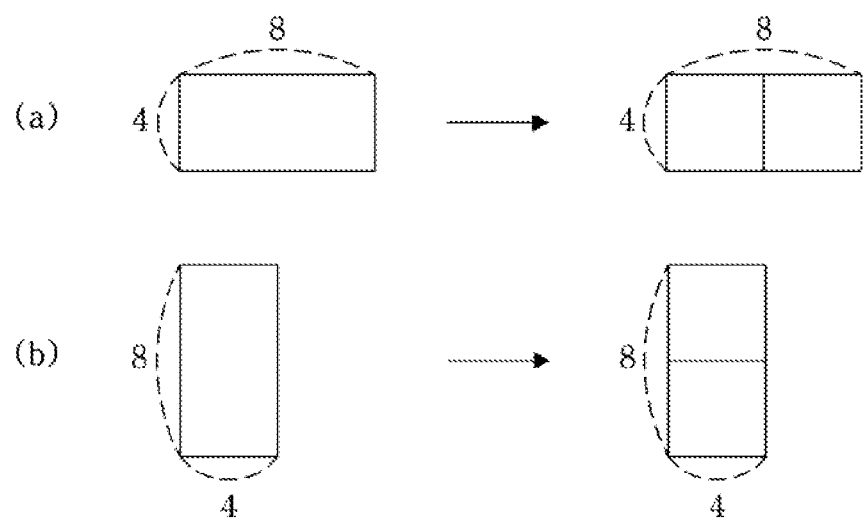
FIG. 20 is a view for describing a partitioning pattern of a coding block.

FIG. 20 is a view for describing a partitioning pattern of a coding block.

When horizontal direction partitioning is applied to a coding block of a 4×8 size shown in FIG. 20 (a), the coding block is partitioned into subblocks of a 2×8 size. In this case, since the width of a subblock is smaller than a threshold value, horizontal direction partitioning may not be allowed for the coding block. On the other hand, when vertical direction partitioning is applied to a coding block of a 4×8 size, the coding block is partitioned into subblocks of a 4×4 size. Since both the width and the height of the subblock are equal to or greater than the threshold value, vertical direction partitioning may be used for the coding block. Since only the vertical direction partitioning is allowed for the coding block, encoding of information indicating the partitioning type for the coding block may be omitted, and vertical direction partitioning may be applied to the coding block.

When vertical direction partitioning is applied to a coding block of a 8×4 size shown in FIG. 20 (b), the coding block is partitioned into subblocks of a 8×2 size. In this case, since the height of the subblock is smaller than a threshold value, vertical direction partitioning may not be allowed for the coding block. On the other hand, when horizontal direction partitioning is applied to a coding block of a 8×4 size, the coding block is partitioned into subblocks of a 4×4 size. Since both the width and the height of the subblock are equal to or greater than the threshold value, horizontal direction partitioning may be used for the coding block. Since only the horizontal direction partitioning is allowed for the coding block, encoding of information indicating the partitioning type for the coding block may be omitted, and vertical direction partitioning may be applied to the coding block.

When both the vertical direction partitioning and the horizontal direction partitioning can be used, the partitioning type of the coding block may be determined by parsing information indicating the partitioning type of the coding block.

The number of subblocks may be determined based on at least one among the size and the shape of a coding block or a transform block. For example, when any one among the width and the height of a coding block is 8 and the other one is 4, the coding block may be partitioned into two subblocks. On the other hand, when both the width and the height of a coding block are 8 or more, or any one among the width and the height of the coding block is greater than 8, the coding block may be partitioned into 4 subblocks. In summary, when a coding block has a size of 4×4, the coding block may not be partitioned into subblocks. When a coding block has a size of 4×8 or 8×4, the coding block may be partitioned into two subblocks. In other cases, the coding block may be partitioned into four subblocks.

Alternatively, information indicating the size, the shape, or the number of subblocks may be signaled through a bitstream. The size or the shape of subblocks may be determined by information indicating the number of subblocks. Alternatively, the number of subblocks may be determined by information indicating the size or the shape of the subblocks.

When the sub-partition intra coding method is applied, subblocks generated by partitioning a coding block or a transform block may use the same intra prediction mode. For example, MPMs for the coding block may be derived based on intra prediction modes of neighboring blocks adjacent to the coding block, and an intra prediction mode for the coding block may be determined based on the derived MPMs. When the intra prediction mode of the coding block is determined, each subblock may perform intra prediction using the determined intra prediction mode.

When the sub-partition intra coding method is applied, any one among the MPMs may be determined as the intra prediction mode of the coding block. That is, when the sub-partition intra coding method is applied, it may be considered that the MPM flag is true although the MPM flag is not signaled.

Alternatively, when the sub-partition intra coding method is applied, any one among predefined candidate intra prediction modes may be determined as the intra prediction mode of the coding block. For example, any one among an intra prediction mode of the horizontal direction, an intra prediction mode of the vertical direction, an intra prediction mode of a diagonal direction (e.g., at least one among a top-left intra prediction mode, a top-right intra prediction mode, and a bottom-left intra prediction mode), and a non-angular intra prediction mode (e.g., at least one among a planar mode and a DC mode) may be determined as the intra prediction mode of the coding block. Index information specifying any one among the predefined candidate intra prediction modes may be signaled through a bitstream.

According to an embodiment of the present disclosure, the intra prediction mode of at least one among the subblocks may be set to be different from those of the other subblocks. For example, the intra prediction mode of the N-th subblock may be derived by adding or subtracting an offset to or from the intra prediction mode of the N−1-th subblock. The offset may be predefined in the encoder and the decoder. Alternatively, the offset may be derived based on at least one among the size, the shape, and the intra prediction mode of the coding block, the size, the shape, and the number of subblocks, and the partitioning direction of the coding block. Alternatively, information for deriving the offset may be signaled through a bitstream.

Alternatively, when the intra prediction mode of the N−1-th subblock is a non-angular mode, the intra prediction mode of the N-th subblock is also set to be the same as the intra prediction mode of the N−1 subblock, and when the intra prediction mode of the N−1-th subblock is an angular mode, an intra prediction mode derived by adding or subtracting an offset to or from the intra prediction mode of the N−1-th subblock may be set to be the same as the intra prediction mode of the N-th subblock.

Alternatively, an angular intra prediction mode may be applied to some of a plurality of subblocks, and a non-angular intra prediction mode may be applied to the other subblocks. A subblock to which the non-angular intra prediction mode is applied may be determined considering at least one among the size, the shape, the position, and the number of subblocks. Alternatively, only when an angular intra prediction mode applied to any one among the plurality of subblocks is a predefined value, the non-angular intra prediction mode may be applied to another subblock.

Alternatively, the intra prediction mode of each subblock may be derived from MPMs. To this end, index information specifying any one of the MPMs may be signaled for each subblock.

Alternatively, the intra prediction mode of each subblock may be derived from predefined candidate intra prediction modes. To this end, index information specifying any one among the predefined candidate intra prediction modes may be signaled for each subblock.

Alternatively, information indicating whether the intra prediction modes of the subblocks are equally set may be signaled through a bitstream.

Quantization parameters of subblocks may be individually determined. Accordingly, a value of the quantization parameter of each subblock may be set differently. In order to determine the quantization parameter of each subblock, information indicating a value of difference from the quantization parameter of a previous subblock may be encoded. For example, a difference value between the quantization parameter of the N-th subblock and the quantization parameter of the N−1-th subblock may be encoded for the N-th subblock.

Intra prediction of a subblock may be performed using a reference sample. At this point, the reference sample may be derived from a reconstructed sample of a neighboring block adjacent to the subblock. When the neighboring block adjacent to the subblock is another subblock included in a coding block the same as that of the subblock, the reference sample of the subblock may be derived based on the reconstructed sample of the another subblock. For example, when a first subblock is positioned on the left side or the top of a second subblock, a reference sample of the second subblock may be derived from the reconstructed sample of the first subblock. To this end, parallel intra prediction may not be applied between subblocks. That is, encoding/decoding may be sequentially performed on the subblocks included in the coding block. Accordingly, after encoding/decoding of the first subblock is completed, intra prediction for the second subblock may be performed.

When the sub-partition intra coding method is applied, it may be set not to use the multi-line intra prediction encoding method of selecting any one among a plurality of reference sample line candidates. When the multi-line intra prediction encoding method is not used, an adjacent reference sample line adjacent to each subblock may be determined as a reference sample line of each subblock.

Alternatively, the multi-line intra prediction encoding method may be used even when the sub-partition intra coding method is applied. To this end, index information for specifying a reference sample line may be signaled for each subblock. Alternatively, index information for specifying a reference sample line may be signaled only for any one among a plurality of subblocks, and the index information may also be applied to the remaining subblocks as it is. Alternatively, it may be set to signal the index information for specifying a reference sample line for the coding block, and share the index information among a plurality of subblocks included in the coding block.

Alternatively, it may be set to allow only a subblock having a predefined position or a predefined partition index among the subblocks to use the multi-line intra prediction encoding method. For example, index information specifying any one among the reference sample line candidates may be signaled only for a subblock having a partition index of 0 among a plurality of subblocks or a subblock that is in contact with the top boundary or the left boundary of the coding block. The multi-line intra prediction encoding method may not be applied to the remaining subblocks. Accordingly, the remaining subblocks may perform intra prediction using adjacent reference sample lines.

The prediction encoding mode may be set differently for each subblock. For example, intra prediction may be applied to some subblocks, and inter prediction, current picture reference, or combined prediction may be applied to the other subblocks.

Figure 21:
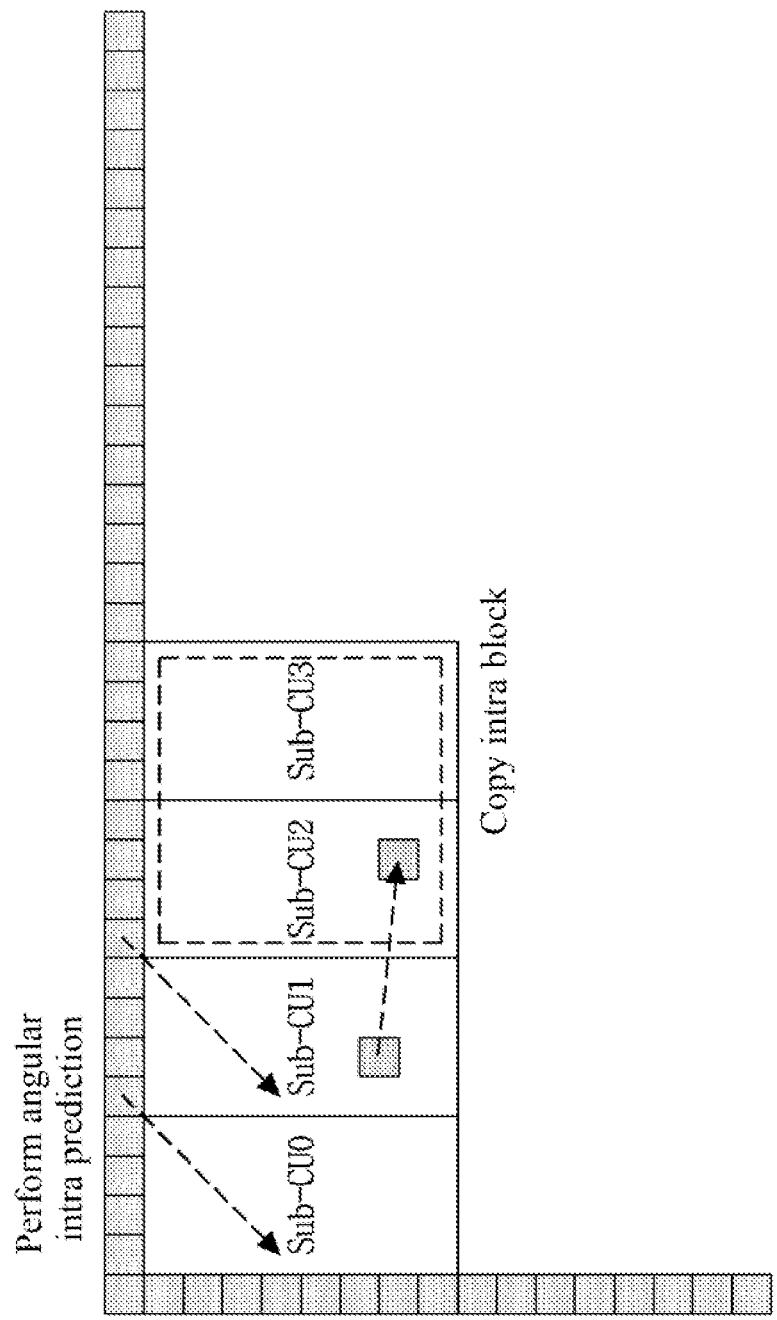
FIG. 21 is a view showing an example in which a prediction encoding mode is set differently for each subblock.

FIG. 21 is a view showing an example in which a prediction encoding mode is set differently for each subblock.

The intra prediction mode may be set differently for each subblock, or the prediction encoding mode may be set differently. For example, in the example shown in FIG. 21, it is shown that intra prediction is applied to subblock 0 and subblock 1, and a current picture reference is applied to subblock 1 and subblock 2.

When a current picture reference is used, a prediction block of a subblock may be derived from an already decoded region of the current picture or slice (or tile group). When a current picture reference is applied, a motion vector may be derived to specify a prediction block of the subblock. The motion vector under the current picture reference may be referred to as a 'block vector'.

The motion vector may be derived based on the motion vector of a neighboring block adjacent to the coding block or the subblock. Alternatively, information for determining the motion vector may be signaled through a bitstream.

At this point, the maximum value of the motion vector of a subblock may be determined according to the size of the subblock or a coding block or a transform block to which the subblock belongs. For example, the motion vector of a subblock may be set not to deviate from the boundary of a coding block or a transform block to which the subblock belongs. That is, the prediction block of a subblock may be derived from a region encoded/decoded before the subblock in the coding block to which the subblock belongs.

Index information indicating any one among previously decoded subblocks in the coding block, instead of a motion vector, may be encoded and signaled. The prediction block of the subblock may be determined as a previously decoded subblock specified by the index information.

As another example, the motion vector of a subblock may be allowed to deviate from the boundary of a coding block or a transform block to which the subblock belongs.

When a prediction block is generated as a result of performing intra prediction, prediction samples may be updated based on the position of each of the prediction samples included in the prediction block. The update method like this may be referred to as a sample position-based intra-weighted prediction method (or Position Dependent Prediction Combination, PDPC).

Whether or not to use the PDPC may be determined considering the size, the shape, and the intra prediction mode of the current block, the reference sample line of the current block, the size of the current block, and a color component. For example, the PDPC may be used when the intra prediction mode of the current block is at least one among a planar mode, a DC mode, a vertical direction mode, a horizontal direction mode, a mode having an index value smaller than that of the vertical direction mode, and a mode having an index value larger than that the horizontal direction mode. Alternatively, the PDPC may be used only when at least one among the width and the height of the current block is greater than 4. Alternatively, the PDPC may be used only when the index of the reference picture line of the current block is 0. Alternatively, the PDPC may be used only when the index of the reference picture line of the current block is equal to or greater than a predefined value. Alternatively, the PDPC may be used only for the luminance component. Alternatively, whether or not to use the PDPC may be determined according to whether two or more of the conditions listed above are satisfied.

Alternatively, whether or not to use the PDPC may be determined according to whether or not the sub-partition intra coding method is used. For example, it may be set not to use the PDPC when the sub-partition intra coding method is applied to a coding block or a transform block. Alternatively, when the sub-partition intra coding method is applied to a coding block or a transform block, the PDPC may be applied to at least one among a plurality of subblocks. At this point, a subblock to which the PDPC is applied may be determined based on at least one among the size, the shape, the position, the intra prediction mode, and the reference sample line index of the coding block or the subblock. For example, the PDPC may be applied to a subblock adjacent to the top and/or left boundary of a coding block or a subblock adjacent to the bottom and/or right boundary of the coding block. Alternatively, based on the size or the shape of a subblock, it may be determined to apply the PDPC to all subblocks included in a coding block or not to apply the PDPC to all subblocks included in a coding block. As another example, the PDPC may be applied to all subblocks in a coding block.

Alternatively, whether or not to apply the PDPC to each subblock may be determined according to whether at least one among the size, the shape, the intra prediction mode, and the reference picture index of subblocks generated by partitioning a coding block or a transform block satisfies a preset condition. For example, when at least one among the width and the height of a subblock is greater than 4, the PDPC may be applied to the subblock.

As another example, information indicating whether or not the PDPC is applied may be signaled through a bitstream.

Alternatively, a region to which the PDPC is applied may be determined based on at least one among the size, the shape, and the intra prediction mode of the current block, and the position of a prediction sample. For example, when the intra prediction mode of the current block has an index greater than that of the vertical direction, prediction samples of which at least one among the x-axis coordinate and the y-axis coordinate is greater than a threshold value are not corrected, and correction may be performed only on prediction samples of which the x-axis coordinate or y-axis coordinate is smaller than or equal to a threshold value. Alternatively, when the intra prediction mode of the current block has an index smaller than that of the horizontal direction, prediction samples of which at least one among the x-axis coordinate and the y-axis coordinate is greater than a threshold value are not corrected, and correction may be performed only on prediction samples of which the x-axis coordinate or y-axis coordinate is smaller than or equal to a threshold value. At this point, the threshold value may be determined based on at least one among the size, the shape, and the intra prediction mode of the current block.

When a prediction sample is obtained through an intra prediction sample, a reference sample used for correcting the prediction sample may be determined based on the position of the obtained prediction sample. For convenience of explanation, in the embodiments described below, the reference sample used for correcting the prediction sample will be referred to as a PDPC reference sample. In addition, a prediction sample obtained through intra prediction is referred to as a first prediction sample, and a prediction sample obtained by correcting the first prediction sample is referred to as a second prediction sample.

Figure 22:
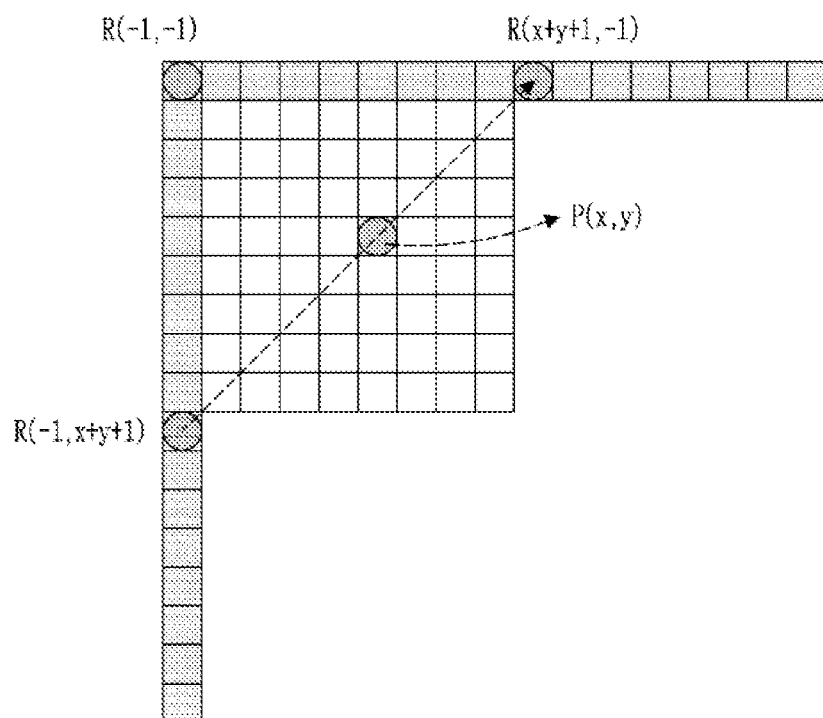
FIG. 22 is a view showing an embodiment of applying PDPC.

FIG. 22 is a view showing an embodiment of applying PDPC.

The first prediction sample may be corrected using at least one PDPC reference sample. The PDPC reference sample may include at least one among a reference sample adjacent to the top-left corner of the current block, a top reference sample positioned on the top of the current block, and a left reference sample positioned on the left side of the current block.

At least one among the reference samples belonging to the reference sample line of the current block may be set as the PDPC reference sample. Alternatively, regardless of the reference sample line of the current block, at least one among the reference samples belonging to the reference sample line having index 0 may be set as the PDPC reference sample. For example, although the first prediction sample is acquired using a reference sample included in a reference sample line of index 1 or index 2, the second prediction sample may be acquired using a reference sample included in the reference sample line of index 0.

The number or positions of the PDPC reference samples used for correcting the first prediction sample may be determined considering at least one among the intra prediction mode of the current block, the size of the current block, the shape of the current block, and the position of the first prediction sample.

For example, when the intra prediction mode of the current block is a planar mode or a DC mode, the second prediction sample may be acquired using a top reference sample and a left reference sample. At this point, the top reference sample may be a reference sample vertical to the first prediction sample (e.g., a reference sample of the same x-coordinate), and the left reference sample may be a reference sample horizontal to the first prediction sample (e.g., a reference sample of the same y-coordinate).

When the intra prediction mode of the current block is a horizontal direction intra prediction mode, the second prediction sample may be acquired using a top reference sample. At this point, the top reference sample may be a reference sample vertical to the first prediction sample.

When the intra prediction mode of the current block is a vertical direction intra prediction mode, the second prediction sample may be acquired using a left reference sample. At this point, the left reference sample may be a reference sample horizontal to the first prediction sample.

When the intra prediction mode of the current block is a bottom-left diagonal direction intra prediction mode or a top-right diagonal direction intra prediction mode, the second prediction sample may be acquired based on a top-left reference sample, a top reference sample, and a left reference sample. The top-left reference sample may be a reference sample adjacent to the top-left corner of the current block (e.g., a reference sample at the position of (−1, −1)). The top reference sample may be a reference sample positioned in the top-right diagonal direction of the first prediction sample, and the left reference sample may be a reference sample positioned in the bottom-left diagonal direction of the first prediction sample.

In summary, when the position of the first prediction sample is (x, y), R(−1, −1) may be set as the top-left reference sample, and R(x+y+1, −1) or R(x, −1) may be set as the top reference sample. In addition, R(−1, x+y+1) or R(−1, y) may be set as the left reference sample.

As another example, the position of the left reference sample or the top reference sample may be determined considering at least one among the shape of the current block and whether or not the wide-angle intra mode is applied.

Specifically, when the intra prediction mode of the current block is a wide-angle intra prediction mode, a reference sample spaced apart from a reference sample positioned in the diagonal direction of the first prediction sample as much as an offset may be set as the PDPC reference sample. For example, top reference sample R(x+y+k+1, −1) and left reference sample R(−1, x+y−k+1) may be set as PDPC reference samples.

At this point, offset k may be determined based on a wide-angle intra prediction mode. Equations 8 and 9 show an example of deriving an offset based on a wide-angle intra prediction mode.

$$k = \text{CurrIntraMode} - 66$$

$$\text{if (CurrIntraMode} > 66) \qquad \text{[Equation 8]}$$

$$k = -\text{CurrIntraMode}$$

$$\text{if (CurrIntraMode} < 0) \qquad \text{[Equation 9]}$$

The second prediction sample may be determined based on a weighted sum operation of the first prediction sample and the PDPC reference samples. For example, the second prediction sample may be acquired based on Equation 10 shown below.

$$\text{pred}(x,y) = (xL*R_L + wT*R_T - wTL*R_{TL} + (64 - wL - wT + wTL)*\text{pred}(x,y) + 32) >> 6 \qquad \text{[Equation 10]}$$

In Equation 10, $R_L$ denotes a left reference sample, $R_T$ denotes a top reference sample, and $R_{TL}$ denotes a top-left reference sample. Pred(x, y) denotes a prediction sample at the position of (x, y). wL denotes a weighting value assigned to the left reference sample, wT denotes a weighting value assigned to the top reference sample, and wTL denotes a weighting value assigned to the top-left reference sample. The weighting values assigned to the first prediction sample may be derived by subtracting weighting values assigned to the reference samples from the maximum value. For convenience of explanation, a weighting value assigned to a PDPC reference sample is referred to as a PDPC weighting value.

A weighting value assigned to each reference sample may be determined based on at least one among the intra prediction mode of the current block and the position of the first prediction sample.

For example, at least one among wL, wT and wTL may have a proportional or inverse proportional relation with at least one among the x-axis coordinate value and the y-axis coordinate value of the prediction sample. Alternatively, at least one among wL, wT and wTL may have a proportional or inversely proportional relation with at least one among the width and the height of the current block.

When the intra prediction mode of the current block is a DC mode, PDPC weighting values may be determined as shown in Equation 11.

$$wT = 32 >> ((y << 1) >> \text{shift})$$

$$wL = 32 >> ((x << 1) >> \text{shift})$$

$$wTL = (wL >> 4) + (wT >> 4) \qquad \text{[Equation 11]}$$

In Equation 11, x and y denote the position of the first prediction sample.

Variable shift used in the bit shift operation in Equation 11 may be derived based on the width or the height of the current block. For example, variable shift may be derived based on Equation 12 or 13 shown below.

$$\text{shift} = (\log_2(\text{width}) - 2 + \log_2(\text{height}) - 2 + 2) >> 2 \qquad \text{[Equation 12]}$$

$$\text{shift} = ((\text{Log}_2(nTbW) + \text{Log}_2(nTbH) - 2) >> 2) \qquad \text{[Equation 13]}$$

Alternatively, variable shift may be derived considering the intra direction parameter of the current block.

The number of parameters or parameter types used for deriving variable shift may be determined differently according to the intra prediction mode of the current block. For example, when the intra prediction mode of the current block is a planar mode, a DC mode, a vertical direction mode, or a horizontal direction mode, variable shift may be derived using the width and the height of the current block as shown in the example of Equation 12 or Equation 13. When the intra prediction mode of the current block is an intra prediction mode having an index larger than that of the vertical direction intra prediction mode, variable shift may be derived using the height and the intra direction parameter of the current block. When the intra prediction mode of the current block is an intra prediction mode having an index smaller than that of the horizontal intra prediction mode, variable shift may be derived using the width and the intra direction parameter of the current block.

When the intra prediction mode of the current block is a planar mode, the value of wTL may be set to 0. wL and wT may be derived based on Equation 14 shown below.

$$wT[y] = 32 >> ((y << 1) >> \text{shift})$$

$$wL[x] = 32 >> ((x << 1) >> \text{shift}) \qquad \text{[Equation 14]}$$

When the intra prediction mode of the current block is a horizontal direction intra prediction mode, wT may be set to 0, and wTL and wL may be set equally. On the other hand, when the intra prediction mode of the current block is a vertical direction intra prediction mode, wL may be set to 0, and wTL and wT may be set equally.

When the intra prediction mode of the current block is an intra prediction mode directing toward the top-right having an index value larger than that of the intra prediction mode of the vertical direction, PDPC weighting values may be derived as shown in Equation 15.

$$wT=16((y<<1)>>\text{shift})$$

$$wL=16((x<<1)>>\text{shift})$$

$$wTL=0 \qquad \text{[Equation 15]}$$

On the other hand, when the intra prediction mode of the current block is an intra prediction mode directing toward the bottom-left having an index value smaller than that of the intra prediction mode of the horizontal direction, the PDPC weighting values may be derived as shown in Equation 16.

$$wT=16>>((y<<1)>>\text{shift})$$

$$wL=16>>((x<<1)>>\text{shift})$$

$$wTL=0 \qquad \text{[Equation 16]}$$

As shown in the embodiment described above, PDPC weighting values may be determined based on the position x and y of the prediction sample.

As another example, a weighting value assigned to each of the PDPC reference samples may be determined by the unit of subblock. Prediction samples included in a subblock may share the same PDPC weighting values.

The size of a subblock, which is a basic unit for determining a weighting value, may be predefined in the encoder and the decoder. For example, a weighting value may be determined for each subblock of a 2×2 or 4×4 size.

Alternatively, the size, the shape, or the number of subblocks may be determined according to the size or the shape of the current block. For example, regardless of the size of a coding block, the coding block may be partitioned into four subblocks. Alternatively, the coding block may be partitioned into 4 or 16 subblocks according to the size of the coding block.

Alternatively, the size, the shape, or the number of subblocks may be determined based on the intra prediction mode of the current block. For example, when the intra prediction mode of the current block is in the horizontal direction, N columns (or N rows) are set as one subblock, whereas when the intra prediction mode of the current block is in the vertical direction, N rows (or N columns) may be set as one subblock.

Equations 17 to 19 show examples of determining a PDPC weighting value for a subblock of a 2×2 size. Equation 17 shows a case in which the intra prediction mode of the current block is a DC mode.

$$wT=32>>(((y<<\log_2 K))>>\log_2 K)<<1)>>\text{shift})$$

$$wL=32>>(((x<<\log_2 K))>>\log_2 K)<<1)>>\text{shift})$$

$$wTL=(wL>>4)+(wT>>4) \qquad \text{[Equation 17]}$$

In Equation 17, K may be determined based on the size of a subblock.

Equation 18 shows an example in which the intra prediction mode of the current block is an intra prediction mode directing toward the top-right having an index value larger than that of the intra prediction mode of the vertical direction.

$$wT=16>>(((y<<\log_2 K))>>\log_2 K)<<1)>>\text{shift})$$

$$wL=16>>(((x<<\log_2 K))>>\log_2 K)<<1)>>\text{shift})$$

$$wTL=0 \qquad \text{[Equation 18]}$$

Equation 19 shows an example in which the intra prediction mode of the current block is an intra prediction mode directing toward the bottom-left having an index value smaller than that of the intra prediction mode of the horizontal direction.

$$wT=16>>(((y<<\log_2 K))>>\log_2 K)<<1)>>\text{shift})$$

$$wL=16>>(((x<<\log_2 K))>>\log_2 K)<<1)>>\text{shift})$$

$$wTL=0 \qquad \text{[Equation 19]}$$

In Equations 17 to 19, x and y denotes the position of a reference sample within a subblock. The reference sample may be any one among a sample positioned at the top-left of the subblock, a sample positioned at the center of the subblock, and a sample positioned at the bottom-right of the subblock.

Equations 20 to 22 show examples of determining a PDPC weighting value for a subblock of a 4×4 size. Equation 20 shows an example in which the intra prediction mode of the current block is a DC mode.

$$wT=32>>(((y<<2))>>2)<<1)>>\text{shift})$$

$$wL=32>>(((x<<2))>>2)<<1)>>\text{shift})$$

$$wTL=(wL>>4)+(wT>>4) \qquad \text{[Equation 20]}$$

Equation 21 shows an example in which the intra prediction mode of the current block is an intra prediction mode directing toward the top-right having an index value larger than that of the intra prediction mode of the vertical direction.

$$wT=16>>(((y<<2))>>2)<<1)>>\text{shift})$$

$$wL=16>>(((x<<2))>>2)<<1)>>\text{shift})$$

$$wTL=0 \qquad \text{[Equation 21]}$$

Equation 22 shows an example in which the intra prediction mode of the current block is an intra prediction mode directing toward the bottom-left having an index value smaller than that of the intra prediction mode of the horizontal direction.

$$wT=16>>(((y<<2))>>2)<<1)>>\text{shift})$$

$$wL=16>>(((x<<2))>>2)<<1)>>\text{shift})$$

$$wTL=0 \qquad \text{[Equation 22]}$$

In the embodiments described above, it has been described that PDPC weighting values are determined considering the positions of the prediction samples included in a first prediction sample or a subblock. The PDPC weighting values may be determined by further considering the shape of the current block.

For example, in the case of a DC mode, the method of deriving a PDPC weighting value may vary depending on whether the current block is a non-square shape of which the width is greater than the height or a non-square shape of which the height is greater than the width.

Equation 23 shows an example of deriving a PDPC weighting value when the current block is a non-square shape of which the width is greater than the height, and Equation 24 shows an example of deriving a PDPC weighting value when the current block is a non-square shape of which the height is greater than the width.

$$wT=32>>((y<<1)>>\text{shift})$$

$$wL=32>>(x>>\text{shift})$$

$$wTL=(wL>>4)+(wT>>4) \qquad \text{[Equation 23]}$$

$$wT>>(y>>\text{shift})$$

$$wL=32>>((x<<1)>>\text{shift})$$

$$wTL=(wL>>4)+(wT>>4) \qquad \text{[Equation 24]}$$

When the current block is a non-square shape, the current block may be predicted using a wide-angle intra prediction mode. In this way, even when the wide-angle intra prediction mode is applied, the first prediction sample may be updated by applying the PDPC.

When the wide-angle intra prediction is applied to the current block, the PDPC weighting value may be determined considering the shape of the coding block.

For example, when the current block is a non-square shape of which the width is greater than the height, according to the position of the first prediction sample, there may be a case in which the top reference sample positioned at the top-right of the first prediction sample is closer to the first prediction sample than the left reference sample positioned at the bottom-left of the first prediction sample. Accordingly, in correcting the first prediction sample, the weighting value applied to the top reference sample may be set to be larger than the weighting value applied to the left reference sample.

On the other hand, when the current block is a non-square shape of which the height is greater than the width, according to the position of the first prediction sample, there may be a case in which the left reference sample positioned at the bottom-left of the first prediction sample is closer to the first prediction sample than the top reference sample positioned at the top-right of the first prediction sample. Accordingly, in correcting the first prediction sample, the weighting value applied to the left reference sample may be set to be larger than the weighting value applied to the top reference sample.

Equation 25 shows an example of deriving a PDPC weighting value when the intra prediction mode of the current block is a wide-angle intra prediction mode having an index larger than 66.

$$wT=16>>(y>>\text{shift})$$

$$wL=16>>((x<<1)>>\text{shift})$$

$$wTL=0 \qquad \text{[Equation 25]}$$

Equation 26 shows an example of deriving a PDPC weighting value when the intra prediction mode of the current block is a wide-angle intra prediction mode having an index smaller than 0.

$$wT=16>>((y<<1)>>\text{shift})$$

$$wL=16>>(x>>\text{shift})$$

$$wTL=0 \qquad \text{[Equation 26]}$$

The PDPC weighting value may be determined based on the ratio of the current block. The ratio of the current block represents a ratio of width to height of the current block, and may be defined as shown in Equation 27.

$$whRatio=CUwidth/CUheight \qquad \text{[Equation 27]}$$

According to the intra prediction mode of the current block, the method of deriving the PDPC weighting value may be determined in various ways.

For example, Equations 28 and 29 show an example of deriving a PDPC weighting value when the intra prediction mode of the current block is a DC mode. Specifically, Equation 28 is an example of a case where the current block is a non-square shape of which the width is greater than the height, and Equation 29 is an example of a case where the current block is a non-square shape of which the height is greater than the width.

$$wT=32>>((y<<1)>>\text{shift})$$

$$wL=32>>(((x<<1)>>whRatio)>>\text{shift})$$

$$wTL=(wL>>4)+(wT>>4) \qquad \text{[Equation 28]}$$

$$wT=32>>(((y<<1)>>1/whRatio)>>\text{shift})$$

$$wL=32>>((x<<1)>>\text{shift})$$

$$wTL=(wL>>4)+(wT>>4) \qquad \text{[Equation 29]}$$

Equation 30 shows an example of deriving a PDPC weighting value when the intra prediction mode of the current block is a wide-angle intra prediction mode having an index larger than 66.

$$wT=16>>(((y<<1)>>1/whRatio)>>\text{shift})$$

$$wL=16>>((x<<1)>>\text{shift})$$

$$wTL=0 \qquad \text{[Equation 30]}$$

Equation 31 shows an example of deriving a PDPC weighting value when the intra prediction mode of the current block is a wide-angle intra prediction mode having an index smaller than 0.

$$wT=16>>((y<<1)>>\text{shift})$$

$$wL=16>>(((x<<1)>>whRatio)>>\text{shift})$$

$$wTL=0 \qquad \text{[Equation 31]}$$

A derived residual picture may be derived by subtracting a prediction video from an original video. At this point, when the residual video is changed to the frequency domain, subjective video quality of the video is not significantly lowered although the high-frequency components among the frequency components are removed. Accordingly, when values of the high-frequency components are converted to be small or the values of the high-frequency components are set to 0, there is an effect of increasing the compression efficiency without generating significant visual distortion. By reflecting this characteristic, the current block may be transformed to decompose a residual video into two-dimensional frequency components. The transform may be performed using a transform technique such as Discrete Cosine Transform (DCT) or Discrete Sine Transform (DST).

The DCT decomposes (or transforms) a residual video into two-dimensional frequency components using a cosine transform, and the DST decomposes (or transforms) a residual video into two-dimensional frequency components using a sine transform. As a result of transforming the residual video, the frequency components may be expressed as a basis video. For example, when DCT transform is performed on a block of an N×N size, as many basic pattern components as $N^2$ may be acquired. The size of each of the basic pattern components included in a block of an N×N size may be acquired through the transform. According to a transform technique used therefor, the value of the basic pattern component may be referred to as a DCT coefficient or a DST coefficient.

Transform technique DCT is mainly used to transform a video in which many non-zero low-frequency components are distributed. The transform technique DST is mainly used for videos in which many high-frequency components are distributed.

The residual video may be transformed using a transform technique other than the DCT or the DST.

Hereinafter, transform of a residual video into two-dimensional frequency components will be referred to as two-dimensional video transform. In addition, the size of the basic pattern components acquired as a result of the transform is referred to as a transform coefficient. For example, the transform coefficient may mean a DCT coefficient or a DST coefficient. When both first transform and second transform described below are applied, the transform coefficient may mean the size of a basic pattern component generated as a result of the second transform.

The transform technique may be determined for each block. The transform technique may be determined based on at least one among the prediction encoding mode of the current block, the size of the current block, and the shape of the current block. For example, when the current block is encoded in the intra prediction mode and the size of the current block is smaller than N×N, transform may be performed using the transform technique DST. On the other hand, when the above conditions are not satisfied, transform may be performed using the transform technique DCT.

The two-dimensional video transform may not be performed for some blocks of the residual video. Not performing the two-dimensional video transform may be referred to as a transform skip. When the transform skip is applied, quantization may be applied to residual coefficients that have not been transformed.

After the current block is transformed using DCT or DST, the transformed current block may be transformed again. At this point, the transform based on DCT or DST may be defined as a first transform, and transforming again a block to which the first transform is applied may be defined as a second transform.

The first transform may be performed using any one among a plurality of transform core candidates. For example, the first transform may be performed using any one among DCT2, DCT8, or DCT7.

Different transform cores may be used for the horizontal direction and the vertical direction. Information indicating combination of a transform core of the horizontal direction and a transform core of the vertical direction may be signaled through a bitstream.

Units for performing the first transform and the second transform may be different. For example, the first transform may be performed on an 8×8 block, and the second transform may be performed on a subblock of a 4×4 size among the transformed 8×8 block. At this point, the transform coefficients of the residual regions that has not been performed the second transform may be set to 0.

Alternatively, the first transform may be performed on a 4×4 block, and the second transform may be performed on a region of an 8×8 size including the transformed 4×4 block.

Information indicating whether or not the second transform has been performed may be signaled through a bitstream.

Alternatively, whether or not to perform the second transform may be determined based on whether the horizontal direction transform core and the vertical direction transform core are the same. For example, the second transform may be performed only when the horizontal direction transform core and the vertical direction transform core are the same. Alternatively, the second transform may be performed only when the horizontal direction transform core and the vertical direction transform core are different from each other.

Alternatively, the second transform may be allowed only when transform of the horizontal direction and transform of the vertical direction use a predefined transform core. For example, when a DCT2 transform core is used for transform of the horizontal direction and transform of the vertical direction, the second transform may be allowed.

Alternatively, whether or not to perform the second transform may be determined based on the number of non-zero transform coefficients of the current block. For example, it may be set not to use the second transform when the number of non-zero transform coefficients of the current block is smaller than or equal to a threshold value, and it may be set to use the second transform when the number of non-zero transform coefficient of the current block is larger than the threshold value. It may be set to use the second transform only when the current block is encoded by intra prediction.

Based on the shape of the current block, the size or the shape of a subblock on which the second transform will be performed may be determined.

Figure 23:
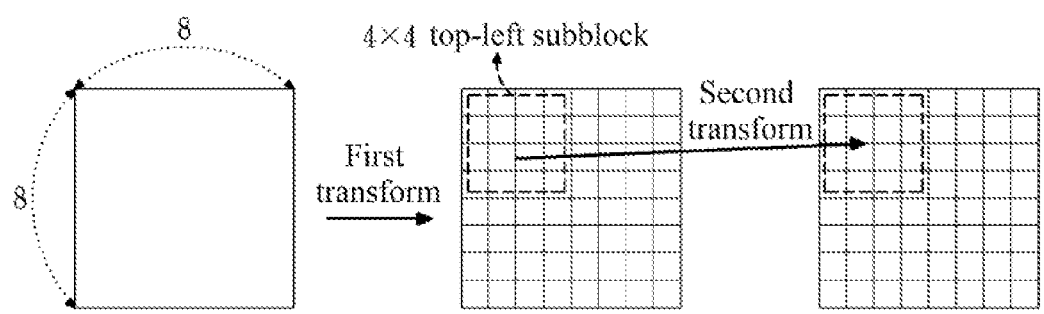
FIG. 23 is a view showing a subblock on which a second transform will be performed.
Figure 24:
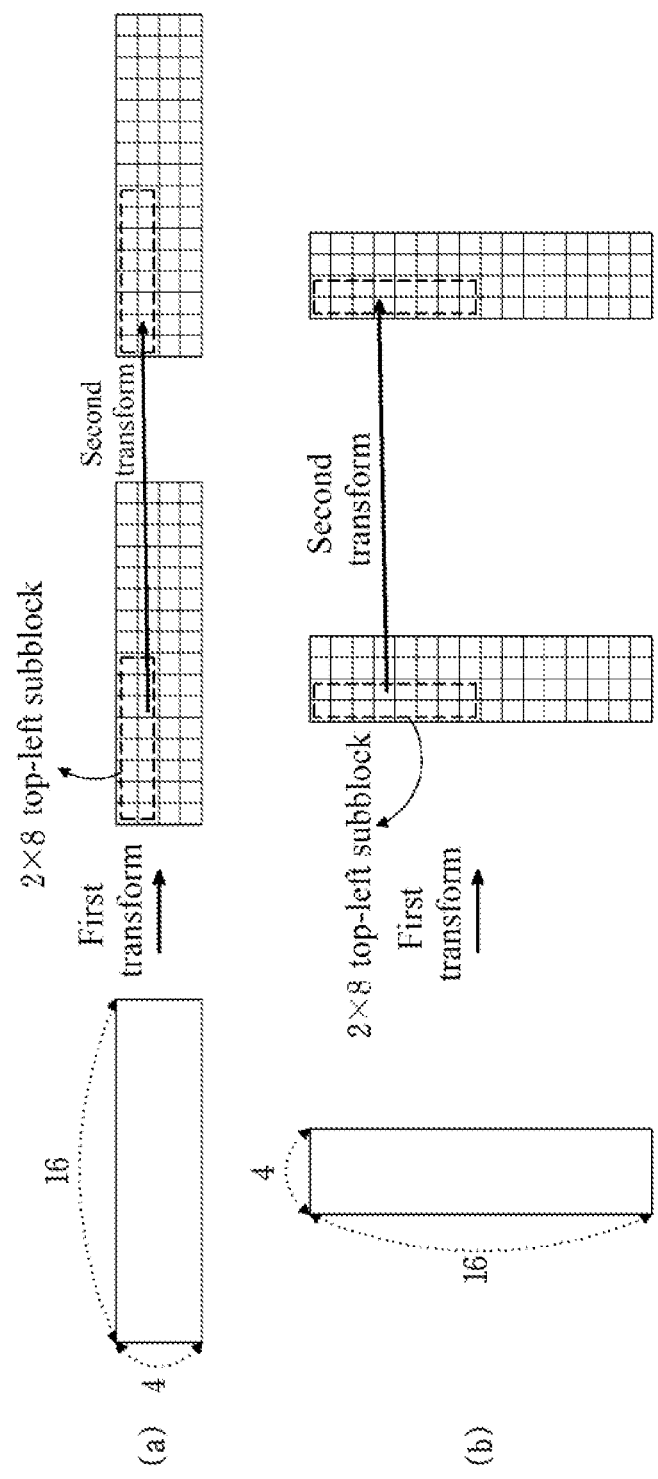
FIG. 24 is a view showing a subblock on which a second transform will be performed.

FIGS. 23 and 24 are views showing a subblock on which a second transform will be performed.

When the current block is a square shape, the second transform may be performed on a subblock having a N×N size at the top-left of the current block after the first transform is performed. For example, when the current block is a coding block of an 8×8 size, the second transform may be performed on a subblock having a 4×4 size at the top-left of the current block after the first transform is performed on the current block (see FIG. 23).

When the current block is a non-square shape of which the width is at least 4 times greater than the height, the second transform may be performed on a subblock of a (kN)×(4 kN) size at the top-left of the current block after the first transform is performed. For example, when the current block is a non-square shape of a 16×4 size, the second transform may be performed on a subblock of a 2×8 size at the top-left of the current block after the first transform is performed on the current block (see FIG. 24 (a)).

When the current block is a non-square shape of which the height is at least 4 times greater than the width, the second transform may be performed on a subblock of a (4 kN)×(kN) size at the top-left of the current block after the first transform is performed. For example, when the current block is a non-square shape of a 16×4 size, the second transform may be performed on a subblock of a 2×8 size at the top-left of the current block after the first transform is performed on the current block (see FIG. 24 (b)).

The decoder may perform inverse transform of the second transform (second inverse transform) and may perform inverse transform of the first transform (first inverse transform) on a result of the second inverse transform. As a result of performing the second inverse transform and the first inverse transform, residual signals for the current block may be acquired.

Information indicating the transform type of the current block may be signaled through a bitstream. The information may be index information tu_mts_idx indicating one among combinations of a transform type for the horizontal direction and a transform type for the vertical direction.

A transform core for the vertical direction and a transform core for the horizontal direction may be determined based on the transform type candidates specified by index information tu_mts_idx. Tables 7 and 8 show transform type combinations according to tu_mts_idx.

TABLE 7

| tu_mts_idx | transform type | |
|---|---|---|
| | horizontal | vertical |
| 0 | SKIP | SKIP |
| 1 | DCT-II | DCT-II |
| 2 | DST-VII | DST-VII |
| 3 | DCT-VIII | DST-VII |
| 4 | DST-VII | DCT-VIII |
| 5 | DCT-VIII | DCT-VIII |

TABLE 8

| tu_mts_idx | transform type | |
|---|---|---|
| | horizontal | vertical |
| 0 | DCT-II | DCT-II |
| 1 | SKIP | SKIP |
| 2 | DST-VII | DST-VII |
| 3 | DCT-VIII | DST-VII |
| 4 | DST-VII | DCT-VIII |
| 5 | DCT-VIII | DCT-VIII |

The transform type may be determined as any one among DCT2, DST7, DCT8, and skip transform. Alternatively, a transform type combination candidate may be configured using only transform cores except the transform skip.

In the case where Table 7 is used, when tu_mts_idx is 0, transform skip may be applied in the horizontal direction and the vertical direction. When tu_mts_idx is 1, DCT2 may be applied in the horizontal direction and the vertical direction. When tu_mts_idx is 3, DCT8 may be applied in the horizontal direction, and DCT7 may be applied in the vertical direction.

In the case where Table 8 is used, when tu_mts_idx is 0, DCT2 may be applied in the horizontal direction and the vertical direction. When tu_mts_idx is 1, transform skip may be applied in the horizontal direction and the vertical direction. When tu_mts_idx is 3, DCT8 may be applied in the horizontal direction, and DCT7 may be applied in the vertical direction.

Whether or not to encode the index information may be determined based on at least one among the size, the shape, and the number of non-zero coefficients of the current block. For example, when the number of non-zero coefficients is equal to or smaller than a threshold value, index information is not signaled, and a default transform type may be applied to the current block. Here, the default transform type may be DST7. Alternatively, the default mode may vary according to the size, the shape, or the intra prediction mode of the current block.

The threshold value may be determined based on the size or the shape of the current block. For example, when the size of the current block is smaller than or equal to 32×32, the threshold value may be set to 2, and when the current block is larger than 32×32 (e.g., when the current block is a coding block of a 32×64 or 64×32 size), the threshold value may be set to 4.

A plurality of lookup tables may be previously stored in the encoder/decoder. In the plurality of lookup tables, at least one among the index value assigned to the transform type combination candidates, the type of the transform type combination candidates, and the number of transform type combination candidates may be different.

A lookup table for the current block may be selected based on at least one among the size of the current block, the shape of the current block, the prediction encoding mode of the current block, the intra prediction mode of the current block, whether the second transform is applied, and whether transform skip is applied to a neighboring block.

For example, when the size of the current block is 4×4 or smaller or when the current block is encoded by inter prediction, the lookup table of Table 7 may be used, and when the size of the current block is larger than 4×4 or when the current block is encoded by intra prediction, the lookup table of Table 8 may be used.

Alternatively, information indicating any one among the plurality of lookup tables may be signaled through a bitstream. The decoder may select a lookup table for the current block based on the information.

As another example, the index assigned to the transform type combination candidate may be adaptively determined based on at least one among the size of the current block, the shape of the current block, the prediction encoding mode of the current block, the intra prediction mode of the current block, whether the second transform is applied, and whether transform skip is applied to a neighboring block. For example, when the size of the current block is 4×4, the index assigned to the transform skip may have a value smaller than that of the index assigned to the transform skip when the size of the current block is larger than 4×4. Specifically, when the size of the current block is 4×4, index 0 may be assigned to the transform skip, and when the current block is larger than 4×4 and smaller than or equal to 16×16, an index larger than 0 (e.g., index 1) may be assigned to the transform skip. When the current block is larger than 16×16, a maximum value (e.g., 5) may be assigned to the index of the transform skip.

Alternatively, when the current block is encoded by inter prediction, index 0 may be assigned to the transform skip. When the current block is encoded by intra prediction, an index larger than 0 (e.g., index 1) may be assigned to the transform skip.

Alternatively, when the current block is a block of a 4×4 size encoded by inter prediction, index 0 may be assigned to the transform skip. On the other hand, when the current block is not encoded by inter prediction or the current block is larger than 4×4, an index of a value larger than 0 (e.g., index 1) may be assigned to the transform skip.

Transform type combination candidates different from the transform type combination candidates listed in Tables 7 and 8 may be defined and used. For example, a transform type combination candidate may be used, in which transform skip is applied to any one among the horizontal direction transform and the vertical direction transform, and a transform core such as DCT7, DCT8, or DST2 is applied to the other one. At this time, whether or not to use the transform skip as a transform type candidate for the horizontal direction or the vertical direction may be determined based on at least one among the size (e.g., width and/or height), the shape, the prediction encoding mode, and the intra prediction mode of the current block.

Alternatively, information indicating whether a specific transform type candidate is available may be signaled through a bitstream. For example, a flag indicating whether the transform skip may be used as a transform type candidate for the horizontal direction and the vertical direction may be signaled. According to the flag, whether a specific transform type combination candidate is included in a plurality of transform type combination candidates may be determined.

Alternatively, whether a specific transform type candidate is applied to the current block may be signaled through a bitstream. For example, flag cu_mts_flag indicating whether or not to apply DCT2 for the horizontal direction and the vertical direction may be signaled. When the value of cu_mts_flag is 1, DCT2 may be set as a transform core for the vertical direction and the horizontal direction. When the value of cu_mts_flag is 0, DCT8 or DST7 may be set as a transform core for the vertical direction and the horizontal direction. Alternatively, when the value of cu_mts_flag is 0, information tu_mts_idx specifying any one among the plurality of transform type combination candidates may be signaled.

When the current block is a non-square shape of which the width is greater than the height or a non-square shape of which the height is greater than the width, encoding of cu_mts_flag may be omitted, and the value of cu_mts_flag may be regarded as 0.

The number of available transform type combination candidates may be set differently according to the size, the shape, or the intra prediction mode of the current block. For example, when the current block is a square shape, three or more transform type combination candidates may be used, and when the current block is a non-square shape, two transform type combination candidates may be used. Alternatively, when the current block is a square shape, only transform type combination candidates of which the transform type for the horizontal direction is different from the transform type for the vertical direction may be used among the transform type combination candidates.

When there are three or more transform type combination candidates that the current block may use, index information tu_mts_idx indicating one among the transform type combination candidates may be signaled. On the other hand, when there are two transform type combination candidates that the current block may use, flag mts_flag indicating any one among the transform type combination candidates may be signaled. Table 9 shows a process of encoding information for specifying transform type combination candidates according to the shape of the current block.

and when the current block is non-square shape, a transform type combination may be selected based on Table 11 shown below.

TABLE 10

| | INTRA | | INTER | |
|---|---|---|---|---|
| mts_idx | Horizontal direction transform core | Vertical direction transform core | Horizontal direction transform core | Vertical direction transform core |
| 0 | DST7 | DST7 | DCT8 | DCT8 |
| 1 | DCT8 | DST7 | DST7 | DCT8 |
| 2 | DST7 | DCT8 | DCT8 | DST7 |
| 3 | DCT8 | DCT8 | DST7 | DST7 |

TABLE 11

| | INTRA | | INTER | |
|---|---|---|---|---|
| mts_idx | Horizontal direction transform core | Vertical direction transform core | Horizontal direction transform core | Vertical direction transform core |
| 0 | DCT8 | DST7 | DST7 | DCT8 |
| 1 | DST7 | DCT8 | DCT8 | DST7 |
| 2 | DST7 | DST7 | DST7 | DST7 |
| 3 | DCT8 | DCT8 | DST7 | DST7 |

A transform type may be determined based on the number of horizontal direction non-zero coefficients or the number of vertical direction non-zero coefficients of the current block. Here, the number of horizontal direction non-zero coefficients indicates the number of non-zero coefficients included in a 1×N block (where N is the width of the current block), and the number of vertical direction non-zero coefficients indicates the number of non-zero coefficients included in a N×1 block (where N is the height of the current block). When the maximum value of the horizontal direction non-zero coefficient is smaller than or equal to a threshold value, a first transform type may be applied in the horizontal direction, and when the maximum value of the horizontal

TABLE 9

| | Descriptor |
|---|---|
| residual_coding (x0, y0, log2TbWidth, log2TbHeight, cIdx) { | |
| ... | |
| if (cu_mts_flag[x0][y0] && (cIdx = = 0) &&!transform_skip_flag[x0][y0][cIdx] | |
| && ( (CuPredMode[x0][y0] = = MODE_INTRA && numSigCoeff > 2) \|\| | |
| (CuPredMode[x0][y0] = = MODE_INTER) ) ) { | |
| if (cbHeight == cbWidth) { | |
| mts_idx[x0][y0] | ae(v) |
| } else { | |
| mts_flag[x0] [y0] | u(l) |
| } | |
| } | |

Indexes of the transform type combination candidates may be rearranged (or reordered) according to the shape of the current block. For example, the indexes assigned to the transform type combination candidates when the current block is a square shape may be different from the indexes assigned to the transform type combination candidates when the current block is a non-square shape. For example, when the current block is a square shape, a transform type combination may be selected based on Table 10 shown below, direction non-zero coefficient is larger than the threshold value, a second transform type may be applied in the horizontal direction. When the maximum value of the vertical direction non-zero coefficient is smaller than or equal to a threshold value, the first transform type may be applied in the vertical direction, and when the maximum value of the vertical direction non-zero coefficient is larger than the threshold value, the second transform type may be applied in the vertical direction.

Figures 25, 26:
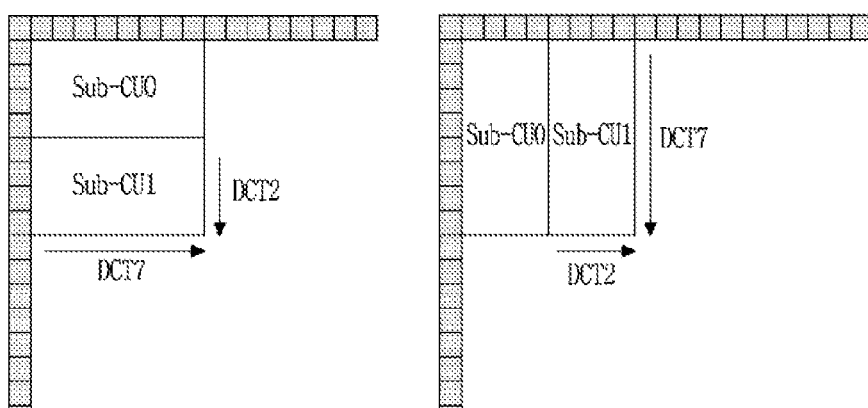
FIG. 25 is a view for describing examples of determining a transform type of the current block.
FIG. 26 is a view showing an example of determining a transform type of a subblock.

FIG. 25 is a view for describing examples of determining a transform type of the current block.

For example, when the current block is encoded by intra prediction and the maximum value of the horizontal direction non-zero coefficient of the current block is 2 or less (see FIG. 25 (a)), the transform type of the horizontal direction may be determined as DST7.

When the current block is encoded by intra prediction and the maximum value of the vertical direction non-zero coefficient of the current block is larger than 2 (see FIG. 25 (b)), DCT2 or DCT8 may be determined as the transform type of the vertical direction.

Information indicating whether or not to explicitly determine the transform type of the current block based on information signaled from a bitstream may be signaled through a bitstream. For example, information sps_explicit_intra_mts_flag indicating whether explicit transform type determination is allowed for a block encoded by intra prediction and/or information sps_explicit_inter_mts_flag indicating whether explicit transform type determination is allowed for a block encoded by inter prediction may be signaled at a sequence level.

When explicit transform type determination is allowed, a transform type of the current block may be determined based on index information tu_mts_idx signaled from a bitstream. On the other hand, when explicit transform type determination is not allowed, the transform type may be determined based on at least one among the size of the current block, the shape of the current block, whether transform of a subblock unit is allowed, and the position of a subblock including a non-zero transform coefficient. For example, the horizontal direction transform type of the current block may be determined based on the width of the current block, and the vertical direction transform type of the current block may be determined based on the height of the current block. For example, when the width of the current block is smaller than 4 or greater than 16, the transform type of the horizontal direction may be determined as DCT2. Otherwise, the transform type of the horizontal direction may be determined as DST7. When the height of the current block is smaller than 4 or greater than 16, the transform type of the vertical direction may be determined as DCT2. Otherwise, the transform type of the vertical direction may be determined as DST7. Here, in order to determine the transform type of the horizontal direction and the transform type of the vertical direction, threshold values compared with the width and the height may be determined based on at least one among the size, the shape, and the intra prediction mode of the current block.

Alternatively, when the current block is a square shape of which the height and the width are the same, the horizontal direction transform type and the vertical direction transform type are set to be the same, whereas when the current block is a non-square shape of which the height and the width are different, the horizontal direction transform type and the vertical transform The transform type may be set to be different from each other. For example, when the width of the current block is greater than the height, the horizontal direction transform type may be determined as DST7, and the vertical direction transform type may be determined as DCT2. When the height of the current block is greater than the width, the vertical direction transform type may be determined as DST7, and the horizontal direction transform type may be determined as DCT2.

The number and/or the type of transform type candidates or the number and/or the type of transform type combination candidates may vary according to whether explicit transform type determination is allowed. For example, when explicit transform type determination is allowed, DCT2, DST7, and DCT8 may be used as transform type candidates. Accordingly, each of the horizontal direction transform type and the vertical direction transform type may be set to DCT2, DST8, or DCT8. When explicit transform type determination is not allowed, only DCT2 and DST7 may be used as transform type candidates. Accordingly, each of the horizontal direction transform type and the vertical direction transform type may be determined as DCT2 or DST7.

A coding block or a transform block is partitioned into a plurality of subblocks, and transform may be performed on each of the plurality of subblocks. For example, when the sub-partition intra prediction coding method described above is applied to a coding block, the coding block is partitioned into a plurality of subblocks, and transform may be performed on each of the plurality of subblocks.

Transform types of the subblocks may be the same. For example, when a transform type for a first subblock among the plurality of subblocks is determined, the transform type of the first subblock may also be applied to the other subblocks. Alternatively, a transform type for a coding block is determined, and the transform type of the coding block may be determined as the transform type of the subblocks.

As another example, transform types of a plurality of subblocks may be individually determined. A transform type of each subblock may be determined based on information signaled for each subblock. For example, index information tu_mts_idx may be signaled for each subblock. Index information tu_mts_idx may specify any one among a plurality of combinations of a transform type for the horizontal direction and a transform type for the vertical direction. According to the value of tu_mts_idx, the transform type of the horizontal direction and the transform type of the vertical direction may be determined as DCT2, DST7, or DCT8. Based on index information tu_mts_idx, it may be determined whether the transform type of the horizontal direction and the transform type of vertical direction are the same.

Information indicating whether the current subblock uses a transform type the same as the transform type of a previous subblock may be signaled. When the information indicates that a transform type the same as that of a previous subblock is used, encoding of index information tu_mts_idx for the current subblock may be omitted, and the transform type of the previous subblock may be applied to the current subblock. On the other hand, when the information indicates that a transform type different from that of the previous subblock is used, index information tu_mts_idx for the current subblock may be encoded. At this point, the index information of the current subblock may indicate any one among remaining transform type combinations excluding a transform type combination indicated by the index information of the previous subblock.

Alternatively, it may be set not to allow explicit determination of a transform type when a coding block is partitioned into a plurality of subblocks. When explicit determination of a transform type is allowed, the transform type may be determined based on index information tu_mts_idx. On the other hand, when explicit determination of the transform type is not allowed, the transform type may be determined considering at least one among the size, the shape, and the position of a subblock including a non-zero coefficient.

FIG. 26 is a view showing an example of determining a transform type of a subblock.

FIG. 26 shows an example in which the height to width ratio of a subblock is 1:2 or 2:1.

A horizontal direction transform type and a vertical direction transform type may be determined based on the width and the height of each subblock. For example, as shown in the examples of FIGS. 26 (a) and 26 (b), when the width of a subblock is smaller than a threshold value, a first transform type (e.g., DCT2) may be used as the horizontal direction transform type. On the other hand, when the width of the subblock is greater than or equal to the threshold value, a second transform type (e.g., DST7) may be used as the horizontal direction transform type.

In addition, when the height of a subblock is smaller than a threshold value, the first transform type (e.g., DCT2) may be used as the vertical direction transform type. On the other hand, when the width of the subblock is greater than or equal to the threshold value, the second transform type (e.g., DST7) may be used as the vertical direction transform type.

Here, the threshold value may be a natural number such as 2, 4, or 8. The threshold value may be variably determined based on at least one among the size, the shape, the intra prediction mode, and the prediction encoding mode of a coding block. Alternatively, information for determining the threshold value may be signaled through a bitstream.

In the example described above, although a case of comparing the width and the height of a subblock with one threshold value is shown as an example, the transform type may be determined by comparing the width and the height of a subblock with two threshold values. For example, when the width of a subblock is smaller than a first threshold value or greater than a second threshold value, the transform type of the horizontal direction may be determined as DCT2. Otherwise, the transform type of the horizontal direction may be determined as DST7. In addition, when the height of a subblock is smaller than a first threshold value or greater than a second threshold value, the transform type of the vertical direction may be determined as DCT2. Otherwise, the transform type of the vertical direction may be determined as DST7. The second threshold is a natural number larger than the first threshold value, and the first threshold value may be a natural number such as 2, 4, or 8, and the second threshold value may be a natural number such as 8, 16, or 32.

As another example, when a subblock is a square shape of which the height and the width are the same, the horizontal direction transform type and the vertical direction transform type may be set to be the same, whereas when a subblock is a non-square shape of which the height and the width are different, the horizontal direction transform type and the vertical direction transform type may be set to be different from each other. For example, when the width of a subblock is greater than the height, the horizontal direction transform type may be determined as DST7, and the vertical direction transform type may be determined as DCT2. When the height of a subblock is larger than the width, the vertical direction transform type may be determined as DST7, and the horizontal direction transform type may be determined as DCT2.

Values of residual coefficients included in at least one among the plurality of subblocks may be set to 0. Here, the residual coefficient refers to a transform coefficient generated through transform, a transform skip coefficient generated through transform skip, or a quantized coefficient generated by quantizing the transform coefficient or a coefficient. For example, values of residual coefficients included in a subblock spaced apart from the boundary of the coding block by a predetermined distance or more may be set to 0.

Figure 27:
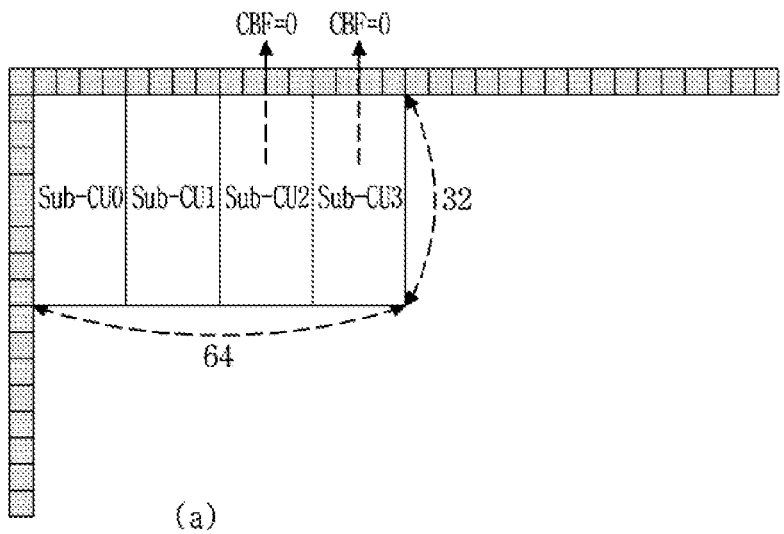
FIG. 27 is a view for describing an example in which residual coefficients of subblocks are set to 0.
Figure 27:
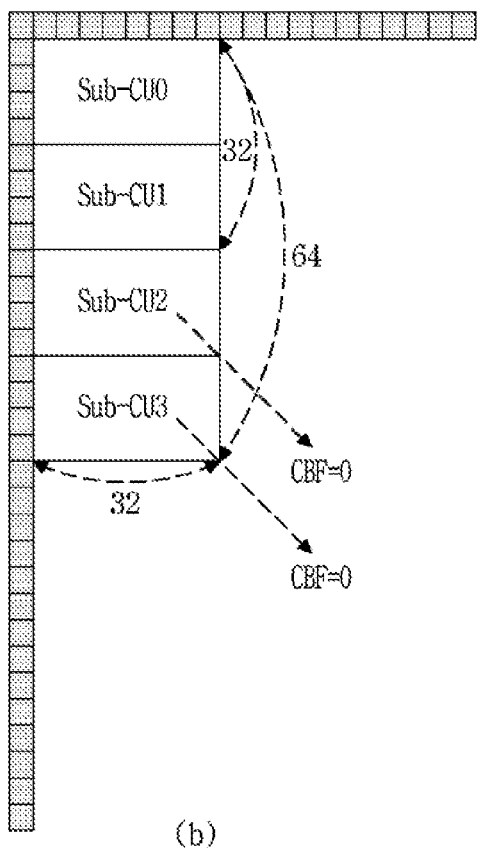

FIG. 27 is a view for describing an example in which residual coefficients of subblocks are set to 0.

In the example shown in FIG. 27, the coded block flag (CBF) indicates whether a non-zero residual coefficient exists in a subblock. When the value of CBF is 0, it indicates that there is no non-zero residual coefficient in the subblock, and when the value of CBF is 1, it indicates that a non-zero residual coefficient exists in the subblock.

When the distance from the boundary of a coding block to a subblock is greater than or equal to a threshold value, residual coefficients included in the subblock may be set to 0. At this point, the distance from the boundary of the coding block to the subblock may be obtained based on a first sample positioned at the boundary of the coding block and a second sample included in the subblock. For example, the first sample may be a sample positioned at the top-left corner of the coding block, a sample positioned at the bottom-left corner, a sample positioned in the left middle, a sample positioned at the top-right corner, a sample positioned at the bottom-right corner, a sample positioned in the right middle, a sample positioned in the top middle, and a sample positioned in the bottom middle. The second sample may be a sample positioned at the top-left corner of the subblock, a sample positioned at the bottom-left corner, a sample positioned in the left middle, a sample positioned at the top-right corner, a sample positioned at the bottom-right corner, a sample positioned in the right middle, a sample positioned in the top middle, and a sample positioned in the bottom middle.

The threshold value may be determined based on at least one among the size and the shape of the coding block, the number of subblocks included in the coding block, and the size of the subblock. Alternatively, information for determining the threshold value may be signaled through a bitstream.

For example, when vertical direction partitioning is applied to the current block, residual coefficients of subblocks of which the distance from the left boundary of the coding block is equal to or greater than a threshold value may be set to 0. When the size of the coding block is 64 and the threshold value is 32, as shown in the example of FIG. 27 (a), the residual coefficients of subblocks (Sub-CU2 and Sub-CU3) having a distance of 32 or more from the left boundary of the coding block may be set to 0.

Alternatively, when horizontal direction partitioning is applied to the current block, residual coefficients of subblocks of which the distance from the top boundary of the coding block is equal to or greater than a threshold value may be set to 0. When the size of the coding block is 64 and the threshold value is 32, as shown in the example in FIG. 27 (b), the residual coefficients of subblocks (Sub-CU2 and Sub-CU3) having a distance of 32 or more from the top boundary of the coding block may be set to 0.

Contrary to the example shown in the figures, residual coefficients included in subblocks of which the distance from the boundary of the coding block is smaller than the threshold value may be set to 0.

Alternatively, residual coefficients of remaining subblocks excluding a subblock positioned at a preset position among a plurality of subblocks may be set to 0. For example, when vertical direction partitioning is applied to a coding block, residual coefficients of remaining subblocks excluding the leftmost or rightmost subblock among a plurality of subblocks may be set to 0. Alternatively, when horizontal direction partitioning is applied to a coding block, residual coefficients of remaining subblocks excluding the subblock positioned on the top or the bottom among a plurality of subblocks may be set to 0.

Information indicating whether a non-zero coefficient exists, e.g., encoding of CBF, may be omitted for the subblocks. When encoding of CBF is omitted, whether a non-zero residual coefficient is included in each subblock may be determined considering the distance between the boundary of the coding block and the subblock or the position of the subblock. For example, in the example shown in FIG. 27, CBF values of subblock 0 and subblock 1 (sub-CU0, sub-CU1) may be derived as 1, and CBF values of subblock 2 and subblock 3 (sub-CU2, sub-CU3) may be derived as 0.

Transform and/or quantization may be performed on subblocks including a non-zero coefficient, while transform and quantization may be omitted for subblocks not including a non-zero coefficient.

As another example, information indicating that transform is performed only on a partial region of a coding block or a transform block may be encoded and signaled. The information may be cu_sbt_flag of 1-bit flag. When the flag is 1, it indicates that the transform is performed only on some of a plurality of subblocks generated by partitioning the coding block or the transform block, and when the flag is 0, it indicates that the transform is performed without partitioning the coding block or the transform block into subblocks.

The technique of performing transform only on a partial region of a coding block may be allowed only when the sub-partition intra coding method is applied to the coding block. Accordingly, cu_sbt_flag may be encoded and signaled only when the sub-partition intra coding method is applied to the coding block. When the value of cu_sbt_flag is 1, transform is performed only on some subblocks among a plurality of subblocks generated by partitioning a coding block or a transform block, and residual coefficients of the remaining subblocks may be set to 0. When the value of cu_sbt_flag is 1, transform may be performed on all subblocks.

Alternatively, when the sub-partition intra coding method is applied to a coding block, encoding of cu_sbt_flag may be omitted, and the value of cu_sbt_flag may be set to 1.

As another example, only when the prediction encoding mode of a coding block is inter prediction or current picture reference, a technique of performing transform only on a partial region of the coding block may be allowed. When a coding block is encoded by inter prediction or current picture reference, information indicating whether transform is performed only on a partial region of the coding block may be encoded and signaled. When transform is performed only on a partial region of a coding block, information indicating the partitioning type of the coding block may be encoded and signaled. The information indicating the partitioning type of the coding block may include at least one among information indicating whether the coding block is partitioned into four subblocks, information indicating the partitioning direction of the coding block, and information indicating the number of subblocks. For example, when cu_sbt_flag is 1, flag cu_sbt_quadtree_flag indicating whether the coding block is partitioned into four subblocks may be signaled. When cu_sbt_quadtree_flag is 1, it indicates that the coding block is partitioned into four subblocks. For example, a coding block may be partitioned into four subblocks using three vertical lines or three horizontal lines, or a coding block may be partitioned into four subblocks using one vertical line and one horizontal line. When cu_sbt_quadtree_flag is 0, it indicates that the coding block is partitioned into two subblocks. For example, a coding block may be partitioned into two subblocks using one vertical line or one horizontal line.

In addition, a flag indicating the partitioning direction of a coding block may be signaled through a bitstream. For example, flag cu_sbt_horizontal_flag indicating whether horizontal direction partitioning is applied to the coding block may be encoded and signaled. When the value of cu_sbt_horizontal_flag is 1, it indicates that horizontal direction partitioning is applied to the coding block, and when the value of cu_sbt_horizontal_flag is 0, it indicates that vertical direction partitioning is applied to the coding block.

Information indicating the position of a subblock in which a non-zero coefficient does not exist or a subblock on which transform is not performed may be signaled through a bitstream. Based on the information, a subblock on which transform and/or quantization is performed and a subblock for which transform and/or quantization is omitted may be determined.

Figure 28:
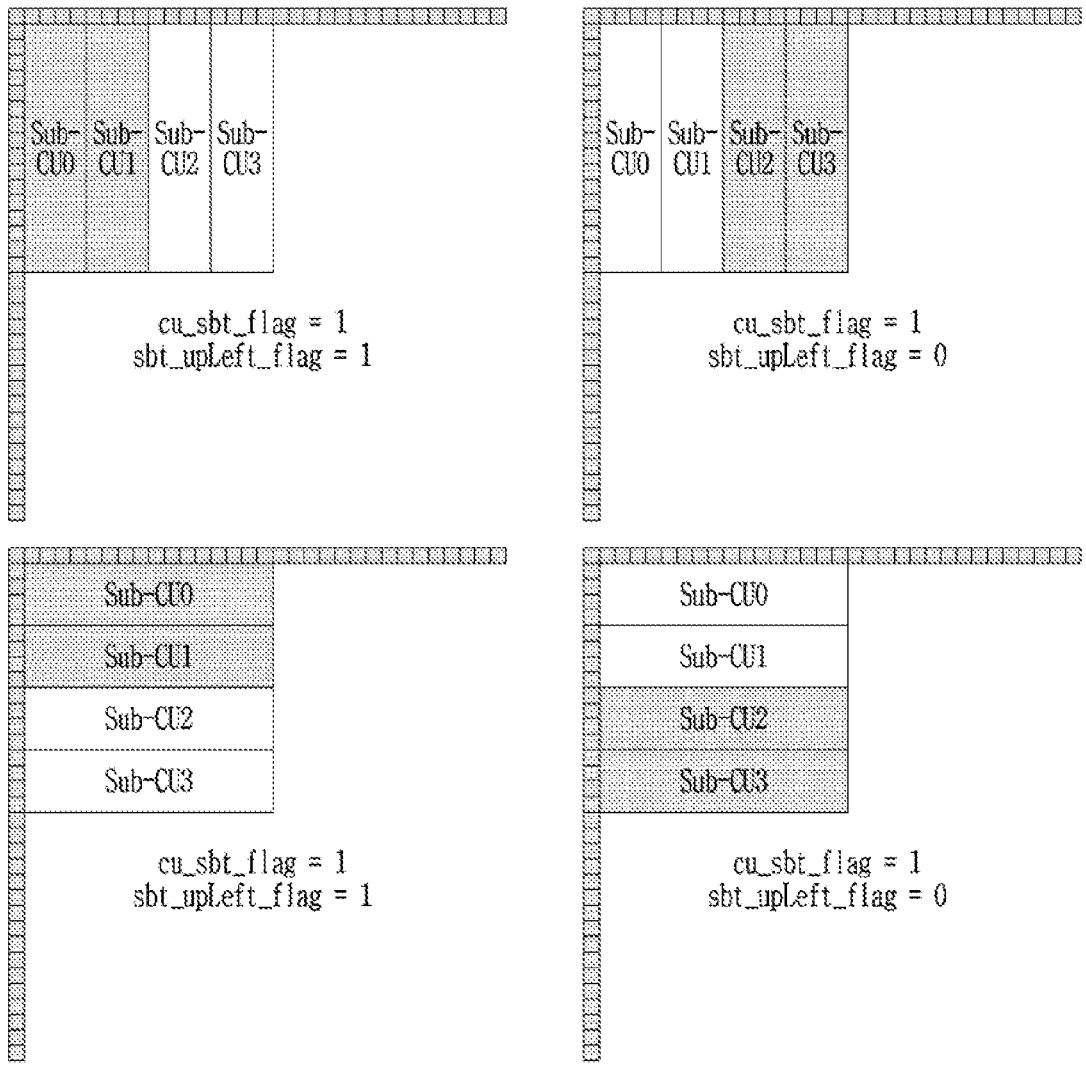
FIG. 28 is a view showing an example in which a position of a subblock on which transform and/or quantization has been performed is specified based on information signaled through a bitstream.

FIG. 28 is a view showing an example in which a position of a subblock on which transform and/or quantization has been performed is specified based on information signaled through a bitstream.

Flag sbt_upleft_flag indicating whether a non-zero coefficient exists at a specific position or in the first subblock may be signaled. When the value of sbt_upleft_flag is 1, it indicates that transform and/or quantization is performed on a subblock positioned on the top or the left side of the coding block, and transform and/or quantization is not performed on a subblock positioned on the right side or the bottom of the coding block. When the value of sbt_upleft_flag is 0, it indicates that transform and/or quantization is performed on a subblock positioned on the top or the left side of the coding block, and transform and/or quantization is not performed on a subblock positioned at the right side or the bottom of the coding block.

When a coding block is partitioned into four subblocks, sbt_upleft_flag may indicate that transform and/or quantization is performed on N subblocks. For example, when the value of sbt_upleft_flag of 1, it indicates that transform and/or quantization is performed on two subblocks on the top or the left side, and when the value of sbt_upleft_flag of 0, it indicates that transform and/or quantization is performed on two subblocks on the right side or the bottom.

Unlike the example shown in the figure, the value of N may be set to 1 or 3.

Residual coefficients of a subblock on which transform and/or quantization is not performed may be set to 0.

The transform type of a subblock may be determined considering the partitioning direction of the coding block and the position of the subblock. For example, when a coding block is partitioned in the vertical direction and transform is performed on a subblock positioned on the left side among the subblocks, the horizontal direction transform type and the vertical direction transform type may be set to be different. For example, the horizontal direction transform type may be set to DCT8, and the vertical direction transform type may be set to DST7. On the other hand, when a coding block is partitioned in the vertical direction and transform is performed on a subblock positioned on the right side among the subblocks, the horizontal direction transform type and the vertical direction transform type of the subblock may be set equally. For example, the horizontal direction transform type and the vertical direction transform type may be set to DST7.

Alternatively, when a coding block is partitioned in the horizontal direction and transform is performed on a subblock positioned on the top among the subblocks, the horizontal direction transform type and the vertical direction transform type may be set to be different. For example, the horizontal direction transform type may be set to DST7, and the vertical direction transform type may be set to DCT8. On the other hand, when a coding block is partitioned in the horizontal direction and transform is performed on a sub-block positioned on the bottom among the subblocks, the horizontal direction transform type and the vertical direction transform type of the subblock may be set equally. For example, the horizontal direction transform type and the vertical direction transform type may be set to DST7.

Information indicating whether a non-zero coefficient exists, e.g., encoding of CBF, may be omitted for the subblocks. When encoding of CBF is omitted, whether a non-zero residual coefficient is included in each subblock may be determined considering the position of a block on which transform is performed. For example, when the value of sbt_upleft_flag is 0, CBF values of subblocks positioned on the left side or on the top may be derived as 0, and CBF value of subblocks positioned on the right side or on the bottom may be derived as 1. Alternatively, when the value of sbt_upleft_flag is 1, CBF value of subblocks positioned on the left side or the top may be derived as 1, and CBF value of subblocks positioned on the right side or on the bottom may be derived as 0.

A reconstructed sample of a subblock on which transform is performed may be derived from a sum of a prediction sample and a residual sample. On the other hand, in a subblock on which transform is omitted, a prediction sample may be set as a reconstructed sample. Quantization is for reducing the energy of a block, and the quantization process includes a process of dividing a transform coefficient by a specific constant value. The constant value may be derived by a quantization parameter, and the quantization parameter may be defined as a value between 1 and 63.

When the encoder performs transform and quantization, the decoder may acquire a residual block through inverse quantization and inverse transform. The decoder may acquire a reconstructed block for the current block by adding the prediction block and the residual block.

When a reconstructed block of the current block is acquired, loss of information occurring in the quantization and encoding process may be reduced through in-loop filtering. An in-loop filter may include at least one among a deblocking filter, a sample adaptive offset filter (SAO), and an adaptive loop filter (ALF). Hereinafter, a reconstructed block before the in-loop filter is applied is referred to as a first reconstructed block, and a reconstructed block after the in-loop filter is applied is referred to as a second reconstructed block.

The second reconstructed block may be acquired by applying at least one among the deblocking filter, the SAO, and the ALF to the first reconstructed block. At this point, the SAO or the ALF may be applied after the deblocking filter is applied.

The deblocking filter is for mitigating degradation of video quality (blocking artifact) at the boundary of a block, which occurs as quantization is performed on individual blocks. In order to apply the deblocking filter, a block strength (BS) between the first reconstructed block and a neighboring reconstructed block may be determined.

Figure 29:
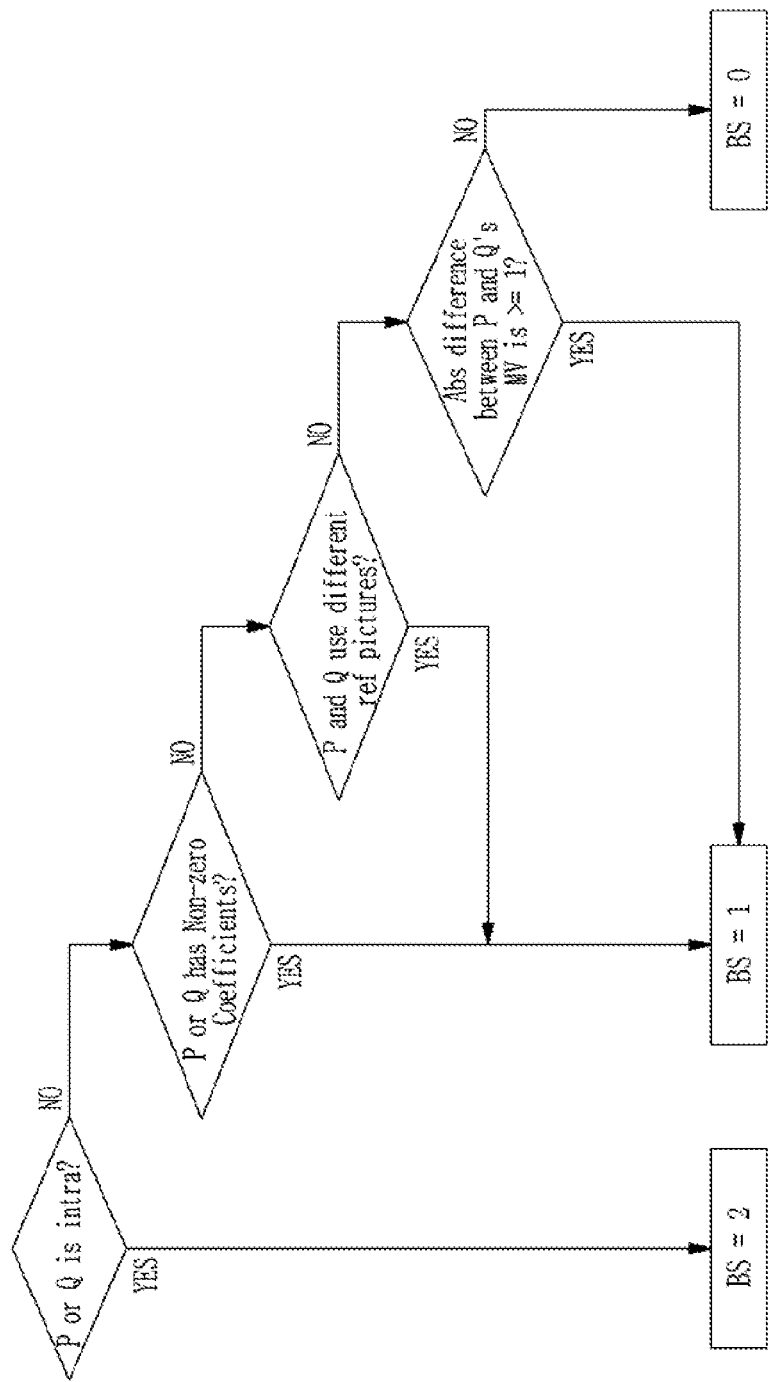
FIG. 29 is a flowchart illustrating a process of determining block strength.

FIG. 29 is a flowchart illustrating a process of determining block strength.

In the example shown in FIG. 29, P denotes a first reconstructed block, and Q denotes a neighboring reconstructed block. Here, the neighboring reconstructed block may be a block adjacent to the left side or the top side of the current block.

In the example shown in FIG. 29, it is shown that the block strength is determined considering the prediction encoding modes of P and Q, whether a non-zero transform coefficient is included, whether inter prediction is performed using the same reference picture, and whether the difference value of motion vectors is larger than or equal to a threshold value.

Whether or not to apply the deblocking filter may be determined based on the block strength. For example, when the block strength is 0, filtering may not be performed.

The SAO is for mitigating a ringing phenomenon (ringing artifact) that occurs as quantization is performed in the frequency domain. The SAO may be performed by adding or subtracting an offset determined considering the pattern of the first reconstructed video. The method of determining the offset includes an edge offset (EO) or a band offset (BO). EO denotes a method of determining an offset of a current sample according to the pattern of surrounding pixels. BO denotes a method of applying a common offset to a set of pixels having similar brightness values in a region. Specifically, pixel brightness may be partitioned into 32 equal sections, and pixels having similar brightness values may be set as one set. For example, four adjacent bands among 32 bands may be set as one group, and the same offset value may be applied to the samples belonging to the four bands.

The ALF is a method of generating a second reconstructed video by applying a filter having a predefined size/shape to the first reconstructed video or a reconstructed video to which a deblocking filter has been applied. Equation 32 shows an example of applying the ALF.

$$R'(i, j) = \sum_{k=-\frac{N}{2}}^{\frac{N}{2}} \sum_{l=-\frac{N}{2}}^{\frac{N}{2}} f(k, l) \cdot R(i+k, j+l) \quad \text{[Equation 32]}$$

Any one among predefined filter candidates may be selected by the unit of a picture, a coding tree unit, a coding block, a prediction block, or a transform block. Each of the filter candidates may be different in either the size or the shape.

Figure 30:
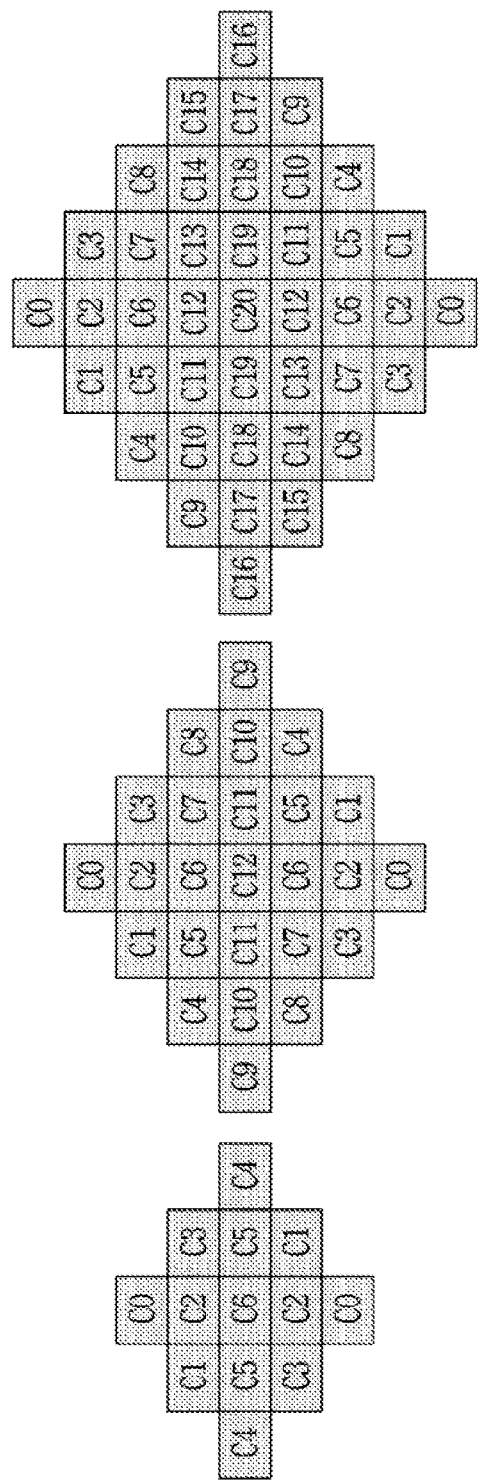
FIG. 30 is a view showing predefined filter candidates.

FIG. 30 is a view showing predefined filter candidates.

As shown in the example of FIG. 30, at least one among 5×5, 7×7 and 9×9 diamond shapes may be selected.

Only a diamond shape of a 5×5 size may be used for a chroma component.

Applying the embodiments described above focusing on a decoding process or an encoding process to an encoding process or a decoding process is included in the scope of the present disclosure. Changing the embodiments described in a predetermined order in an order different from the described order is also included in the scope of the present disclosure.

Although the embodiments above have been described based on a series of steps or flowcharts, this does not limit the time series order of the present disclosure, and may be performed simultaneously or in a different order as needed. In addition, each of the components (e.g., units, modules, or the like) constituting the block diagram in the embodiments described above may be implemented as a hardware device or software, or a plurality of components may be combined to be implemented as a single hardware device or software.

The embodiments described above may be implemented in the form of program commands that can be executed through various computer components and recorded in a computer-readable recording medium. The computer-readable recording medium may include program commands, data files, data structures and the like independently or in combination. The computer-readable recording medium includes, for example, magnetic media such as a hard disk, a floppy disk and a magnetic tape, optical recording media such as a CD-ROM and a DVD, magneto-optical media such as a floptical disk, and hardware devices specially configured to store and execute program commands, such as a ROM, a RAM, a flash memory and the like. The hardware devices described above can be configured to operate using one or more software modules to perform the process of the present disclosure, and vice versa.

The present disclosure can be applied to an electronic device that encodes and decodes a video.

What is claimed is:

1. A video decoding method comprising:
   determining whether a candidate intra prediction mode is a same intra prediction mode as an intra prediction mode of a current block;
   deriving the intra prediction mode of the current block based on the determination; and
   performing intra prediction on the current block based on a reference sample line of the current block and the derived intra prediction mode, wherein
   when a difference between the intra prediction mode of a top neighboring block and the intra prediction mode of a left neighboring block is 64, at least one among the candidate intra prediction modes is derived by adding or subtracting 2 to or from a maximum value.

2. The method according to claim 1, further comprising the step of determining whether or not to partition the current block into a plurality of subblocks, wherein
   when the current block is partitioned into a plurality of subblocks, the plurality of subblocks shares one intra prediction mode, and
   a horizontal direction transform type and a vertical direction transform type of a subblock are determined based on a shape of the subblock.

3. The method according to claim 2, wherein inverse transform is omitted for some of the plurality of subblocks.

4. The method according to claim 2, wherein the horizontal direction transform type of a subblock is determined based on a width of the subblock, and the vertical direction transform type of the subblock is determined based on a height of the subblock.

5. A video encoding method comprising:
   determining whether a candidate intra prediction mode is a same intra prediction mode as an intra prediction mode of a current block;
   deriving the intra prediction mode of the current block based on the determination; and
   performing intra prediction on the current block based on a reference sample line of the current block and the derived intra prediction mode, wherein
   when a difference between the intra prediction mode of a top neighboring block and the intra prediction mode of a left neighboring block is 64, at least one among the candidate intra prediction modes is derived by adding or subtracting 2 to or from a maximum value.

6. The method according to claim 5, further comprising the step of determining whether or not to partition the current block into a plurality of subblocks, wherein
   when the current block is partitioned into a plurality of subblocks, the plurality of subblocks shares one intra prediction mode, and
   a horizontal direction transform type and a vertical direction transform type of a subblock are determined based on a shape of the subblock.

7. The method according to claim 6, wherein transform is omitted for some of the plurality of subblocks.

8. The method according to claim 6, wherein the horizontal direction transform type of a subblock is determined based on a width of the subblock, and the vertical direction transform type of the subblock is determined based on a height of the subblock.

9. A decoder, comprising:
   a memory, for storing instructions executable by a processor,
   the processor, for performing the instructions to execute operations of:
   determining whether a candidate intra prediction mode is a same intra prediction mode as an intra prediction mode of a current block;
   deriving the intra prediction mode of the current block based on the determination; and
   performing intra prediction on the current block based on a reference sample line of the current block and the derived intra prediction mode, wherein
   when a difference between the intra prediction mode of a top neighboring block and the intra prediction mode of a left neighboring block is 64, at least one among the candidate intra prediction modes is derived by adding or subtracting 2 to or from a maximum value.

10. The decoder according to claim 9, wherein the processor is further configured to perform an operation of determining whether or not to partition the current block into a plurality of subblocks, wherein
    when the current block is partitioned into a plurality of subblocks, the plurality of subblocks shares one intra prediction mode, and
    a horizontal direction transform type and a vertical direction transform type of a subblock are determined based on a shape of the subblock.

11. The decoder according to claim 10, wherein inverse transform is omitted for some of the plurality of subblocks.

12. The decoder according to claim 10, wherein the horizontal direction transform type of a subblock is determined based on a width of the subblock, and the vertical direction transform type of the subblock is determined based on a height of the subblock.

13. An encoder, comprising:
    a memory, for storing instructions executable by a processor,
    the processor, for performing the instructions to execute operations of:
    determining whether a candidate intra prediction mode is a same intra prediction mode as an intra prediction mode of a current block;
    deriving the intra prediction mode of the current block based on the determination; and
    performing intra prediction on the current block based on a reference sample line of the current block and the derived intra prediction mode, wherein
    when a difference between the intra prediction mode of a top neighboring block and the intra prediction mode of a left neighboring block is 64, at least one among the candidate intra prediction modes is derived by adding or subtracting 2 to or from a maximum value.

14. The encoder according to claim 13, wherein the processor is further configured to perform an operation of determining whether or not to partition the current block into a plurality of subblocks, wherein
- when the current block is partitioned into a plurality of subblocks, the plurality of subblocks shares one intra prediction mode, and
- a horizontal direction transform type and a vertical direction transform type of a subblock are determined based on a shape of the subblock.

15. The encoder according to claim 14, wherein transform is omitted for some of the plurality of subblocks.

16. The encoder according to claim 14, wherein the horizontal direction transform type of a subblock is determined based on a width of the subblock, and the vertical direction transform type of the subblock is determined based on a height of the subblock.

* * * * *